United States Patent
Pereira Almao et al.

(10) Patent No.: US 10,265,685 B2
(45) Date of Patent: Apr. 23, 2019

(54) METALLO-SILICATE CATALYST (MSC) COMPOSITIONS, METHODS OF PREPARATION AND METHODS OF USE IN PARTIAL UPGRADING OF HYDROCARBON FEEDSTOCKS

(71) Applicants: PC-CUPS Ltd., Calgary (CA); Cenovus Energy Inc., Calgary (CA)

(72) Inventors: Pedro Pereira Almao, Calgary (CA); Gerardo Vitale-Rojas, Calgary (CA); Maria Josefina Perez Zurita, Calgary (CA); Lante Antonio Carbognani, Calgary (CA); Ronald Scott Smith, Calgary (CA); Clementina Sosa, Calgary (CA)

(73) Assignees: PC-CUPS Ltd., Calgary, AB (CA); Cenovus Energy Inc., Calgary, AB (CA)

( * ) Notice: Subject to any disclaimer, the term of this patent is extended or adjusted under 35 U.S.C. 154(b) by 0 days.

(21) Appl. No.: 15/548,928

(22) PCT Filed: Feb. 3, 2016

(86) PCT No.: PCT/CA2016/050099
§ 371 (c)(1),
(2) Date: Aug. 4, 2017

(87) PCT Pub. No.: WO2016/123711
PCT Pub. Date: Aug. 11, 2016

(65) Prior Publication Data
US 2018/0029022 A1 Feb. 1, 2018

Related U.S. Application Data

(60) Provisional application No. 62/111,951, filed on Feb. 4, 2015, provisional application No. 62/111,982, filed on Feb. 4, 2015.

(51) Int. Cl.
*C10G 11/05* (2006.01)
*C10G 29/04* (2006.01)
(Continued)

(52) U.S. Cl.
CPC .......... *B01J 29/048* (2013.01); *B01J 23/007* (2013.01); *B01J 23/83* (2013.01); *B01J 27/22* (2013.01);
(Continued)

(58) Field of Classification Search
CPC ...... C01B 37/005; C01B 39/48; B01J 29/048; B01J 29/072; B01J 23/007; B01J 23/83;
(Continued)

(56) References Cited

U.S. PATENT DOCUMENTS

| 3,676,331 A | 7/1972 | Pitchford |
| 3,806,437 A | 4/1974 | Franse et al. |

(Continued)

FOREIGN PATENT DOCUMENTS

| CA | 1184739 A | 4/1985 |
| CA | 2268090 A1 | 4/1998 |

OTHER PUBLICATIONS

A Comprehensive Look at the Acid Number Test. (Noria Corporation). http://www.machinerylubrication.com/Articles/Print/1052 (downloaded on May 2012).
(Continued)

*Primary Examiner* — Cam N. Nguyen
(74) *Attorney, Agent, or Firm* — McGlew and Tuttle, P.C.

(57) ABSTRACT

The invention relates to the preparation of novel bi- or tri-metallic silicate micro-porous and/or meso-porous materials based on cerium, nickel, copper and/or zinc on a porous silicate framework matrix to use its molecular sieve effect to target preferentially the acidic organic molecules present in
(Continued)

hydrocarbon feedstocks like crude oil, bitumen, VGO and the like. The chosen metals are selected based on their ability to activate steam and transfer oxygen for completing the oxidation of carboxylic compounds or decarboxylating them. These composite materials can be prepared under hydrothermal synthesis conditions in order to produce suitable porous solids where the metals are well dispersed and preferentially distributed inside the channels of the silicate framework where they can interact only with the molecules that can go inside the channels. According to the invention, the metallo-silicate materials are prepared under hydrothermal synthesis conditions Modification of the physical-chemical properties of the porous silicate materials can be accomplished by partial replacement of the silicon atoms by cerium, nickel, copper and/or zinc atoms in the material by isomorphous substitutions of these elements in a synthesis gel or by post-synthesis modifications like ion-exchange or impregnation/deposition. The materials can be used as prepared catalysts for the steam catalytic reduction of the total acid number (TAN) in acidic crude oil feedstocks and in the presence of steam and/or $CO_2$ as oxidizing agent to complete decarboxylation and to keep the metal oxide active sites from reducing and deactivating as well as other partial upgrading reactions.

42 Claims, 44 Drawing Sheets

(51) Int. Cl.
| | |
|---|---|
| C10G 29/16 | (2006.01) |
| C01B 39/48 | (2006.01) |
| B01J 29/04 | (2006.01) |
| B01J 29/072 | (2006.01) |
| B01J 23/00 | (2006.01) |
| B01J 23/83 | (2006.01) |
| B01J 35/00 | (2006.01) |
| B01J 35/10 | (2006.01) |
| B01J 37/10 | (2006.01) |
| B01J 37/00 | (2006.01) |
| C01B 37/00 | (2006.01) |
| C10G 3/00 | (2006.01) |
| B01J 27/22 | (2006.01) |
| B01J 37/08 | (2006.01) |
| C01B 37/02 | (2006.01) |

(52) U.S. Cl.
CPC .......... *B01J 29/072* (2013.01); *B01J 35/0006* (2013.01); *B01J 35/108* (2013.01); *B01J 35/1061* (2013.01); *B01J 37/10* (2013.01); *C01B 37/005* (2013.01); *C01B 39/48* (2013.01); *C10G 3/49* (2013.01); *C10G 11/05* (2013.01); *C10G 29/04* (2013.01); *C10G 29/16* (2013.01); *B01J 37/082* (2013.01); *B01J 2229/183* (2013.01); *B01J 2229/20* (2013.01); *B01J 2229/42* (2013.01); *B01J 2523/00* (2013.01); *C01B 33/185* (2013.01); *C10G 2300/202* (2013.01); *C10G 2300/203* (2013.01); *C10G 2300/302* (2013.01); *C10G 2300/308* (2013.01); *Y02P 30/20* (2015.11)

(58) Field of Classification Search
CPC .. B01J 35/0006; B01J 35/1061; B01J 35/108; B01J 37/10; B01J 37/005; C10G 9/49; C10G 11/05; C10G 29/04; C10G 29/16
See application file for complete search history.

(56) References Cited

U.S. PATENT DOCUMENTS

| | | |
|---|---|---|
| 4,698,449 A | 10/1987 | Imai et al. |
| 6,063,266 A | 5/2000 | Grande et al. |
| 7,504,023 B2 | 3/2009 | Chamberlain |
| 9,272,272 B2 * | 3/2016 | Trukhan ............ B01D 53/9418 |
| 2009/0236263 A1 | 9/2009 | Babic-Samardzija et al. |

OTHER PUBLICATIONS

Naphthenic Acid Corrosion Review. http://www.setlaboratories.com/nac/tabid/79/ Default.aspx (downloaded on May 2012).
Martel et al., Aircraft Turbine Engine Fuel Corrosion Inhibitors and Their Effects on Fuel Properties. Report AFAPL-TR-74-20 (Air Force Aero Propulsion Laboratory, Wright-Patterson AFB. OH, 1974, 34pp). Available form NTIS (AD-787 191).
16 ATSM D664. Standard Test Method for Acid Nnumber Petroleum Products by Potentiometric Titration.
Strausz, O. P., Lown. E. M., The Chemistry of Alberta Oil Sands, Bitumens and Heavy Oils. AERI editions, Calgary, AB. Canada, 12[2.2.1], 298-305, 2003.
Laredo, G. C., Lopez, C. R., Alvarez, R. E., Cano, J. L., Naphthenic acids, total acid number and sulfur content profile characterization in Isthmus and Maya crude oils. Fuel, 83, 1689-1695. 2004.
Nascimento, L.R., Reboucas, L. M. C., Koike, L., Reis, F DE A.M., Soldan, A. L., Cerqueira, J. R., Marsaioli, A. J., Acidic biomarkers from Albacora oils, Campos basin, Brazil. Org. Geochem., 30, 1176-1191. 1999.
American Society for Testing and Materials (ASTM). ASTM D1159. Standard Test Method for Determination of Bromine Numbers of Petroleum Distillates and Commerical Olefins by Electrometric Titration. ASTM: West Conshohocken, PA, 2011.
CCQTA-Olefins in Crude Oil by Protein NMR Method (Canadian Crude Quality Technical Association, Nov. 1, 2005), also identified as MAXXAM: CAPP Olefin by NMR version 1.04, Nov. 2005 (Canadian Association of Petroleum Producers).
Meynen, V., Cool, P., Vansant, E.F., Verified Syntheses of Mesoporous Materials. Micropor. Mesopor. Mater., 125, 170-223, 2009.
Turnbull, A., Slavchieva, E., Shone, B., Factors controlling naphthenic acid corrosion. Corrosion, 54(11), 922-930. 1998.
Zhang, A., Ma, Q., Goddard, W. A., Tang, Y., Improved Processes to Remove Naphthenic Acids. Annual Progress Technical Report Oct. 1, 2002-Sep. 30, 2003 CalTech, CA-USA. Submitted to DOE under contract DE-FC26-02NT15383 (11pp).
Barrer, R. M., Chemical Nomenclature and Formulation of Compositions of Synthetic and Natural Zeolites. Pure & Appl. Chem., 51, 1091-1100. 1979.

\* cited by examiner

| CATALYST | | ACID CONVERSIONS | | | | |
|---|---|---|---|---|---|---|
| MIXTURE WT. (g) | NAME | WT. (mg) | CPCA | CHCA | BA | C5H11-CHCA | C7H15-BA |
| 2.4870 | NONE | | 16.00 | 15.00 | 14.50 | 11.30 | 7.00 |
| 2.5261 | Ni/Al$_2$O$_3$ | 25.80 | 5.00 | 5.70 | 15.00 | 10.70 | 4.80 |
| 2.5357 | Ni/SiO$_2$ | 25.50 | 21.50 | 18.90 | 15.40 | 16.00 | 8.70 |
| 2.5511 | NA-Cat-3 | 25.50 | 70.80 | 70.50 | 91.20 | 92.40 | 97.50 |
| 2.3755 | Cu/Al$_2$O$_3$ | 27.20 | 0.00 | 0.00 | 5.50 | 2.40 | 5.30 |
| 2.3806 | Cu/SiO$_2$ | 25.00 | 12.80 | 10.50 | 10.40 | 7.10 | 3.50 |
| 2.4960 | NA-Cat-4 | 25.40 | 86.50 | 83.90 | 92.40 | 93.20 | 98.00 |
| 2.5432 | NA-Cat-1 | 25.50 | 39.00 | 46.70 | 78.80 | 81.60 | 92.50 |

*CPCA, CYCLOPENTANE CARBOXYLIC ACID; CHCA, CYCLOHEXANE CARBOXYLIC ACID; BA, BENZOIC ACID (PRIOR ART)
FIGURE 1

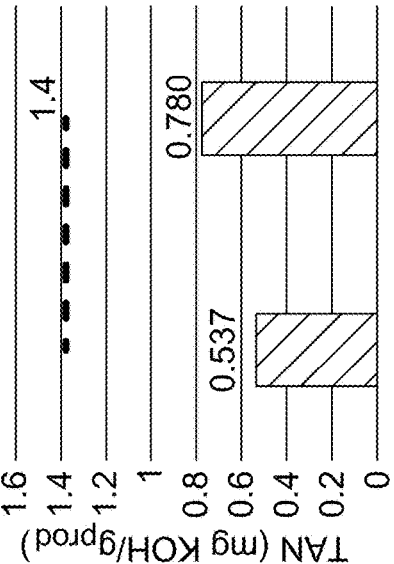
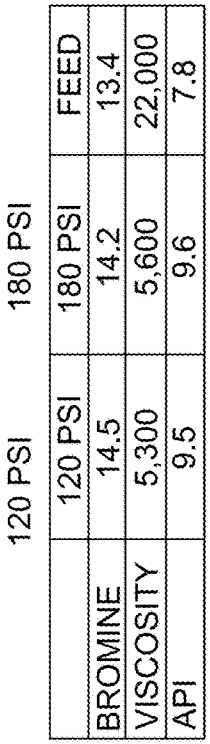
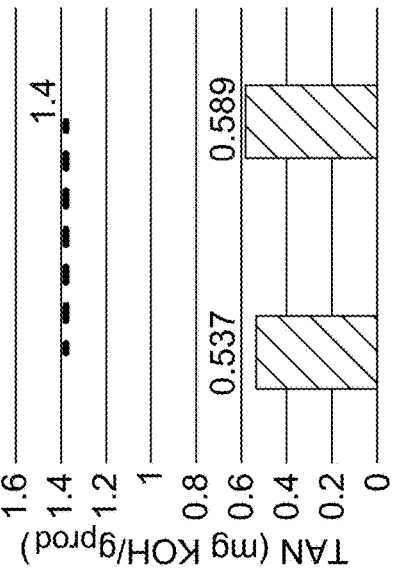
FIGURE 23

METALLO-SILICATE CATALYST (MSC) COMPOSITIONS, METHODS OF PREPARATION AND METHODS OF USE IN PARTIAL UPGRADING OF HYDROCARBON FEEDSTOCKS

FIELD OF THE INVENTION

The present invention relates to (micro- and/or meso-) metallo-silicate catalyst (MSC) compositions, methods of preparing those compositions and methods of using those compositions in catalytic partial upgrading of hydrocarbon feedstocks.

Generally, the compositions include bi- or tri-metallic combinations of cerium, nickel, copper and zinc within a micro-porous and/or meso-porous silicate framework. Suitable silicate frameworks are for instance: a) silicate frameworks including any siliceous micro-porous structure having a pore size less than 2 nanometers, for instance, the siliceous MFI, MEL, MTW, FER, MEI, MTT, MWW, STT, SGT or RTE structures (using the three letter code rules set up by the International Union for Pure and Applied Chemistry—IUPAC—in 1978 [1] and adopted for each framework type by the International Zeolite Association (IZA)), b) any ordered siliceous meso-porous structure (OMS) with pore sizes between 2 and 50 nm as defined by IUPAC and which are usually referred in the literature by letter codes that may be followed by a number [2] like SBA-15, SBA-1, SBA-2, SBA-3, HMS, MCM-41, MCM-48, MCM-50, MSU, TLCT, or CMK structures, c) any disordered siliceous meso-porous structure (DMS) and d) combinations of micro and meso-porous structures. The invention further describes catalytic materials composed of a porous silicate framework, as described above, and doped with a combination of metals including Ce—Ni, Ce—Cu, Ce—Zn, Ce—Ni—Cu, Ce—Ni—Zn or Ce—Cu—Zn which are incorporated into a synthesis gel of the crystalline or amorphous silicate framework.

The catalytic materials are prepared using suitable sources of each component and include the steps of preparing an amorphous gel; allowing the amorphous gel to undergo a suitable hydrothermal reaction transformation to generate a crystalline or amorphous micro-porous, an ordered or disordered meso-porous amorphous solid or a combination of all of them depending on the employed synthesis conditions.

Further still, the invention relates to methods for processing produced hydrocarbons, such as bitumen or heavy oils as well as catalytic processes to facilitate the reduction of total acid number (TAN), viscosity, density, sulfur content, or any combination thereof, in produced hydrocarbons. The invention further describes the use of the material compositions in processes of steam catalytic removal of Total Acid Number (TAN) present in hydrocarbon feedstocks or the $CO_2$ assisted catalytic removal of TAN in hydrocarbons.

The present invention further relates to novel synthetic compositions including combinations of molybdenum and/or tungsten carbides with suitable solids like hydrotalcites, metal-doped hydrotalcites, pyroxenes, metal-doped pyroxenes, clays, metal-doped clays, zeolites, metal-doped zeolites, silicas, metal-doped silicas, aluminas, metal-doped aluminas, silica-aluminas, metal-doped silica-aluminas, metal oxides and mixtures thereof. Such novel synthetic compositions are prepared using suitable sources of each component and include the steps of preparing an amorphous carbide precursor; allowing the amorphous carbide precursor to undergo a suitable thermal reaction transformation to generate nano-crystalline molybdenum and/or tungsten carbides; the incorporation of the nano-crystalline carbide into suitable carrier like hydrotalcites, metal-doped hydrotalcites, pyroxenes, metal-doped pyroxenes, clays, metal-doped clays, zeolites, metal-doped zeolites, silicas, metal-doped silicas, aluminas, metal-doped aluminas, silica-aluminas, metal-doped silica-aluminas, metal oxides and mixtures thereof; binding the materials compositions into suitable shapes and sizes for their use in catalytic beds.

The invention further describes the use of the novel synthetic compositions in processes of steam catalytic cracking for the upgrading of hydrocarbon feedstocks.

BACKGROUND OF THE INVENTION

Produced hydrocarbons, and in particular heavy hydrocarbons such as bitumen, are often subjected to one or more upgrading processes between the stages of field production and commercial product. This is because various produced hydrocarbons often have one or more undesirable properties which interfere with their transportation and/or use as a feedstock in various refining processes. For example, produced hydrocarbons can be acidic (i.e. have high TAN (total acid number)), which can cause damage to production, transport, and processing equipment and interfere. Produced hydrocarbons such as bitumen can also be viscous, dense, or have a relatively low API (American Petroleum Institute) gravity, which can prevent or complicate transportation and processing operations. Produced hydrocarbons can also contain sulfur (e.g., in the form of $H_2S$ or mercaptans), for which produced hydrocarbons often need to be treated to meet regulatory emissions or waste disposal requirements and pipeline specifications for oil transportation. As such, processing steps to reduce TAN, viscosity, density or sulfur content each represent common upgrading processes in the oil industry. Produced hydrocarbons having reduced TAN, reduced viscosity, reduced density, reduced sulfur content, or any combination thereof, may be considered as being upgraded or partially upgraded, and thus may be a more valuable product as compared to the raw produced hydrocarbon recovered from the reservoir.

Corrosion of metal components derived from organic acids present in produced hydrocarbon streams is an undesirable phenomenon initially studied in relation to lubricants and the effects of organic acids on metal surfaces [1-3]. Detailed studies have been carried out regarding aircraft engines, and the dramatic effect that metal failures can pose in these areas [4]. Acidity is routinely determined by titration of acidic components with KOH, following standard procedures for TAN (Total Acid Number) [5] determination. Petroleum, particularly heavy oil and bitumen, can have substantial amounts of acidic compounds [6]. Typical acidic species present in oils in varying proportions are carboxylic acids, phenols, mercaptans and sulfones.

The main acidic species found in some heavy/extra-heavy oil distillation cuts belong to the carboxylic acid (about 50-60% wt) and phenolic (about 10-20% wt) families [8]. It is widely accepted that oils or derived fractions having TAN higher than about 0.5 mg KOH/g sample are "Acidic", and may be prone to cause corrosion problems on steel facilities [7], and could contain a high concentration of naphthenic acids (NA) that can adversely impact the reliability and operations of refineries. Commonly reported problems may include corrosion, desalter glitches, fouling, catalyst poisoning, product degradation, and/or environmental discharge, among others. For this reason, crudes with high TAN (greater than about 1 mg KOH/g sample, which is typically characterized as an acidic crude) would be subject to a discount. However, a clear correlation between TAN, corrosivity, and carboxylic acids has proven elusive, probably because the acidic molecules in each oil may vary as a result of its origin, geochemical maturation pathway, and other phenomena like bacterial degradation, air/water oxidation, and artifacts derived from production operations [7, 8]. Findings suggest that the whole acidic fractions contain most of the corrosive potential [9]. A complex filling/biodegradation history may be responsible for such high TAN numbers in bitumen [9].

Naphthenic corrosion may be particularly important around the boiling temperature of acidic compounds responsible for the phenomenon. These compounds normally maximize their concentration in the Vacuum Gas Oil (VGO) range, but their distribution can vary from oil to oil. FIGS. 1(A) and 1(B) present the evolution of TAN with the fraction's boiling range, along with other properties for two different samples of South American heavy oils. The results show the previously discussed TAN concentration around gas oil distillation fractions.

Various methods have been employed for reducing TAN and may include, for example, caustic washing to remove naphthenic acids in gasoline and kerosene. However, this approach can fail when applied to heavier feedstocks with high TAN due to the formation of very stable emulsions. An approach by refineries involves reacting acid content with alcohols to reduce TAN; however, this process is reversible, which can diminish its effectiveness once the oil is further treated/refined. Acids can be destroyed by thermal treatment or cracking to generate carbon dioxide gas and low acid hydrocarbon content, however, some undesirable side reactions can occur resulting in the formation of sediments and gums that negatively impact the value of the crude. Adsorption on solid surfaces and the use of solvent extraction can also be approaches to extracting naphthenic acids from oil; however, losses in profits due to overall volume reduction can make such processes unattractive. Generally, treatments and processes for reducing high acid content in produced hydrocarbons add time and expense to transportation and refining operations.

Totally eliminating the acidity present in a crude oil is generally considered difficult and expensive. Due to the fact that TAN distribution is usually centered in the VGO fraction, fractionation of the heavy oil to separately treat the more acidic stream may require cutting the heavy atmospheric gas oil, and all the vacuum gas oil (about 280-540° C.). If the target were to reach a TAN lower than about 1 mg KOH/g oil, an average TAN reduction of the processed fraction higher than about 80% may be needed in this case. For most heavy oils, this would imply treating about 40% of the oil. Considering the properties distributions, the heavy oil fractioning to separately treat the more acidic stream would require cutting the ~250° C.+ Heavy atmospheric gas oil and all the VGO.

For a medium crude oil, the same TAN reduction target for the whole oil would imply cutting the entire ~220° C.+ fraction, and treating practically the whole oil (about 90% of it), with TAN reduction levels of about 65%, and thus, lower severity.

The reduction of TAN for acidic crude oils has been studied based either on acid removal through adsorption over solid sorbents or via their catalytic enhanced decomposition, most typically via hydroprocessing [11]. Supported catalysts containing Ba, Sr, Cu, Ag and Ni active metals were described for the decarboxylation reaction of small compounds (i.e., 6-7 carbon atoms) containing naphthenic/aromatic acids, with noticeable conversions reported in some cases up to 98% (as evolved $CO_2$) (see FIG. 1) [11].

Furthermore, acids removal over metal salts (Na and K carbonates and Na borate) have been reported, however using large amounts (20 wt %) of these solids [12], which is deemed suitable for academic purposes but not for industrial applications. An industrial solid, spent FCC catalyst, has been also proposed for TAN reduction, also in a large relative ratio of solid/sample=5/1 [13A]. TAN reduction using solid adsorbent has been carried out using MgO and CaO; however, determined reduction levels have been considered low (i.e. about 23% TAN reduction in 30 minutes at 360° C. and 361 bar, unpublished results) the apparent reason being competition for the adsorption sites from heavier molecules. Reaction under the effect of hydrogen transfer compounds already described in the patent literature [14A] has been considered as another plausible alternative for getting rid of acidic components from hydrocarbon streams however this path would not escape from deactivation and competition from heavy molecules present in the feedstock which would eventually reduce the TAN benefits and deactivate the catalytic sites.

Separating the acidic fraction can be performed in two steps for example via an old process used in Shell Oil Company refineries [15A]. This process consists on spreading a solution of NaOH inside a vacuum distillation column to form organic salts with surfactant capabilities (emulsification), which allows separating the heavier emulsion fraction inside online electrostatic tanks, from which the naphthenic acids are latter obtained and purified by treatment with concentrated sulfuric acid. This process would require, in addition to the investment in a vacuum distillation unit, massive handling of dangerous chemicals, further used water treatment and the disposition of a naphthenic acid stream of extremely high TAN (typically >25 mgKOH/g oil). This process has been discontinued from refineries since late last century due to operating difficulties caused by inverse emulsions and environmental issues.

As noted above, achieving TAN reduction in produced hydrocarbons, such as full Athabasca bitumen, with reduced, lowered and/or minimal investment in facilities on site has been difficult. Avoiding, reducing or minimizing processes that involve separation by distillation [10] are of interest, due to the high investment costs, high capital expenditures, and increased complexity these operations may imply for field operation. TAN reduction using solid adsorbent has been carried out using MgO and CaO; however, determined reduction levels have been considered low (i.e., about 23% TAN reduction in 30 minutes at 360° C. and 361 bar), using a commercially developed MgO adsorbent with one apparent reason being competition for the adsorption sites from heavier molecules.

Reaction under the effect of hydrogen transfer compounds already described in the patent literature [13] has been considered as another plausible alternative for getting rid of acidic components from hydrocarbon streams, but this path would not escape from deactivation and competition from heavy molecules present in the feedstock which would eventually reduce the TAN benefits and deactivate the catalytic sites.

Applying more selective chemical paths in the absence of heavier components (i.e. adsorption, catalysis, electrochemistry) might be an option as well; however this would also involve distillation to separate the acid rich lumped fraction. Some other hydroprocessing schemes involve the use of conventional hydrotreatment of the whole crude oil to reduce TAN [10].

Currently, totally eliminating the acidity present in a crude oil is difficult and expensive. When considering the TAN distribution in FIGS. 2(A) and 2(B), the heavy oil fractioning to treat (separately) the more acidic stream would require cutting almost the whole 343° C.+ fraction, which includes light gas oil (LGO) and the atmospheric residue. If the target were to reach a TAN lower than 1 mg KOH/g oil, an average TAN reduction of the processed fraction of higher than 80% would be needed. For this bitumen, it would imply treating 86% of the oil (9 vol % LGO+76.95 vol % atmospheric residue). Another case could be to distill the whole crude, and process only those fractions with TAN higher than 1 mg KOH/g oil. In this case LGO, heavy gas oil (HGO), and VGO would have to be treated. This would imply treating about 42% of the oil, and a larger investment due to fractionation of the bitumen, to obtain vacuum fractions (See FIG. 2(B)). These examples illustrate the relevance of the information in FIGS. 2(A) and 2(B) for acidity reduction hydroprocessing and present the evolution of TAN with the fraction's boiling range for a sample of crude oil.

TAN Determination

As previously mentioned, naphthenic corrosion is particularly important around the boiling temperature of acidic compounds responsible for the phenomenon. These compounds normally maximize their concentration in the Vacuum Gas Oil (VGO) range, but their distribution can vary from oil to oil.

TAN determination is currently carried out via standard ASTM D664 method [16]. Accuracy determined with known samples is reasonable for a TAN spanning the 1-4 range (FIG. 3). Fortunately, most samples of interest show TAN values comprised within this range. Outside of these limits, accuracy becomes an issue.

Repeatability is another issue implicit with the analysis methodology. Analysis of feedstocks and products carried out during the same session (same day), was found to overcome the problem as shown by a TAN mimic reduction simulated by dilution with an inert base oil. This suggests that great care should be taken when comparing TAN results for wide sets of samples, especially those analyzed during long periods of time, particularly those arising from different laboratories.

Other issues around acidic hydrocarbons and/or benefits of effective TAN reduction can include:

Processes that involve NA separation by distillation [10] are typically associated with high investment costs and increased complexity for field operation.

Extracted bitumen and heavy oils may require transportation to a geographically distant refinery or processing plant. Such transport may be done through a pipeline. Unfortunately, the relatively high viscosity of these produced hydrocarbons can make pipeline transport difficult. Transportation via pipeline requires that the hydrocarbons being transported meet specific requirements, such as the API (American Petroleum Institute) gravity and viscosity requirements. Extracted hydrocarbons, such as bitumen, typically do not meet the transportation specifications due to high viscosity, and as such are typically further processed, upgraded, or diluted prior to pipeline transportation.

The processing of the extracted hydrocarbons to meet the specific transportation specifications commonly involves mixing the extracted hydrocarbons with a diluent. The diluent may include natural gas condensate, refined naphtha or synthetic crude oil (SCO). The diluent either needs to be produced on site, which may require expensive processing equipment, or must be produced elsewhere and transported to site. The cost of diluent is added to the cost of extracting and transporting the hydrocarbons.

As noted, produced hydrocarbons may have a TAN number as high as about 10-12 mg KOH/g sample in some parts of the world. For transport and refinement, it is generally desirable to have a TAN less than about 1 mg KOH/g sample. In North America, TAN of about 1.5-3 mg KOH/g sample is common in produced hydrocarbons. A TAN greater than about 1 mg KOH/g sample can reduce the value of produced hydrocarbons and complicate transportation of the produced hydrocarbons to a refining facility.

Accordingly, it desirable for a crude oil to have a low TAN number in order to meet the requirements of various refineries. As a general guideline those skilled in the art would understand that an "acid crude oil" would typically be one with about a TAN >0.5 mg KOH/g, while a "High TAN crude" would typically be one with a TAN >1.0 mg KOH/g. Thus it is desirable for a crude oil to have a TAN of <1.0 mg KOH/g, and even more desirable to have a TAN of <0.5 mg KOH/g.

Further still, produced hydrocarbons, such as bitumen and heavy oils, such as those found in Alberta, Canada, and elsewhere, may be viscous mixtures of saturated and aromatic hydrocarbons and other naturally occurring components including paraffins, naphthenes, resins-asphaltenes with variable distributions of heteroatoms such as sulphur, oxygen and nitrogen in hydrocarbon compounds as well as metal-organic compounds. Many of these hetero-compounds have an important role in the molecular cross-linking that naturally increases the viscosity of bitumen and heavy oils. This is due to polar interactions between sulphur and oxygen compounds, usually with acidic character, with nitrogen and poly-aromatic compounds with more of a basic character. By reducing or eliminating at least one of the polar families of compounds present in the oil the molecular cross-linking can be substantially reduced. Therefore, the reduction of TAN has a double benefit for the heavy hydrocarbons production industry, on one hand the impact on corrosion downstream of the production activity (upgrading and refining) is sensibly reduced, which reflects positively in the price of the oil but also reducing TAN will reduce viscosity which impacts positively in the reduction of diluent needs for transportation of heavy hydrocarbons to the refining centers.

Accordingly, a need exists for additional, alternative, and/or improved processes for upgrading, or partially upgrading, produced hydrocarbons such as whole crude oil, or bitumen.

In addition, there has been a need for new catalytic materials that are effective in treating heavy oils for TAN reduction. More specifically, there has been need for catalytic materials having both compositional and morphological properties that make them effective for TAN reduction.

Further still, upgrading of hydrocarbon feedstocks can be accomplished by hydrogenation and cracking of large organic molecules contained in the original feedstock with the help of a high partial pressure of hydrogen and temperatures. This process is generally known as hydrocracking. The use of hydrogen at high pressure not only increases the cost of the required equipment but also, impose strict safety policies. If the source of hydrogen could be provided from another source, like water, some of the economics and safety issues relating to hydrogen use could be avoided. However, innovation in the development of catalysts that can extract the hydrogen from the water and use it for in situ upgrading of hydrocarbon feedstocks must be accomplished.

Conventional steam cracking is an uncatalyzed cracking process used in the petrochemical industry to break down hydrocarbons increasing the yield of olefins. This process works at atmospheric pressure and requires very high temperatures to induce the thermal cracking of the gaseous hydrocarbons. However, in this process, steam is added to the mixture of gaseous hydrocarbons to lower the partial pressure of the hydrocarbons to a point at which polymerization and condensation reactions of the produced olefins are reduced. In this case, the steam acts as a diluent of the gaseous hydrocarbons and inhibits carbonization (coke formation) but does not supply hydrogen to the products.

Reference [1B] shows a process, patented by Phillips Petroleum Co, for upgrading crude oils in which relates to the in situ generation of hydrogen in contact with a hydrocarbon to thereby produce materials of low molecular weight and of reduced carbon residue and sulfur content. In the process, water is introduced with the hydrocarbon feedstock together with a catalyst system containing at least two components where one of the components promotes the generation of hydrogen from water and the other component promotes reactions between the generated hydrogen and hydrocarbons in the feedstock to produce an upgraded hydrocarbon from which liquid products of reduced molecular weight, carbon residue and sulfur content can be separated. The production of hydrogen in the presence of water and the crude oil is by means of a water gas shift reaction. The first component of the catalyst system are carboxylic acid salts of barium, calcium, strontium and magnesium which are soluble in the crude oil in the quantities employed. The second component of the catalyst system are carboxylic salts of nickel, cobalt and iron which are soluble in the crude oil to the extent to which they are added thereto.

Generally, in this process there is no catalytic bed and the water to crude oil volumetric ratio is preferably between 0.2 to about 2.5. The preferred pressure and temperature for the process is 500 to 2500 psig and 790 to 835° F., respectively.

From the above, there has also been a need for the use of the material compositions that are effective in processes of steam catalytic cracking for the upgrading of hydrocarbon feedstocks.

SUMMARY OF THE INVENTION

In accordance with the invention, porous metallo-silicate compositions (MSCs) effective for TAN reduction that are unique in chemical composition, but also, with regards to the morphological properties and in particular, their ability to act as molecular sieves are described. The catalytic testing shows high activity and selectivity to target the removal of the acidic moieties from feedstocks like vacuum gasoil or bitumen. The MSCs may be effective in other partial upgrading reactions including viscosity, density, residuum, asphaltene and sulfur content reduction of a produced hydrocarbon feedstock.

In accordance with the invention (first aspect), a porous metallo-silicate composition (MSC) having a molar composition: $SiO_2 : mCeO_2 : nXO$ is described wherein X is a divalent element selected from the group consisting of nickel, copper, zinc and combinations thereof; m is between about 0.001 and 0.5; n is between about 0.001 and 0.5; and wherein the composition has a siliceous micro and/or meso porous structure. In various embodiments, the porous structure is a MFI, MEL, MTW, FER, MEI, MTT, MWW, STT, SGT or RTE structure as defined by the International Union for Pure and Applied Chemistry (IUPAC) and the International Zeolite Association (IZA).

In one embodiment, the porous structure is any ordered siliceous meso-porous structure (OMS) having pore sizes between about 2 and about 50 nm and as defined by the International Union for Pure and Applied Chemistry (IUPAC). In this case, the porous structure may be a SBA-15, SBA-1, SBA-2, SBA-3, HMS, MCM-41, MCM-48, MCM-50, MSU, TLCT, or CMK structure.

In another embodiment, the porous structure is a disordered siliceous meso-porous structure (DMS) or a combination of disordered and ordered structures.

In one embodiment, cerium is incorporated within the framework and/or porous channels of the porous structure.

In various embodiments, the compositions described above (first aspect) may include the following or combinations thereof:
- X is incorporated within the framework or porous channels of the porous structure.
- the composition is a powder and further comprises at least one additive admixed with the composition to enhance any one of the catalytic behavior, morphological properties and/or mechanical strength of the composition or combinations thereof.
- the additive is a metal carbide in a concentration of greater than about 0.001 wt% and less than about 40 wt% of the composition.
- the metal carbide is any one of a molybdenum and/or tungsten carbide or combinations thereof.
- the composition further includes a carrier selected from any one of a hydrotalcite, metal-doped hydrotalcite, pyroxene, metal-doped pyroxene, clay, metal-doped clay, zeolite, metal-doped zeolite, silica, metal-doped silica, alumina, metal-doped alumina, silica-alumina, metal-doped silica-alumina, metal oxides carbons and combinations thereof.
- the carrier is about 5 to about 95wt% of the composition.
- the additive is a clay, alumina, silica, hydrotalcite, metal-doped-hydrotalcite, other metal hydroxides, carbon or combinations thereof.
- the porous structure is effective as a catalyst for steam and/or $CO_2$ catalytic total acid number (TAN) reduction of hydrocarbon feedstock of produced hydrocarbons.
- nano-crystalline molybdenum carbide and/or tungsten carbide materials and a carrier and/or binder admixed to the MSC.
- the carrier is a hydrotalcite, metal-doped hydrotalcite, pyroxene, metal-doped pyroxene, clay, metal-doped clay, zeolite, metal-doped zeolite, silica, metal-doped silica, alumina, metal-doped alumina, silica-alumina, metal-doped silica-alumina, metal oxide and mixtures thereof wherein the metal-doped elements may consist of Ce, V, Ni, Cu, Zn in proportions from 0 to 30 wt% by weight of each of them in the carrier.

In another aspect (second aspect), the invention provides a porous metallo-silicate composition prepared from a mixture having a molar composition: $aM_2O : b R : SiO_2 : mCeO_2 : nXO : yH_2O : zAC$ wherein M is an inorganic cation selected from sodium, potassium, lithium, cesium, rubidium or a mixture thereof, R is an organic moiety having structure directing properties for porosity, a is from 0 to 10 and b is from 0.01 to 0.2, m is between 0.001 and about 0.5; n is between 0.001 and about 0.5; y is from 1 to 300; z is from 0.1 to 3; X is nickel, copper or zinc or a combination thereof; AC is an acid source; and wherein after a hydrothermal treatment the composition has a silicate framework having a micro and/or meso porous structure.

In various embodiments, the compositions described above (second aspect) may include the following or combinations thereof:

M is sodium.

R is a tetraalkylammonium salt and/or a hydroxide of the tetraalkylammonium.

the cerium source is selected from a soluble salt, hydroxide and/or oxide of cerium.

X is a soluble salt, hydroxide and/or oxide of nickel, copper and/or zinc.

M is a salt, oxide and/or hydroxide of sodium, potassium, lithium, cesium and/or rubidium.

AC is a sulfuric acid, nitric acid or hydrochloric acid.

the MSC is in a calcined form.

The MSC is in a calcined form and has a porosity enabling steam and/or $CO_2$ catalytic TAN reduction of a hydrocarbon feedstock of produced hydrocarbons.

$XO/SiO_2$ is about 0.001 to 0.5 and preferably about 0.01 to 0.5.

$CeO_2/SiO_2$ is about 0.001 to 0.5 and preferably about 0.01 to 0.5.

$M_2O/SiO_2$ is about 0.01 to 10 and preferably about 0.1 to 5.

$R/SiO_2$ is about 0.01 to 2 and preferably about 0.05 to 1.

$AC/SiO_2$ is about 0.1 to 3 and preferably about 0.3 to 2.

$H_2O/SiO_2$ is about 1 to 300 and preferably about 10 to 200.

R is removed by calcination.

M is removed by ion-exchange.

The MSC includes nano-crystalline molybdenum carbide and/or tungsten carbide materials admixed to the MSC together with a carrier and/or binder.

In another aspect (third aspect) the invention provides a method of preparing a composition as described above (first aspect) comprising the steps of: a) preparing an acidic gel media containing cerium, divalent elements and silicon wherein the cerium, divalent elements and silicon have a molar relationship $SiO_2$: $mCeO_2$: nXO wherein X is a divalent element selected from nickel, copper, zinc and combinations thereof, m is from about 0.001 to about 0.5 and n is from about 0.001 to about 0.5 b) increasing the pH of the acidic media to a pH effective to cause anchoring of the metal elements of step a within a silicate framework, and, c) forming the MSC by hydrothermal treatment.

In various embodiments, the methods described above (third aspect) may include the following or combinations thereof:

a temperature of reaction to produce the MSC is between room temperature and about 250° C.

a time of reaction of step b. to produce the MSC is between about 1 hour and about 30 days.

the method further includes the step of after step c) admixing nano-crystalline molybdenum carbide and/or tungsten carbide materials to the MSC together with a carrier and/or binder.

the step of admixing may include preparing an amorphous carbide precursor with a metal molybdenum and/or tungsten to carbon ratio (M/C) between 1 to 10 and allowing the amorphous prepared carbide precursor to undergo a suitable thermal reaction transformation to generate nano-crystalline molybdenum and/or tungsten carbides in the nanometric range (1 to 100 nm).

In other aspect (fourth aspect), the use of the compositions described above for reduction of the total acid number (TAN) of a hydrocarbon feedstock of the produced hydrocarbons is described, said use including contacting the hydrocarbon feedstock with a porous metallo-silicate composition as defined together with steam and/or $CO_2$ under reaction conditions to reduce the original TAN number of the hydrocarbon feedstock to a desired value.

In various embodiments the original viscosity, density, residuum, ashaltene, sulfur content or any combination thereof of the hydrocarbon feedstock is reduced.

In one embodiment, the silicate framework has a pore size enabling the catalytic removal of acidic moieties from heavy hydrocarbons under hydroprocessing conditions.

In yet another aspect (fifth aspect), a method of preparing a porous metallo-silicate composition (MSC) is described, the method comprising the steps of: a) preparing an amorphous gel having a molar composition: $aM_2O$: b R: $SiO_2$: $mCeO_2$: nXO: $yH_2O$: zAC wherein M is an inorganic cation selected from sodium, potassium, lithium, cesium, rubidium or a mixture thereof, R is an organic moiety having structure directing properties for porosity, a is from 0 to 10 and b is from 0.01 to 0.2, m is between 0.001 and about 0.5; n is between 0.001 and about 0.5; y is from 1 to 300; z is from 0.1 to 3; X is nickel, copper or zinc or a combination thereof AC is an acid source; and b) allowing the amorphous gel to undergo a hydrothermal reaction transformation to generate a silicate framework wherein the framework is a crystalline, amorphous micro-porous, an ordered or disordered meso-porous amorphous silicate framework or a combination thereof. In various embodiments, Ce—Ni, Ce—Cu, Ce—Zn, Ce—Ni—Cu, Ce—Ni—Zn or Ce—Cu—Zn are doped into the amorphous gel of the crystalline or amorphous silicate framework.

In another aspect (sixth aspect) a method for partially upgrading a feedstock of produced hydrocarbons is described, the method comprising the step of: exposing the produced hydrocarbons to a micro-porous or meso-porous catalyst structure having an embedded catalytic phase, which partially upgrades the produced hydrocarbons under conditions to promote partial upgrading.

In various embodiments, the method described above (sixth aspect) may include the following or combinations thereof:

the catalyst is a combination of transition metals with rare earth elements and/or earth alkali and/or alkali metals doped inside the micro-porous or meso porous structure and having a pore size reducing exposure of the catalytic material to produced hydrocarbon molecules.

the pore size excludes molecules having an effective molecular diameter greater than 50 nm.

the catalytic phase is a metallo-silicate material, a bi- or tri-metallic silicate material, nickel, copper or cerium based or an oxide thereof or metal oxide-based catalyst.

the catalyst structure comprises a porous support network enabling contact with some acid molecules while preventing contact with at least some other components of produced hydrocarbons.

the catalytic phase catalyzes decarboxylation of a carboxylic acid present in the produced hydrocarbons.

the catalytic phase catalyzes decarboxylation of a carboxylic acid, and generates oxygen vacancies in the catalytic phase.

the method further includes the step of exposing the catalytic phase to an oxygen source to regenerate the oxygen vacancies to regenerate the catalytic phase.

the catalyst structure includes any one of or a combination of micro-porous and/or meso-porous zeolite frameworks, silicate-based frameworks, mordenite framework inverted (MFI) structures, aluminosilicate zeolite materials such as Zeolite Socony Mobil-5 (ZSM-5), or non-acidic silicate framework structures.

the silicate-based frameworks are selected from any one of or a combination of siliceous micro-porous materials including siliceous MFI, MTW, FER, MEI, MTT or MWW structures, any ordered siliceous meso-porous material such as SBA-15, MCM-41 or MCM-48 materials, any disordered siliceous meso-porous material, or any combination thereof.

the method includes the step of integrating the catalyst structure into a fixed bed reactor.

partial upgrading of the produced hydrocarbons results in a reduction in TAN, viscosity, density, sulfur content, or any combination thereof.

partial upgrading is TAN reduction by acid decarboxylation.

the feedstock is produced hydrocarbons having a high TAN and the method further comprises the step of exposing the produced hydrocarbons to the catalyst structure under conditions sufficient to lower TAN to less than 1 mg KOH/g by enabling TAN molecules to contact the catalytic phase.

the feedstock is produced hydrocarbons having a high TAN and the method further comprises the step of exposing the produced hydrocarbons to the catalyst structure under conditions sufficient to lower TAN to less than 0.7 KOH/g by enabling TAN molecules to contact the catalytic phase.

the method further includes the step of exposing the catalytic phase to an oxygen donor under conditions to regenerate the catalytic phase.

the step of exposing the catalyst to an oxygen donor includes the step of exposing the catalytic phase to any one of or a combination of steam, carbon dioxide, water and peroxide.

In another aspect (seventh aspect), a method of partially upgrading a produced hydrocarbon is described, the method comprising the step of: adjacent a production well, exposing the produced hydrocarbon to a catalyst in a reactor under conditions to promote partial upgrading.

In one embodiment, the reactor is a fixed bed reactor and the step of exposing includes maintaining the reactor at about 280 to about 420 C and about 50 to about 500 psi and a residence time of about $0.1\ h^{-1}$ and about $3\ h^{-1}$, or between about $0.1\ h^{-1}$ and about $2\ h^{-1}$, or between about $0.2\ h^{-1}$ and about $1\ h^{-1}$.

In another aspect (eighth aspect), a system for partial upgrading of a produced hydrocarbon is described, the system comprising: a fixed bed catalytic reactor (FBCR) supporting a catalyst as defined above, the FBCR for receiving a produced hydrocarbon stream and subjecting the produced hydrocarbon stream to reaction conditions to effect catalytic partial upgrading of the produced hydrocarbons.

In various embodiments, the system includes a heater operatively connected to the FBCR for pre-heating the produced hydrocarbon stream prior to introduction into the FBCR and/or an oxygen regeneration system operatively connected to the FBCR for introducing an oxygen source to the FBCR.

BRIEF DESCRIPTION OF THE DRAWINGS

The invention is described with reference to the drawings where:

FIG. 1 is a table showing catalytic decarboxylation of small molecular weight acids [12];

FIG. 23 shows the effects of water content and pressure in a catalyst D process;

DETAILED DESCRIPTION OF THE INVENTION

Figure 2A:
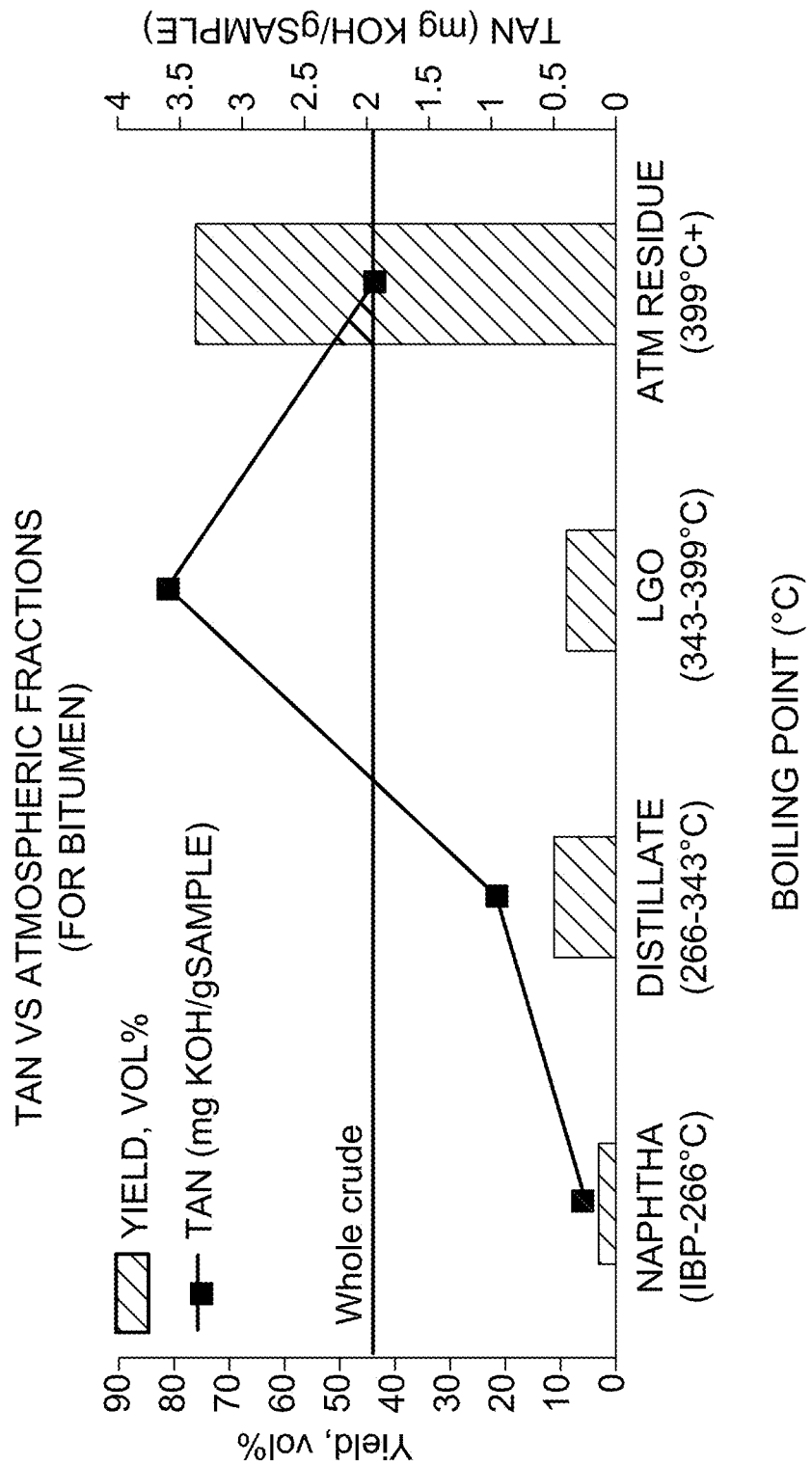
FIG. 2 shows the evolution of TAN with the atmospheric fraction's (A), or the Vacuum fraction's (B) boiling range, for a sample of bitumen.
Figure 2B:
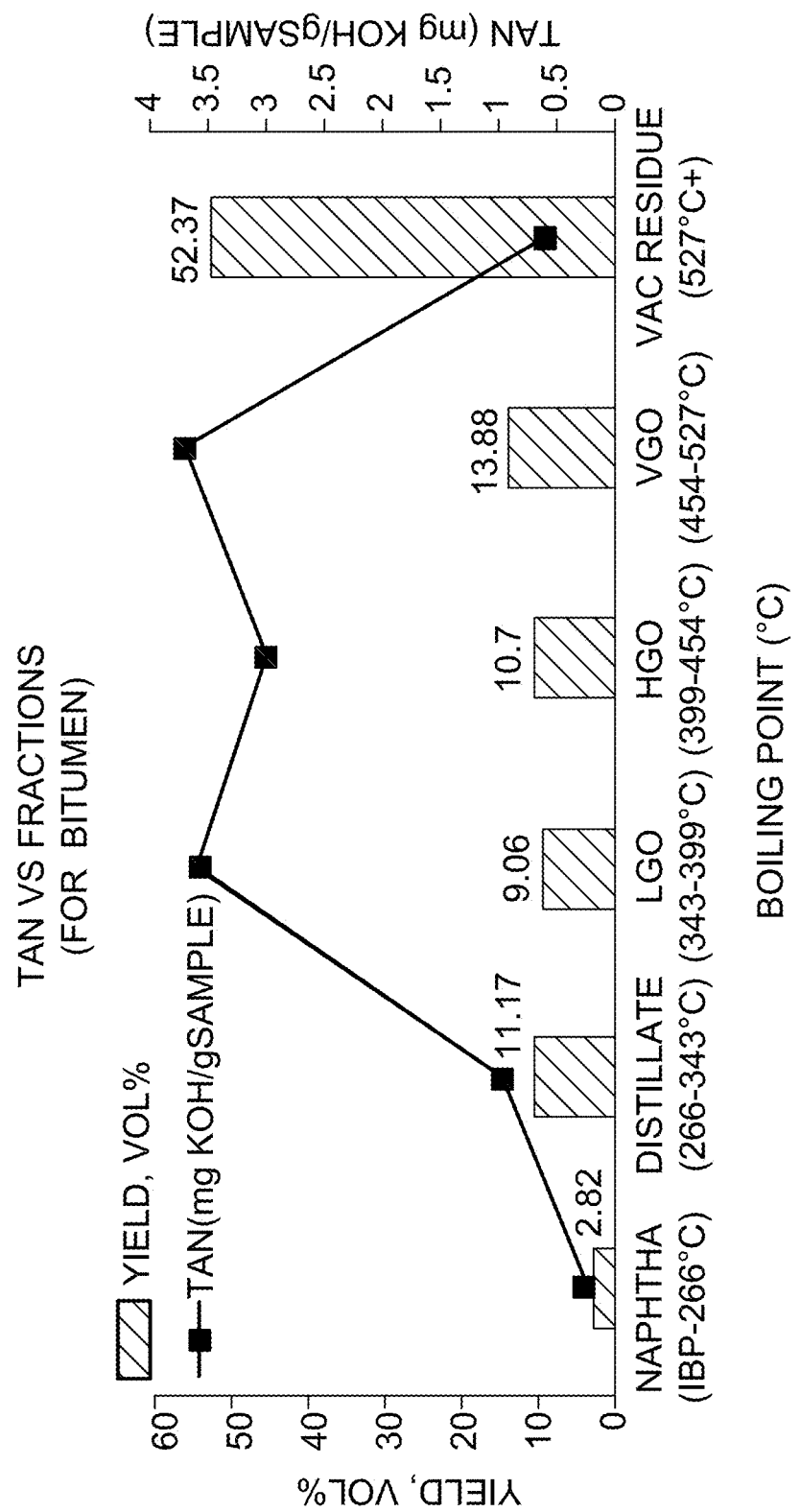
Figure 3:
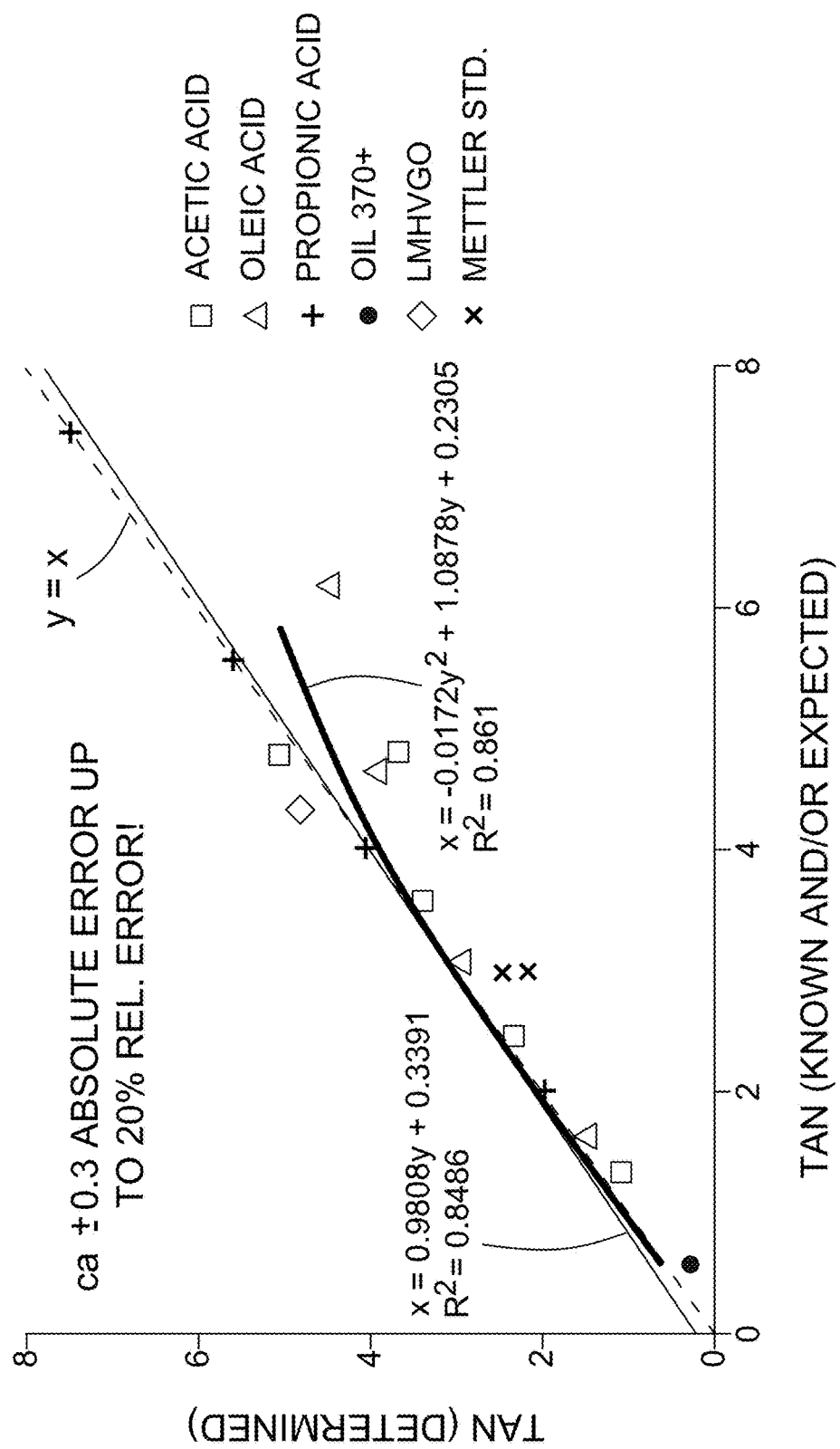
FIG. 3 shows the expected and determined TAN for a set of known samples.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of alternative features are introduced in the context of certain aspects of the invention during the course of this description. It is to be understood that such alternative features may be substituted in various combinations to arrive at different embodiments of the present invention.

Described herein are methods, systems, apparatuses, techniques and embodiments suitable for partially upgrading produced hydrocarbons, including but not limited to bitumen, whole crude oil, vacuum gas oil, and/or heavy oils. Partial upgrading may include reduction of total acid number (TAN), viscosity, density, residuum, asphaltene and sulfur content or combinations thereof, in produced hydrocarbons, among other upgrading effects including reduced metal content and/or an increase in light fractions. It will be appreciated that the methods, systems, apparatuses, techniques and embodiments described herein are for illustrative purposes intended for those skilled in the art, and are not meant to be limiting in any way. All reference to dimensions, capacities, embodiments or examples throughout this disclosure, including the figures, should be considered a reference to an illustrative and non-limiting dimension, capacity, embodiment, or an illustrative and non-limiting example.

It will be appreciated that reference to reaction schemes, pathways, and proposed or hypothesized mechanisms, reaction products, intermediates and chemical reactions and reaction characterization is not bound by theory and is not intended to be limiting.

It will be understood that references to a hydrocarbon feedstock of produced hydrocarbons, produced hydrocarbons bitumen or oil may include, but are not limited to, bitumen, whole bitumen, whole crude oil, crude oil, vacuum gas oil (VGO), oil, heavy oil, oil sands, and any other hydrocarbons that may be produced via a production well or otherwise produced to the surface as part of an oilfield operation from a hydrocarbons reservoir, subterranean or otherwise as well as mixtures of said materials, including mixtures incorporating other hydrocarbons. Produced hydrocarbons may also include any sample or fraction thereof obtained from produced hydrocarbons, such as a fraction obtained by fractionation or distillation, or a sample that has been processed by, for example, thermal or steam cracking, or visbreaking, or other processing operations.

Catalytic Methods for Partial Upgrading Including Tan Reduction

In accordance with the invention, low pressure, non-hydrogen, non-separation-requiring (thereby potentially avoiding costly vessel use) catalytic processes, such as a fixed bed steam catalytic processes, on produced hydrocarbons such as bitumen or crude oil, using steam or another oxygen source, and an adequate catalyst for reducing TAN, viscosity, density, residuum, asphaltene and/or sulfur content are described.

Typical catalysts for partial steam reforming, or steam catalytic cracking, are rather moderate to high basicity solids. Such catalysts have an attraction for acidic components. In certain embodiments, in order to prevent these catalytic sites from being attacked by undesired molecules (i.e. non-acidic or low acidity molecules, heavy polar molecules such as resins, and asphaltenes from the residue, etc.), a catalyst or general family of catalysts have been designed that can be used to anchor the catalytic phases inside a porous network where VGO molecules could penetrate, but the larger molecules would be substantially prevented from doing so. This may, in certain embodiments, be achieved by synthesizing a micro-porous or meso-porous catalyst containing the same or a similar kind of porous network as an FCC catalyst (typically shaped to process VGO), and incorporating inside that porous network chemically-basic catalytic functions instead of the acidic ones typically used in FCC catalysts. The main network may have non-acidic properties; the presence of steam may prevent massive coke formation on the external surface of the porous network; and may keep the catalytic functionalities active by addition of oxygen via water dissociation or from another oxygen source, such as, but not limited to $CO_2$. In some embodiments, this porous network may be framed in monolith arrangements for ease of replacement, and minimal reactor pressure drop.

In accordance with the invention, the processes outlined herein may operate with bitumen (no fractionation required; including Dilbit, Synbit, Wholebit, etc. and fractions thereof), associated water fractions in the oil may be allowed, and processing may occur at a temperature range of about 280-420° C. The total pressure may be in the range of about 50-400 psi or about 300-400 psi, and in some embodiments no higher than about 500 psi (low-mid pressure steam to minimize the gas fraction inside the reactor). In some embodiments, a fast residence time may be possible, in the range of about 5-20 min (about 3-10 weight hourly space velocity (WHSV)), which would yield relatively small reactor vessels. In an additional embodiment, the space velocity may be between about $0.1\ h^{-1}$ and $3\ h^{-1}$, or between about $0.1\ h^{-1}$ and $2\ h^{-1}$, or between about $0.2\ h^{-1}$ and $1\ h^{-1}$. Such a process may not only reduce TAN, residuum and/or asphaltene content, but also or alternatively may favorably impact the viscosity of the whole oil, as well as S, O and micro-carbon content in the final oil, as these properties often go hand in hand with TAN values for most heavy oils.

Figure 4:
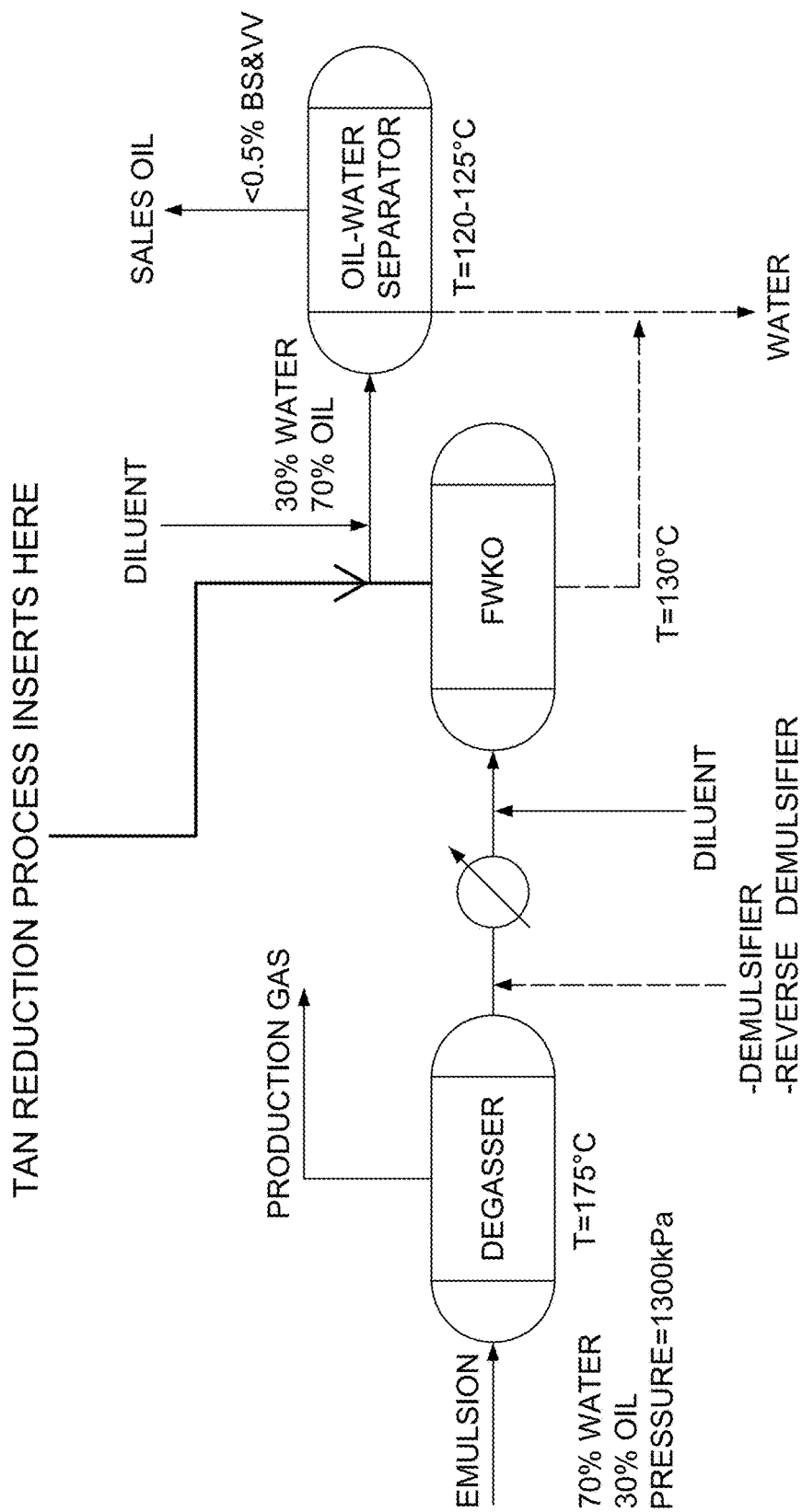
FIG. 4 shows an illustration of an example of a heavy oil steam-based oil production facility. A process for partial upgrading as outlined herein may, in some examples, be implemented as indicated.

In embodiments of the methods, processes, and processing systems for carrying out the methods and processes as outlined herein, the processing apparatus may be implemented in a typical production facility such as a SAGD facility, other thermal recovery facilities (for example cyclic steam stimulation (CSS)) a facility for producing hydrocarbons, or a facility for bitumen or heavy oil recovery, which may optionally use steam as a reservoir heat source. Alternatively, the processing apparatus may be located at a separate facility that is capable of processing or handling bitumen, such as at a rail terminal, pipeline hub, refinery, etc. FIG. 4 shows an embodiment of an example of surface processing equipment and where the partial upgrading process may be implemented.

Figure 5:
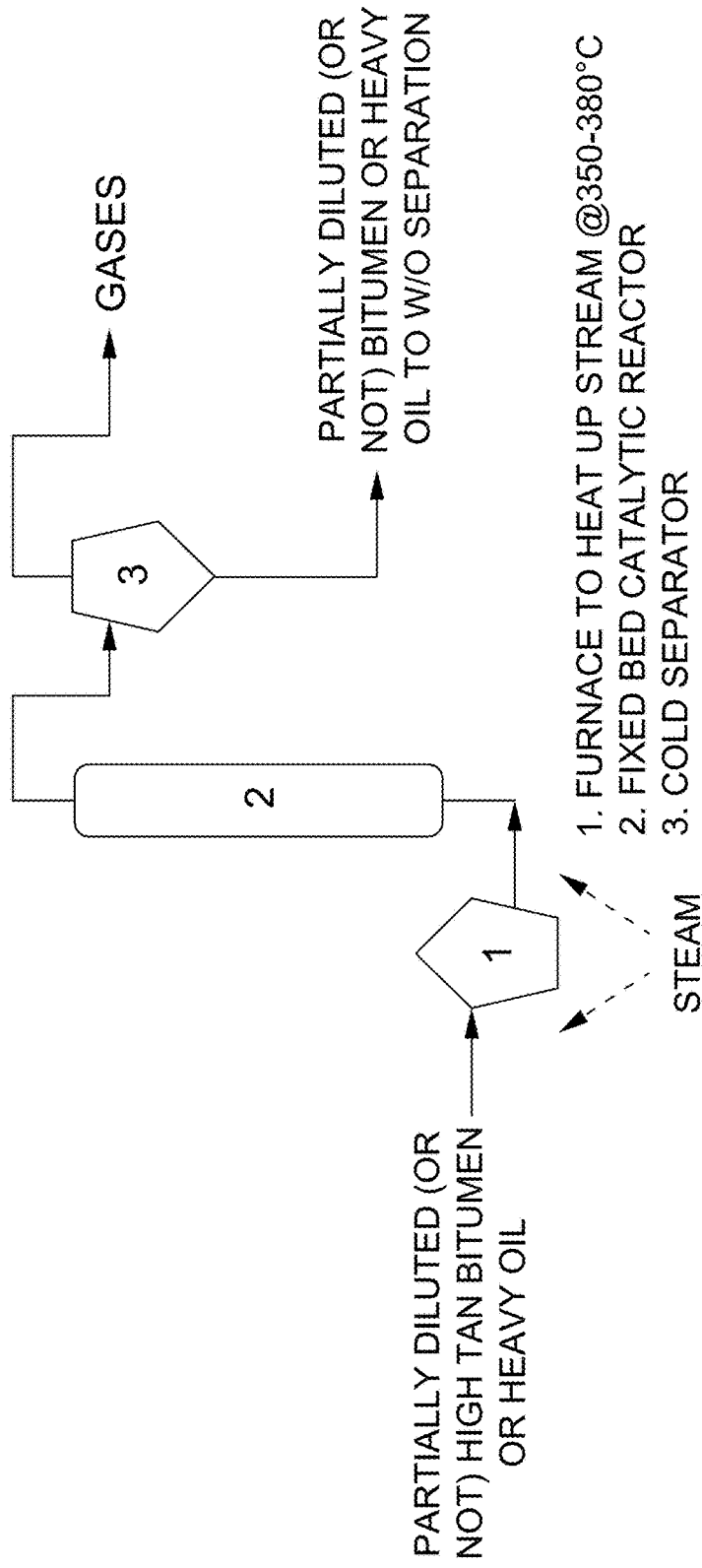
FIG. 5 shows a simplified scheme of an embodiment of a partial upgrading process as outlined herein, which is based on the use of steam for catalyst activation/reactivation/regeneration and shows optional steam injection points.

A schematic of one embodiment of a process as outlined herein is shown in FIG. 5, which indicates possible units for implementing the process on field. Steam or another oxygen source may be added at one or more points in the process, for example, as shown by the dotted lines.

A person skilled in the art would appreciate that the process described herein may be paired with any emulsion treating process. Other configurations may include a TAN reduction process at the outlet of for example, a membrane separation process, a combined upside Down Treater/Flash process, or a Hot Hydrocyclone/Flash process. While in most cases the produced hydrocarbon is diluted with a diluent stream, the process described here may be applied to undiluted produced hydrocarbons.

Without wishing to be limited by theory, in embodiments of the methods, processes, and systems outlined herein, it is possible that the catalyst may reduce TAN in produced hydrocarbons by causing decarboxylation of acids, such as naphthenic acids, in the produced hydrocarbons. In certain embodiments, decarboxylation of acids may result in release of carbon dioxide and hydrogen.

Decarboxylation may, in some embodiments, leave behind some oxygen vacancies in the catalyst. Use of a catalytic path instead of an adsorption path (i.e. a slowly destructive path) may allow TAN reduction in a stable or more stable, long lasting manner. In this sense, a reaction mechanism may be used in which the catalytic process is converted or complemented into a catalytic cycle by adding steam or other suitable 'oxygen-donor' molecules to participate in the reactions to regenerate the catalyst, i.e., by refilling the oxygen deficiencies or vacancies produced in the catalyst. Oxygen donors may include $H_2O$, which may be in the form of steam or water vapour, or another suitable oxygen source. Water may be or include produced water. Other oxygen sources may include, but are not limited to, air, $O_2$, $CO_2$, a peroxide, or another suitable oxygen source as will be known to the person of skill in the art.

It should be appreciated that these types of pathways, wherein steam is used as a source of oxygen, are consistent with (partial) steam reforming. This cycle may secure regeneration of the adsorbing sites, which very commonly lose oxygen during the desorption process, and are poisoned by sulfur and multi-ring aromatic molecules during the adsorption step. It may also avoid potentially expensive adsorption/desorption and eventual regeneration steps; and further, it opens the possibility to consider new catalysts such as those disclosed herein. An added benefit of this approach is that the deactivation by sulfur compounds (simplified as:

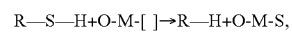

can be counteracted by the steam presence (via similarly simplified reactions such as:

General Description of Catalysts and Mode of Action

It will be understood that suitable catalysts for use in a partial upgrading processes, such as a TAN reduction process, as described herein, may include any catalysts which reduce TAN, optionally through acid decarboxylation, as provided and outlined herein, or as may be known to the person of skill in the art having regard to the disclosure provided herein. In certain embodiments, a suitable catalyst may be any catalyst which is selected using one, some or all of the methods described in Example 9 below, or otherwise described in this application.

In one embodiment, a suitable catalyst may comprise a combination of transition metals with rare earth elements or with earth alkali and/or alkali metals. These elements or metals may be disposed or doped inside a micro-porous and/or meso-porous amorphous or crystalline matrix or framework, which allows size exclusion to reduce exposure of the catalytic elements to hydrocarbon molecules larger than about 2 nm (effective molecular diameter).

In one embodiment, a suitable catalyst may be a metallo-silicate material.

In one embodiment, a suitable catalyst may be a bi- or tri-metallo-silicate material.

In one embodiment, a suitable catalyst may be a nickel, copper, zinc or cerium-based catalyst, any combination thereof, or an oxide thereof.

In another embodiment, a suitable catalyst may be a metal oxide-based catalyst.

In another embodiment, a suitable catalyst may comprise a porous support network allowing contact with some acid molecules, but preventing contact with at least some other components of produced hydrocarbons, bitumen, VGO, and/or whole crude oil.

In another embodiment, a suitable catalyst may catalyze decarboxylation of a carboxylic acid present in produced hydrocarbons. In a further embodiment, a suitable catalyst may catalyze decarboxylation of a carboxylic acid, thereby generating oxygen deficiencies or oxygen vacancies in the catalyst. In yet a further embodiment, a suitable catalyst may be a catalyst in which oxygen deficiencies or oxygen vacancies may be re-filled through exposure to an oxygen source, thus regenerating the catalyst, which may extend the lifetime of the catalyst.

The oxygen source may be any suitable oxygen source such as $H_2O$, which may be in the form of steam or water vapor. In another embodiment, the oxygen source may be water contained with or in produced hydrocarbons, water added to the catalyst in steam, liquid, or water vapor form, or any combination thereof. In yet another embodiment, a water source may be at least partially converted to steam under the partial upgrading reaction conditions used.

Other oxygen sources may include, but are not limited to, air, $O_2$, $CO_2$, a peroxide, or another suitable oxygen source as will be known to the person of skill in the art.

Molecules contributing to TAN are typically not the heaviest/largest ones in the produced hydrocarbons, and thus, these comparatively small molecules can penetrate porous networks having a functionalized size able to dissociate water and remove acidic moieties that can selectively interact with them. In certain embodiments of the methods, systems, and/or processes outlined herein, the catalyst may comprise a metal-doped porous framework, such as a microporous and/or meso-porous framework. The framework may be sized to at least partially prevent exposure of catalyst to larger-sized compounds of the produced hydrocarbons, optionally through a molecular sieve-type effect. In certain embodiments, the catalyst may be a nickel, copper, or cerium-based catalyst, any combination thereof, or an oxide thereof.

Possible porous frameworks may include any suitable porous framework known to the person of skill in the art. Porous frameworks may include, but are not limited to, micro-porous and/or meso-porous zeolite frameworks, silicate-based frameworks, mordenite framework inverted (MFI) structures, aluminosilicate zeolite materials such as Zeolite Socony Mobil-5 (ZSM-5), or non-acidic silicate framework structures. Suitable silicate frameworks may include, for example, any siliceous micro-porous materials, for instance, siliceous MFI, MTW, FER, MEI, MTT or MWW structures, any ordered siliceous meso-porous material such as SBA-15, MCM-41 or MCM-48 materials, any disordered siliceous meso-porous material, or any combination thereof.

Possible catalytic materials may be composed of a porous silicate framework, as described above, and doped with a combination of metals, such as Ce—Ni, Ce—Cu or Ce—Ni—Cu, which are incorporated into the synthesis gel of the silicate framework. Using suitable sources of each component, a gel may be prepared and this amorphous gel may undergo a suitable hydrothermal reaction transformation to generate a crystalline or amorphous micro-porous, an ordered or disordered meso-porous amorphous solid or a combination thereof depending on the employed synthesis conditions.

The catalyst may be a bi- or tri-metallo-silicate microporous and/or meso-porous material based on cerium, nickel and/or copper on a porous silicate framework matrix so as to use the molecular sieve effect to favor the acidic organic molecules in produced hydrocarbons, such as bitumen or heavy oil. These materials may be prepared under hydrothermal synthesis conditions in order to produce suitable porous solids where the metals are well dispersed and distributed inside the channels of the silicate framework such that the catalyst may interact only with the molecules that can enter the channels.

In some embodiments, the metallo-silicate materials may be prepared under hydrothermal synthesis conditions without the addition of an aluminum source and with temperatures ranging from about 30° C.-300° C. (or from about 80° C.-220° C.). Modification of the physical-chemical properties of the porous silicate materials may be accomplished by partial replacement of the silicon atoms by cerium, nickel and/or copper atoms in the material by isomorphous substitutions of these elements in the synthesis gel or by post-synthesis modifications such as ion-exchange or impregnation/deposition as will be known to the person of skill in the art. The materials prepared under these synthesis conditions may be used as prepared or modified by other chemical or physical processes, as will be known to the person of skill in the art, as catalysts for the catalytic reduction of total acid number (TAN) and other upgrades (e.g., viscosity reduction) in acidic crude oil feedstocks.

Nickel and cerium may be combined in certain catalyst embodiments to provide synergy in the form of a lower reduction temperature of $Ce^{4+}$ to $Ce^{3+}$, as supported by preliminary characterization of this phenomenon using temperature programmed reduction with hydrogen ($H_2$-TPR).

In certain examples, samples of bitumen show that acidic components affecting the TAN number are molecules of smaller sizes compared with the remainder residual components (about 50% wt of the bitumen). Thus, use of the molecular sieve effect approach to selectively separate these smaller molecules from the rest of the feedstock may be possible. The large molecules, which are mostly non-acidic but have a high tendency to adsorb, may be excluded via a sieve effect. Thus, the smaller acidic molecules may be selectively treated with specially designed active centers that can produce, for instance, decarboxylation of carboxylic acid moieties, thus decreasing the total acidity number. Inert molecular sieve silicate frameworks may be modified to incorporate particular active sites to tailor-make desired catalysts.

Figure 6:
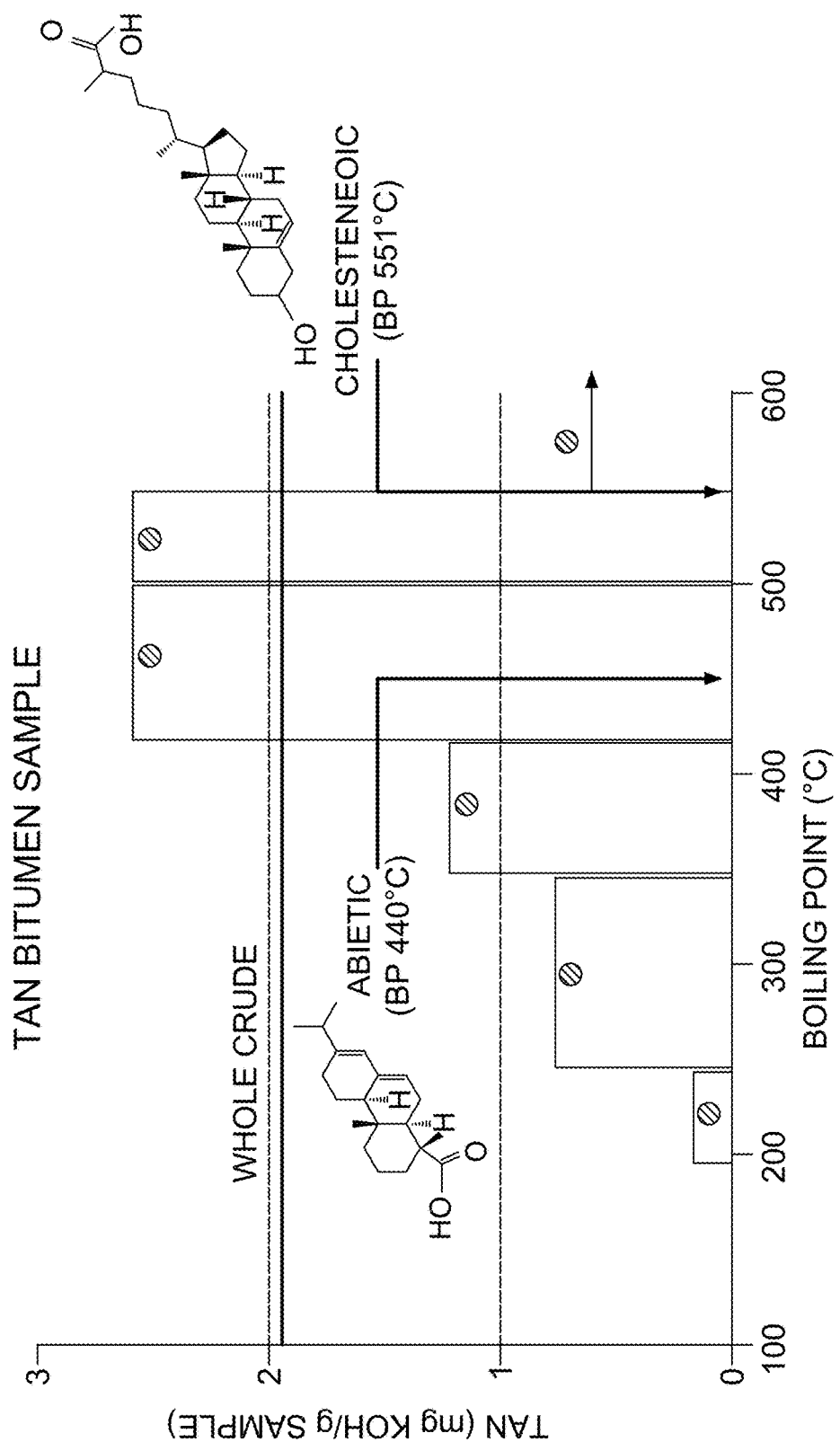
FIG. 6 shows an example of the typical distribution of TAN enrichment for atmospheric and vacuum gas oil fractions, with two representative structures of naphthenic acids included to indicate the boiling range of pure kerogenic acids.

Results in FIG. 6 illustrate the typical distribution of TAN enrichment for atmospheric and vacuum gas oil fractions. Two single representative structures of naphthenic acids are included to indicate the boiling range of pure kerogenic acids. The molecular size of typical naphthenic components suggests that most of the acidic properties are related to relatively small components. The two model acid molecules have maximum elongation under relaxed lowest-energy conformations of 11.5 Å (Abietic) and 18 Å (Cholestenoic). Adsorbent/catalysts with pore diameters from about 70-110 Å should leave enough room for relatively unhampered diffusion of molecules within the size range of about 10-20 Å. Molecules of a size larger than about 2 nm (effective molecular diameter) may tend to deactivate the catalyst by occupying several active sites, generating coke precursors and reducing access of the targeted acidic molecules.

In various embodiments, the catalyst may be placed in a conventional fixed bed reactor and a hot separator, from which a gas stream rich in steam, $CO_2$ and $H_2S$ will be separated from bitumen or other produced hydrocarbons. The target, in some embodiments, may be producing a bitumen with a TAN lower than about 1 mg KOH/g bitumen or produced hydrocarbons, or in certain embodiments, lower than about 0.7 mg KOH/g bitumen.

In an embodiment, the catalyst may be a metallo-silicate material. In another embodiment, the catalyst may be a bi- or tri-metallo-silicate material.

In an embodiment, the catalyst may be a nickel, copper, or cerium-based catalyst, any combination thereof, or an oxide thereof. In a further embodiment, the catalyst may be a 3% Ce, 2% Ni catalyst, or a 3% Ce, 3% Ni catalyst.

In another embodiment, the catalyst may be a metal oxide-based catalyst.

In certain embodiments of the method or methods outlined herein, the catalyst may be a micro-porous and/or meso-porous catalyst, utilizing size exclusion to reduce exposure of the active phases of the catalyst to compounds larger than about 1-50 nm (effective molecular diameter), or larger than about 2-50 nm, or larger than about 5-50 nm present in the produced hydrocarbons. Non-acid silicate micro-porous materials with the MFI structure, for example, Silicalite I, may be modified by incorporation of Ni and Ce or Cu and Ce or Zn and Ce in different proportions to take advantage of the synergistic effect of both metals inside the molecular sieve structure. Additives like molybdenum and/or tungsten carbides can be added to the metal-zeolite compositions in orden to enhance the catalytic properties for TAN reduction and/or catalytic steam cracking upgrading of bitumen. Novel binders like hydrotalcite or metal-doped hydrotalcite can be used in conjunction with standard binders like clays, silicas, aluminas, and mixtures thereof to achieve certain desired shapes, sizes, and mechanical and thermal strength resistance for the powdered material to enhance the adsorption and catalytic properties of the final catalysts.

Catalyst molding (usually, materials like kaolin, silica, alumina, silica-alumina, starch, or their combinations) may be employed not only to bind the powdered particles of the catalysts, but also to get a good dispersion of the zeolitic particles in the matrix, and with those combinations, it may be possible to achieve desired shapes, sizes and mechanical and thermal strength resistance for the powder zeolitic material; usual combinations are about 20-30% zeolitic material and about 70-80% binder).

Approaches for Catalytic Testing of Ni—Ce Doped Materials

To test synthesized catalysts for catalytic partial upgrading (such as TAN, viscosity, density and/or sulfur content reduction) of produced hydrocarbons (i.e., bitumen), a laboratory unit may, in some embodiments, be assembled in order to carry out the experiments with whole (or diluted) bitumen in the presence of water vapor. The unit may experimentally simulate a process scheme that may comprise a heating zone to bring the temperature of the bitumen to a range between about 280 and 420° C., at a pressure no higher than about 500 psi, with a space velocity between about 0.1 $h^{-1}$ and 3 $h^{-1}$. The catalyst may be placed in a conventional fixed bed reactor. A hot separator may follow, from which a gas stream rich in steam, $CO_2$ and $H_2S$ may be separated from the bitumen and analyzed. The mass balances of the process may be within the range of about 96-104% weight. The target, in some embodiments, may be to produce a bitumen with a TAN lower than about 1 mg KOH/g bitumen, or lower than about 0.7 mg KOH/g bitumen. In example experimental testing, each catalyst may be tested at least once within the set of conditions indicated. Alternatively, a simpler method may be used to screen the catalysts synthesized, allowing selection of at least one for detailed testing. Promising catalysts may be subjected to more exhaustive testing within the range of conditions indicated, as desired.

Partial Upgrading: Reduction of TAN Using Catalysts

In certain embodiments, there is provided herein a fixed bed steam catalytic process involving a micro-porous and/or meso-porous catalyst (for example, a nickel/cerium catalyst utilizing a size exclusive support) that facilitates partial upgrading including for example TAN reduction, viscosity, density, residuum, asphaltene and/or sulfur content reduction, or combinations thereof, in produced hydrocarbons such as whole crude oil or bitumen. In further embodiments, the process may allow for bitumen processing without fractionation, visbreaking, thermal or steam cracking, or other traditional viscosity reducing process steps, may be performed at low pressure, and/or may not require the use of hydrogen (which is typically associated with high cost vessels). In certain embodiments, the catalyst may be a catalyst developed as outlined above. In certain embodiments, the catalyst is designed to anchor vacuum gas oil (VGO) and smaller molecules in the micro-porous and/or meso-porous catalytic network of the catalyst, without substantially attracting larger molecules (given that acid molecules tend to be smaller than other hydrocarbons with similar boiling points). In certain embodiments, the micro-porous and/or meso-porous network may have non-acidic properties, and the presence of steam may prevent or reduce significant coke formation on the external surface of the porous network, and may keep the catalytic functionalities active by addition of oxygen from water or another oxygen donor. The porous network may be framed in a monolithic arrangement for easy replacement and minimal reactor pressure drop. The person of skill in the art will recognize that VGO has a typical heavy hydrocarbon feedstock profile, typically meant for fluid catalytic cracking (FCC) reactions.

A pioneer exploratory research project on the use of a fixed bed catalytic partial upgrading process for field implementation, which may be for acidity reduction and/or viscosity reduction in bitumen and/or heavy oils, and which may not require fractionation, was conducted. In this study, application of partial steam reforming reactions under a fixed bed configuration was used for partial upgrading, such as TAN reduction and/or viscosity reduction, in bitumen and heavy oils. The process conditions used (low pressure 80-250 psi and 340-380° C., 5 wt % steam, 0.3-1 $h^{-1}$ WHSV), the process configuration (only a heater and a conventional fixed bed reactor were used—fractionation was not needed in this example), and the solid catalyst employed (synthesized solid catalyst) represent embodiments of partial upgrading methods, systems, and processes as provided herein.

The laboratory synthesis of the catalysts, and their laboratory use for partial upgrading of bitumen, was accomplished by testing with both vacuum gas oil and bitumen (partly diluted).

Within the range of conditions explored and indicated herein, the process was able to produce partially upgraded processed VGO and bitumen with TAN lower than 0.5 mg KOH/g oil. In some cases and conditions, even samples with 0 mg KOH/g TAN were obtained while significantly reducing viscosity of the feed by as much as about 88%, among other enhancements (see Example 4, and other examples, below).

Also as part of this research, a continuous micro-pilot plant unit was built and used to test the performance of catalysts under steady state conditions, and to secure continuous stable mass balance collection. Stable operation and sustained performance in the reduction of TAN and the enhancement of other properties during the processing of full range bitumen for two selected catalysts was evidenced during dozens of hours.

The metallo-silicate catalysts tested for TAN reduction are different not only in chemical composition, but also in terms of physical properties (having a molecular sieve effect) from what is already known in the art. Catalytic testing, as described in the examples presented herein, shows at least some activity and selectivity of the catalysts to favor the removal of the acidic moieties from feedstocks such as vacuum gas oil or bitumen.

Partial Upgrading: Reduction of Viscosity Using Catalysts Such as Those Provided Herein In certain embodiments, there is provided herein a fixed bed steam catalytic process involving a micro-porous and/or meso-porous catalyst (for example, a nickel/cerium catalyst utilizing a size exclusive support) that facilitates viscosity (and, optionally, also TAN) reduction in produced hydrocarbons such as whole crude oil or bitumen. In further embodiments, the process may allow for whole bitumen processing without fractionation, visbreaking, thermal or steam cracking, or other traditional viscosity reducing process steps, may be performed at low pressure (i.e. less than about 500 psi), and/or may not require the use of hydrogen (which is typically associated with high cost vessels). In certain embodiments, the catalyst may be a catalyst developed as outlined above. In certain embodiments, the catalyst may be designed to anchor vacuum gas oil (VGO) and smaller molecules in the micro-porous and/or meso-porous catalytic network of the catalyst, without substantially attracting larger molecules. In certain embodiments, the micro-porous and/or meso-porous network may have non-acidic properties, and the presence of steam may prevent or reduce massive coke formation on the external surface of the porous network, and may keep the catalytic functionalities active by addition of oxygen from an oxygen donor such as water, which may be in the form of steam. The porous network may be framed in a monolithic arrangement for easy replacement and minimal reactor pressure drop. The person of skill in the art will recognize that VGO has a typical heavy hydrocarbon feedstock profile, typically meant for fluid catalytic cracking (FCC) reactions.

Figure 12:
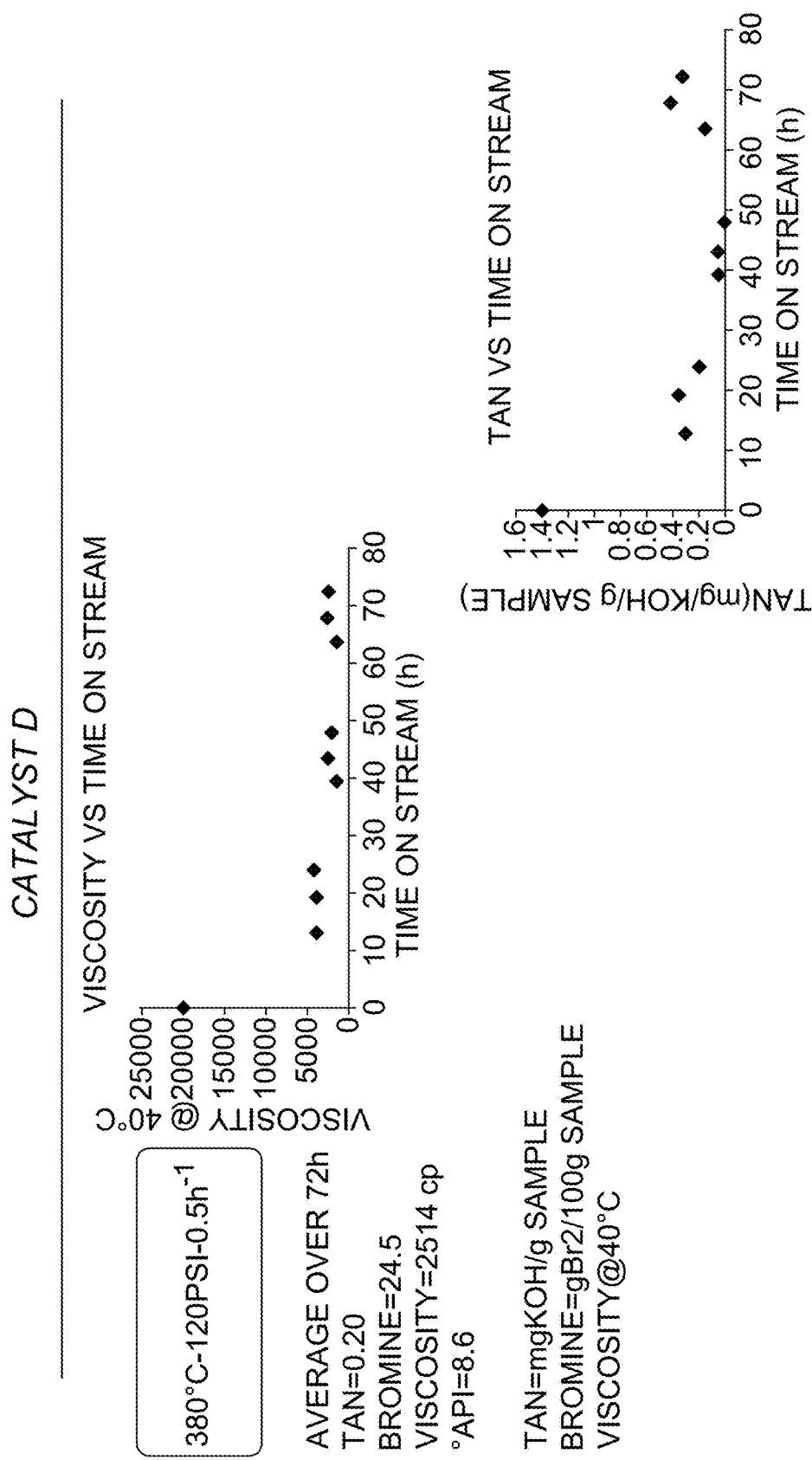
FIG. 12 provides results of a test of catalyst D, showing significant TAN reduction and viscosity reduction.

The results provided in the following examples detail catalytic partial upgrading processes including viscosity reduction processes for field implementation, which may be for viscosity reduction in produced hydrocarbons, whole bitumen and/or heavy oils, and which may not require fractionation, visbreaking, thermal or steam cracking, or other traditional viscosity reducing process steps. Application of partial steam reforming reactions under a fixed bed configuration was used for viscosity reduction in bitumen and heavy oils. Within the range of conditions explored and indicated herein, the process was able to produce processed VGO and bitumen with reduced viscosity (see Example 4, FIGS. 12, 13 and 21, for examples).

Without wishing to be limited by theory, one possibility may be that viscosity is reduced, at least partially, by conversion of at least some of the produced hydrocarbons into lower molecular weight (i.e. "shorter") hydrocarbons caused by action of a catalyst, such as a catalyst as described herein.

In certain embodiments of the processes outlined herein, the process may reduce the viscosity of produced hydrocarbons, and as such may be considered an upgrading process, which upgrades produced hydrocarbons such as bitumen and/or whole crude oil.

Partial Upgrading and In Situ Partial Upgrading

In certain embodiments of the methods, processes, and systems provided herein, the methods, processes, and/or systems may be used to perform in-situ partial upgrading of hydrocarbons, such as bitumen or crude oil. In a further embodiment, a catalyst as provided herein may be introduced downhole to a hydrocarbon well, deposit, or reservoir. The catalyst may cause partial upgrading of the hydrocarbons, such that produced hydrocarbons produced from the well may be partially upgraded. In certain embodiments, the TAN, the viscosity, or the TAN and viscosity of downhole hydrocarbons may be reduced.

In an embodiment, there is provided herein a method for partially upgrading hydrocarbons in-situ, the method comprising the steps of:

exposing hydrocarbons in a well, deposit, or reservoir to a catalyst, which causes partial upgrading of the hydrocarbons;

producing the partially upgraded hydrocarbons to the surface; and regenerating the catalyst;

wherein the catalyst is regenerated through exposure of the catalyst to an oxygen source.

In a further embodiment, the hydrocarbons may be partially upgraded by a reduction of TAN, a reduction of viscosity, a reduction of density, a reduction of sulfur content, or any combination thereof. In yet another embodiment, the catalyst may cause a decarboxylation of acids in the hydrocarbons. In still another embodiment, the catalyst may be regenerated through exposure of the catalyst to an oxygen source such as water, which may be in the form of steam, as a source of oxygen, optionally while downhole in the hydrocarbon reservoir, deposit, or well.

EXAMPLES

Exploratory development of fixed bed catalytic partial upgrading processes and methods for field implementation for whole bitumen processing without the need for fractionation was conducted using catalytic technology as outlined herein. In certain embodiments, the partial upgrading may include viscosity and/or TAN reduction. The following examples provide further information regarding the development of these methods and processes, and are not intended to be limiting in any way.

Example 1

Catalytic TAN Reduction Testing with a VGO Feedstock (Initial TAN of 4.2 mg KOH/g)

Figure 7:
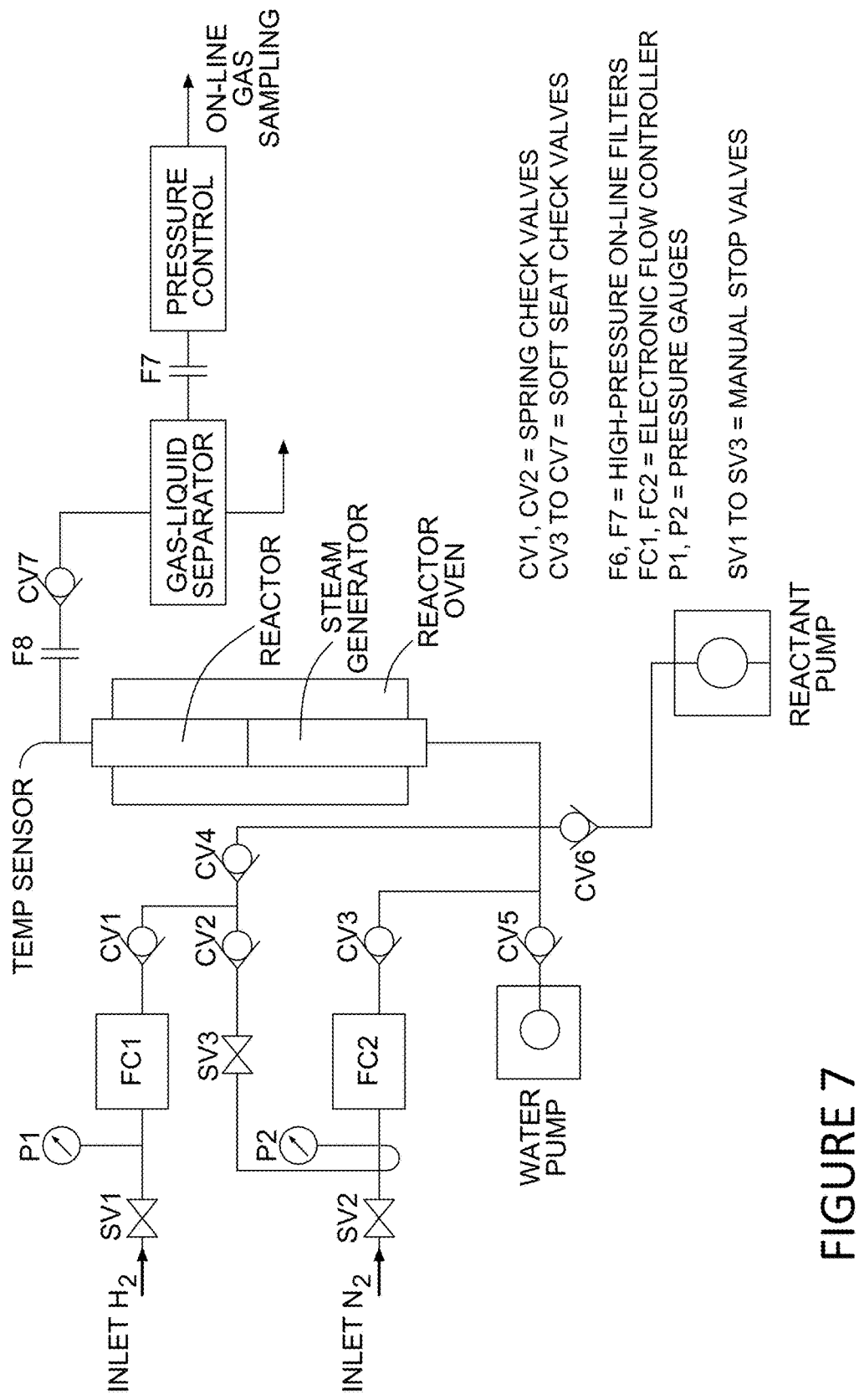
FIG. 7 shows a schematic of a unit used for catalytic testing with a VGO feedstock having an initial TAN of 4.2 mg KOH/g.
Figure 8:
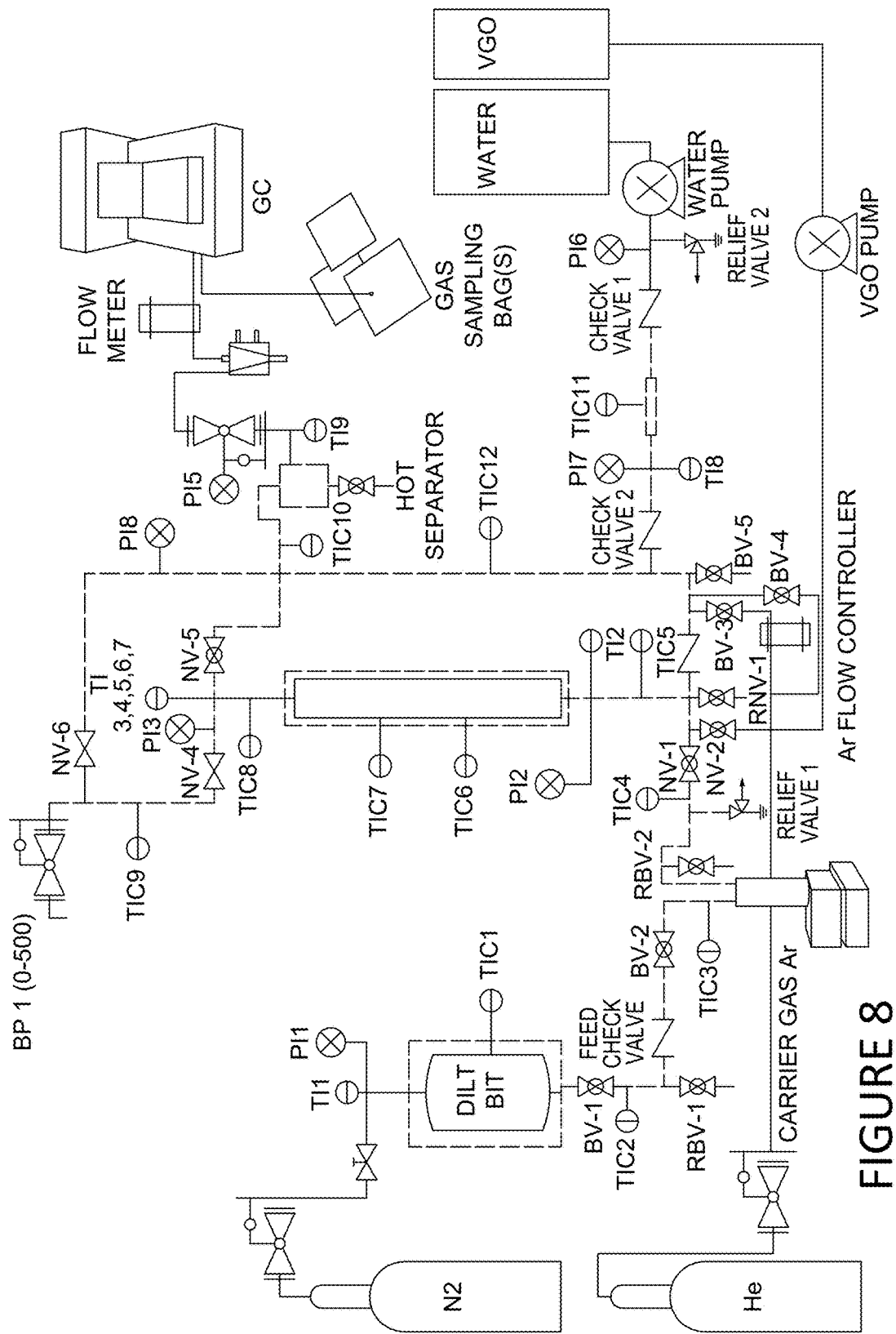
FIG. 8 shows a schematic representation of a micro-pilot plant testing unit.

FIG. 7 shows schematics of the unit used for the catalytic testing with a VGO feedstock (initial TAN of 4.2 mg KOH/g). FIG. 8 shows a schematic representation of the micro-pilot plant used for dilbit TAN reduction testing.

Tables 1 and 2 below show results of VGO TAN reduction testing at 400° C. and 360° C. reaction temperatures, respectively, and show the effect of temperature on TAN reduction without catalysts (increasing temperature causes some reduction of TAN). TAN of the original VGO was 4.2 mg KOH/g. From this screening, catalyst C (3% Ce, 2% Ni, meso-porous zeolite framework; TAN of 0.94 achieved) and catalyst D (3% Ce, 3% Ni, meso-porous zeolite framework; TAN of 1.16 achieved) showed the highest reduction of TAN from the tested set of catalysts.

Figure 9:
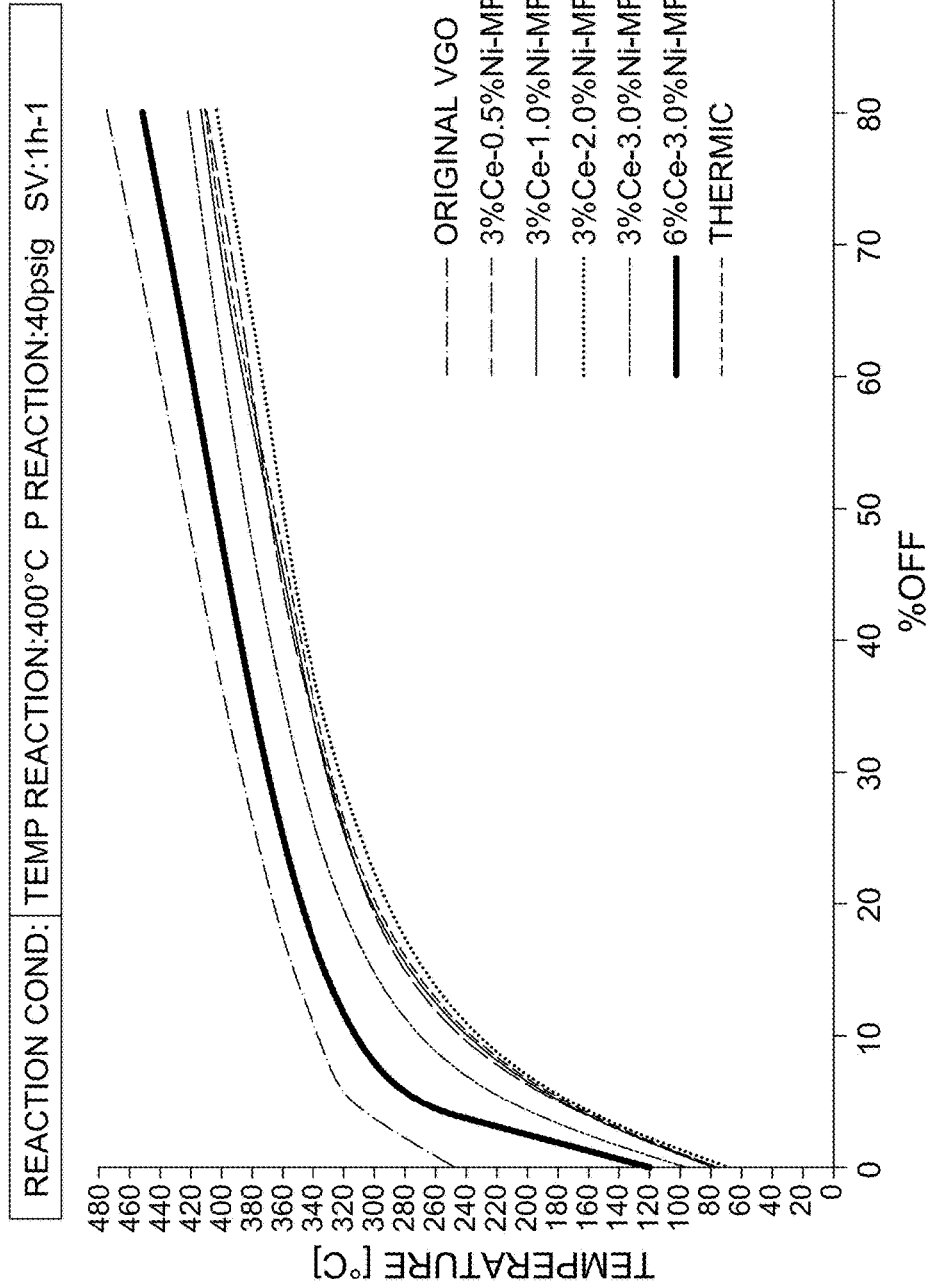
FIG. 9 shows simulated distillation of the tests carried out with VGO.

FIG. 9 shows simulated distillation of the runs carried out with VGO.

TABLE 1

Catalyst screening with micro-pilot plant unit using VGO
feedstock (TAN Reduction at 400° C.)
Reaction Cond: Temp reaction: 400 C. P reaction: 40 psig SV: 1 h−1

| | TAN (mg KOH/g sample) | | | | | | |
|---|---|---|---|---|---|---|---|
| | Thermic 400 C. | CAT A | CAT B | CAT C | CAT D | CAT F | Feed (VGO) |
| TAN | 2.73 | 1.43 | 1.32 | 0.94 | 1.16 | 2.15 | 4.19 |
| % TAN Reduction | 34.8 | 65.9 | 68.5 | 77.6 | 72.3 | 48.7 | ... |

| | Mass Balance, Liquid and gas yields | | | | | |
|---|---|---|---|---|---|---|
| | Thermic 400 C. | CAT A | CAT B | CAT C | CAT D | CAT F |
| HC Gas yield (%) | 3.59 | 0.27 | 0.35 | 0.25 | 0.08 | 0.06 |
| HC Liquid yield (%) | 96.41 | 99.73 | 99.65 | 99.75 | 99.92 | 99.94 |
| HC Mass Balance | 102.51 | 101.75 | 93.77 | 102.59 | 91.52 | 98.61 |

Yields are defined as (g of Prod/total g of HC)*100

| Catalysts Description | |
|---|---|
| CAT A | 3.0% Ce 0.5% Ni |
| CAT B | 3.0% Ce 1.0% Ni |
| CAT C | 3.0% Ce 2.0% Ni |
| CAT D | 3.0% Ce 3.0% Ni |
| CAT F | 6.0% Ce 3.0% Ni |

TABLE 2

VGO TAN Reduction (360° C.), and effect of temperature on
TAN reduction without catalyst
Reaction Cond: Temp reaction: 360 C. P reaction: 40 psig SV: 1h-1

| | Thermic 360 C. | CAT C |
|---|---|---|
| TAN | 3.33 | 2.44 |
| % TAN Reduction | 14.3 | 42.3 |

Effect of Temperature on TAN reduction without catalysts

| | Thermic 360 C. | Thermic 400 C. | Thermic 440 C. |
|---|---|---|---|
| TAN | 3.33 | 2.75 | 2.0 |
| % TAN Reduction | 14.3 | 34.5 | 52.3 |

Example 2

Analytical Characterization of Dilbit Samples, and
Thermal Effect of Physical Distillation on TAN Diluent was distilled from dilbit (diluted bitumen samples) and the remaining oil was blended in preparation for catalytic testing.

Example 3

Comparison of Catalytic TAN Reduction with
Thermal TAN Reduction

Results provided herein demonstrate successful hydrocarbon partial upgrading catalyst formulations screened using a micro-pilot plant unit. Embodiments based on the use of a catalyst and steam to reduce TAN (i.e., by decarboxylating acid (for example, naphthenic acid)) of a vacuum gas oil fraction (343° C.+) chosen as a preliminary feedstock are shown. The catalysts and technology provided herein may, in some embodiments, be used as an alternative to the use of adsorbents and hydroprocessing. Results suggest that these approaches may be suitable for potential scale-up.

A fixed bed catalytic pilot plant was used for a continued 10 week test of the best catalyst formulations previously identified. For these tests, VGO was used as feedstock and T=400° C., P=40 psi and SV=1 h$^{-1}$ were used as reaction conditions. It may be clearly observed that the catalytic behavior of catalysts C and D showed higher reduction of the TAN value for VGO. The reactivity of these two catalysts was studied using a 180° C.+ topped bitumen fraction as feedstock for testing in the fixed bed catalytic pilot plant. The obtained results are outlined below. The data in Table 3 indicates that TAN reduction is reproducible (see previous screening results in Table 1) when using the micro-pilot plant test unit.

TABLE 3

Second catalyst screening with micro-pilot plant unit
using VGO feedstock (TAN Reduction at 400° C.)

| | Table 1 Thermic 400 C. | % Conv (34.3) and TAN (mg KOH/g sample) | | | | | Feed (VGO) |
|---|---|---|---|---|---|---|---|
| | | CAT A | CAT B | CAT C | CAT D | CAT F | |
| % Conv (343) | 28.6 | 28.50 | 28.60 | 29.5 | 17.50 | 6.10 | |
| TAN | 2.73 | 1.43 | 1.32 | 0.94 | 1.16 | 2.15 | 4.19 |

TABLE 3-continued

Second catalyst screening with micro-pilot plant unit
using VGO feedstock (TAN Reduction at 400° C.)

Reaction cond: Temp reaction: 400 C. P reaction: 40 psig
SV: 1 h−1

| | Table 2 Thermic | Mass Balance, Liquid and gas yields | | | | |
|---|---|---|---|---|---|---|
| | 400 C. | CAT A | CAT B | CAT C | CAT D | CAT F |
| Gas yield (%) | 5.12 | 1.50 | 1.72 | 1.56 | 0.97 | 0.73 |
| Liquid yield (%) | 94.88 | 98.50 | 98.28 | 98.44 | 99.30 | 99.27 |
| Global Mass Bal | 105.72 | 99.12 | 91.71 | 102.00 | 96.70 | 96.07 |

| Catalysts Description | |
|---|---|
| CAT A | 3.0% Ce 0.5% Ni |
| CAT B | 3.0% Ce 1.0% Ni |
| CAT C | 3.0% Ce 2.0% Ni |
| CAT D | 3.0% Ce 3.0% Ni |
| CAT F | 6.0% Ce 3.0% Ni |

These experiments were performed in a 30 cm ($D_{ext}$=¾″) stainless steel up flow fixed bed reactor. The reactor was loaded with 16 g of catalyst and the remaining volume was filled with Black Silicon Carbide Grit F 6 (Particle size≈2.8 mm) from Panadyne INC. Prior to the packing, this carbide is cleaned at 80° C. with a diluted solution of nitric acid and washed thoroughly with distillate water in order to dissolve possible iron salts present. For the thermal tests the reactor is completely packed with the washed Black Silicon Carbide. The reaction conditions were: 360° C., 100 psi and 1 $h^{-1}$ as the space velocity (SV). The % of $H_2O$ was 5% (v/v) with respect to the 180° C.+ topped bitumen feedstock.

Prior to the catalytic experiments, the catalyst (C (3% Ce-2% Ni) or D (3% Ce-3% Ni)) was reduced in situ (in the reactor) at atmospheric pressure by increasing the temperature 5° C./min. Standard reduction conditions for conventional nickel supported catalyst were used: 500° C. and a reduction time of 5 h. After the reduction step, the temperature was lowered to 170° C. under helium atmosphere. After an hour the pressure was raised up to 100 psi and a water flow rate of 12 mL/h was introduced. After 1 h under water flow, the bitumen flow was introduced at a total flow rate of 1.8 mL/h and left at the same temperature 30 minutes. After this time, the water flow was decreased to 0.9 mL/h and the temperature in the catalytic bed was increased from 170° C. to 360° C. at a controlled heating rate of 5° C./min. Once the reaction temperature was achieved, the reaction was led to proceed.

During reaction, the reactor effluent passed through a trap kept at 180° C. and 100 psi to collect liquid hydrocarbon products and through another trap after the back pressure valve at room temperature to collect $H_2O$ and light hydrocarbons. The effluent gases were analyzed periodically on-line via gas chromatography. The liquid hydrocarbons produced were collected from the trap and analyzed. The pilot plant schematic representation is shown in FIG. 8.

Although the temperature used for the VGO experiments in the micro-pilot plant (400° C.) is in the top of the 280-420° C. range, experiments on different feedstocks showed that this thermal level may, in some cases, be less desirable to be used for bitumen, as formation of coke may occur in some cases. Thus, for the first set of tests with the pilot plant, a temperature of 360° C. was chosen from our accumulated experience on reactivity of bitumen.

Figure 10:
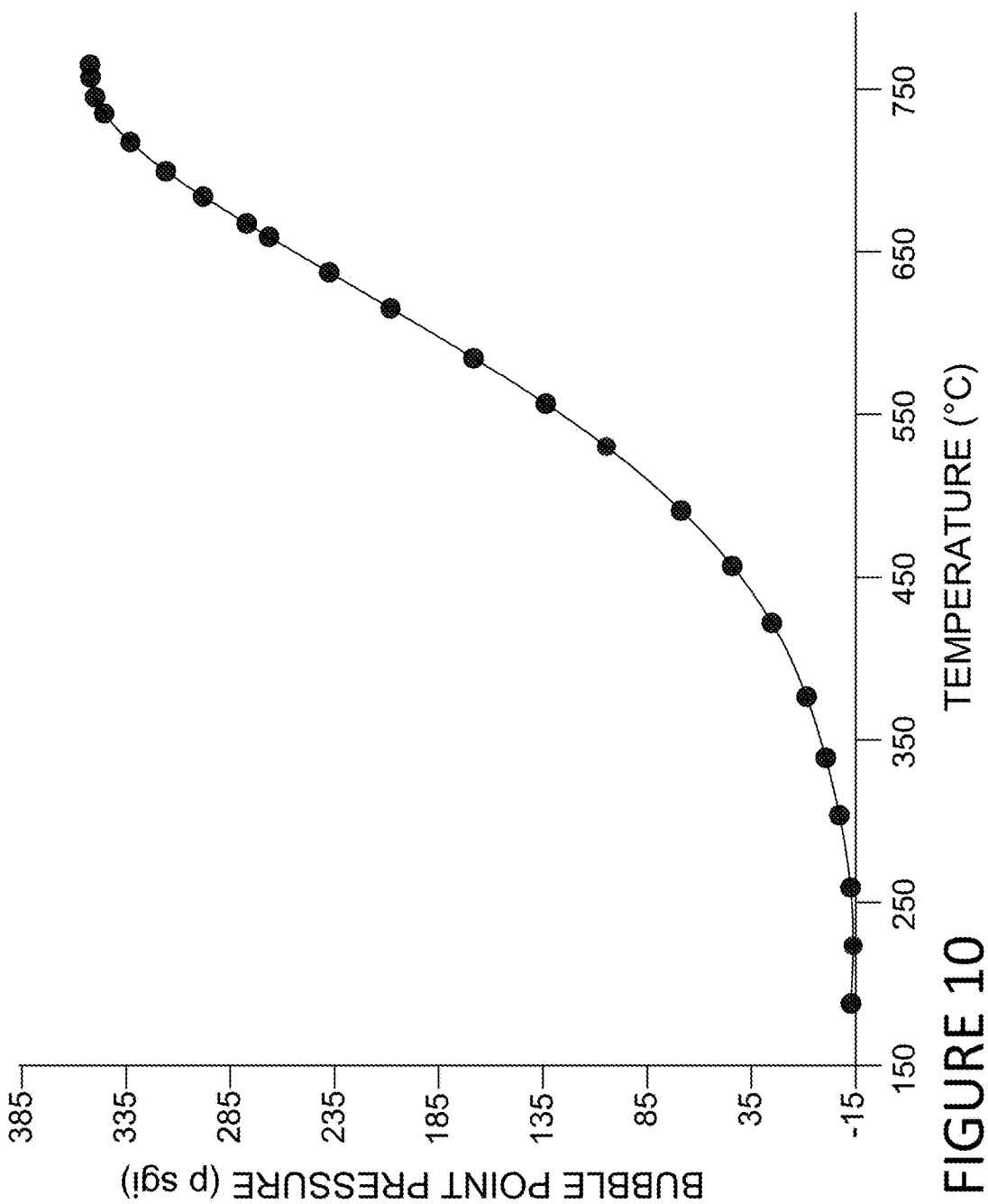
FIG. 10 shows predicted bubble point curve for 180° C.+ cut ($R^2$=1.000)

In order to choose the appropriate reaction pressure (and to avoid losing light components from the feedstock), simulated TBP and BP curves were calculated via simulation. The predicted curve for bubble point pressure is shown in FIG. 10. Importantly, for the chosen temperature of 360° C., the predicted Bubble Point is lower than 35 psi; hence a safe operating pressure of 100 psi was chosen.

For choosing the space velocity, the initial criterion was to be low, in order to compensate for the lower severity of the reaction conditions. As a result, a space velocity of 0.25 $h^{-1}$ was used. Different tests were performed with and without catalysts, at the operating conditions previously selected (360° C., 100 psi and 0.25 $h^{-1}$), to account for purely thermal effects. Table 4 shows the first results obtained for the thermic test using the topped bitumen.

These first results pointed out three main things: i) thermal treatment is capable of decreasing the TAN value by at least 50%; ii) even if thermal cracking produces a very low TAN value, the amount of coke formed is almost 7 times higher than that of Steam Cracking; and iii) in order to assess the role of the catalysts, lower severity conditions should be chosen.

A thermal test and a catalytic test using catalyst D (one of the best catalysts studied) were carried out and the results obtained are shown in Table 5. Results confirm advantages of catalytic processing over thermal TAN removal. Conditions optimization, further reproducibility, and repeated tests as well as longer time on stream may be performed. These results, however, show an effect of the catalyst beyond the errors of the TAN analysis.

TABLE 4

Thermal run results using topped bitumen as feed

| Temp (° C.) | P (psi) | SV ($h^{-1}$) | Time on stream (h) | $H_2O$ Flowrate (mL/h) | Bitumen Flowrate (mL/h) | TAN (mg KOH/g sample) | Conv (%) | Coke yield* (%) |
|---|---|---|---|---|---|---|---|---|
| 360" | 100 | 0.25 | 20 | 0.18 | 4.5 | 0.48 | 6 | — |
| 360" | 100 | 0.25 | 44 | 0.18 | 4.5 | 0.52 | 6 | 0.05 |
| 360 | 100 | 0.25 | 21 | 0 | 4.5 | 0.13 | 6 | 0.34 |

*% Coke yield is defined as (mass of coke produced/mass of fed)*100
"Same run

The experimental TAN value of the feedstock is 1.2 mg KOH/g sample.

The reduction of TAN, using the improved formulation catalyst D is 75% (0.3 vs. 1.2 mg KOH/g sample). A TAN number of 0.3 mg KOH/g sample would label bitumen as low TAN Bitumen.

TABLE 5

Preliminary performance of the TAN reduction process using catalyst D, as implemented in the pilot plant, compared to similar conditions set up for the thermal test

| Run | Temp (° C.) | P (psi) | SV ($h^{-1}$) | Time on stream (h) | $H_2O$ Flowrate (mL/h) | Bitumen Flowrate (mL/h) | TAN (mg KOH/g sample) | Conv (%) |
|---|---|---|---|---|---|---|---|---|
| Thermal | 360 | 100 | 1 | 7 | 0.9 | 18 | 1.0 | 2 |
| Cat D | 360 | 100 | 1 | 7 | 0.9 | 18 | 0.3 | 2 |

The experimental TAN value of the feedstock is 1.2 mg KOH/g sample.

Example 4

Further Catalytic Testing

The unit employed for further catalytic testing is shown in FIG. 8. The system was modified in order to allow sampling at longer periods. The main changes were made to the separation system (hot and cold) where the capacity for holding the samples was increased from 125 mL to 375 mL for the hot separator, and from 75 mL to 125 mL for the cold separator. Minor changes were also made in the gas lines.

Prior to the reaction, the solids were reduced in situ. The reduction conditions are given in Table 6.

TABLE 6

| Reduction Conditions | |
|---|---|
| Condition | Value |
| Reduction temperature (° C.) | 500 |
| Reaction Pressure (psi) | atmospheric |
| Reduction time (h) | 5 |
| Reduction gas | Hydrogen |

Figure 11A:
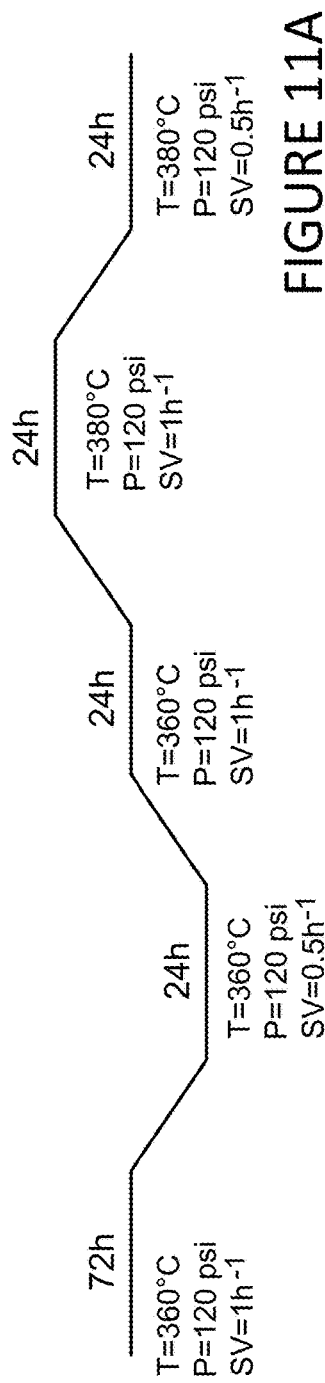
FIGS. 11(A-C) show the reaction conditions and time on stream used in a test of catalyst C.
Figure 11B:
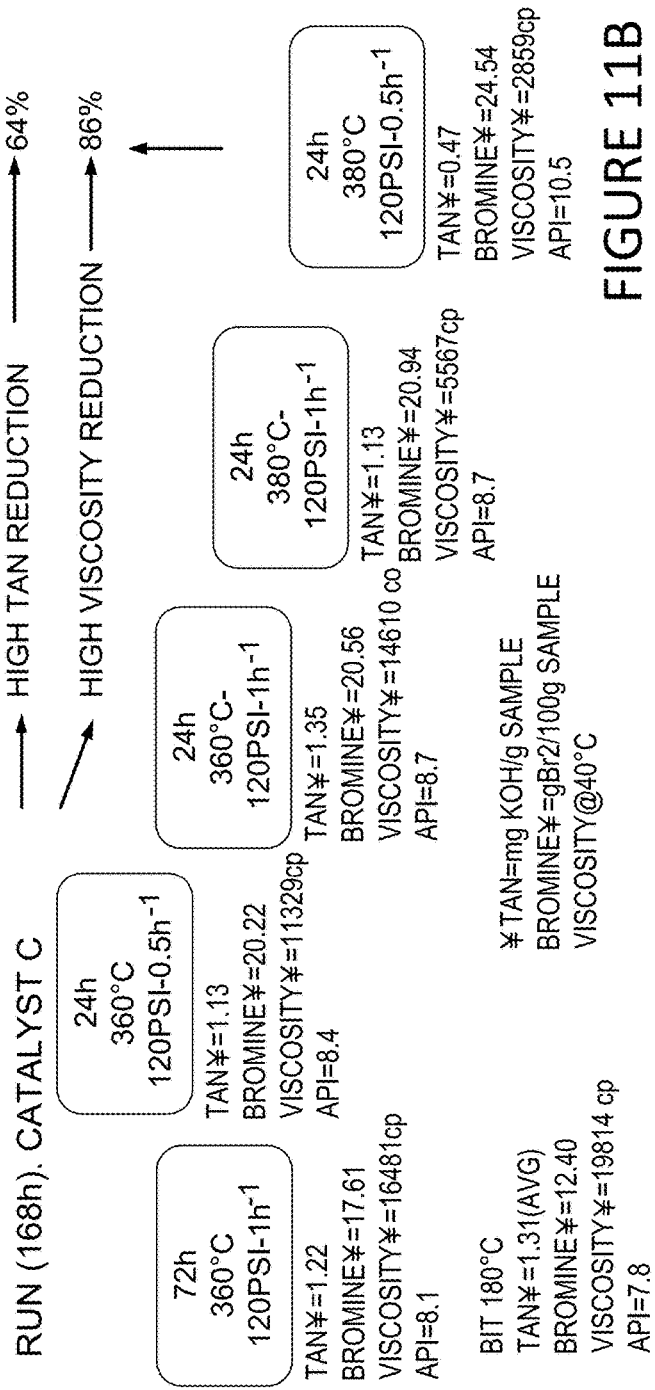
Figure 11C:
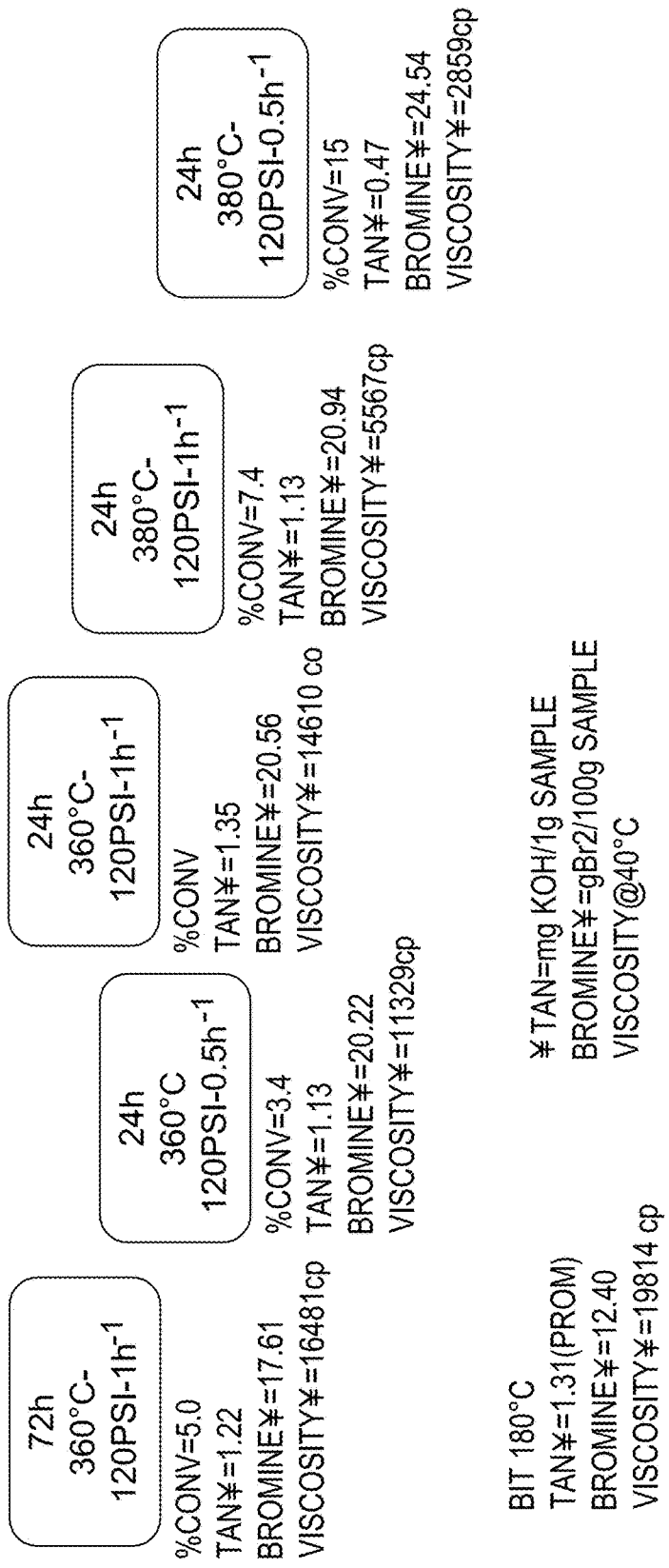

Catalysts C and D (3% Ce-2% Ni and 3% Ce-3% Ni, respectively) were used for the catalytic testing because they showed the best performance in previous tests with VGO as described above. A longer test (168 h) was conducted with catalyst C in order to evaluate the effect of the space velocity and temperature. The conditions studied and the time on stream are shown in FIGS. 11(A-C). The test over 168 h (shown in FIG. 11(A)) was performed with catalyst C, and produced high TAN reduction (64%) and high viscosity reduction (86%) (see FIG. 11(B)), as well as low olefin content (see FIG. 11(C)).

For catalyst D, the conditions 380° C., 120 psi and 0.5 $h^{-1}$ were used, and the reaction time was 72 h. Results (shown in FIG. 12) show significant TAN reduction, and viscosity reduction. In this case, both a TAN reduction and a viscosity reduction were observed. In certain embodiments of processes as described herein, TAN may be reduced, viscosity may be reduced, or both viscosity and TAN may be reduced.

Figure 13:
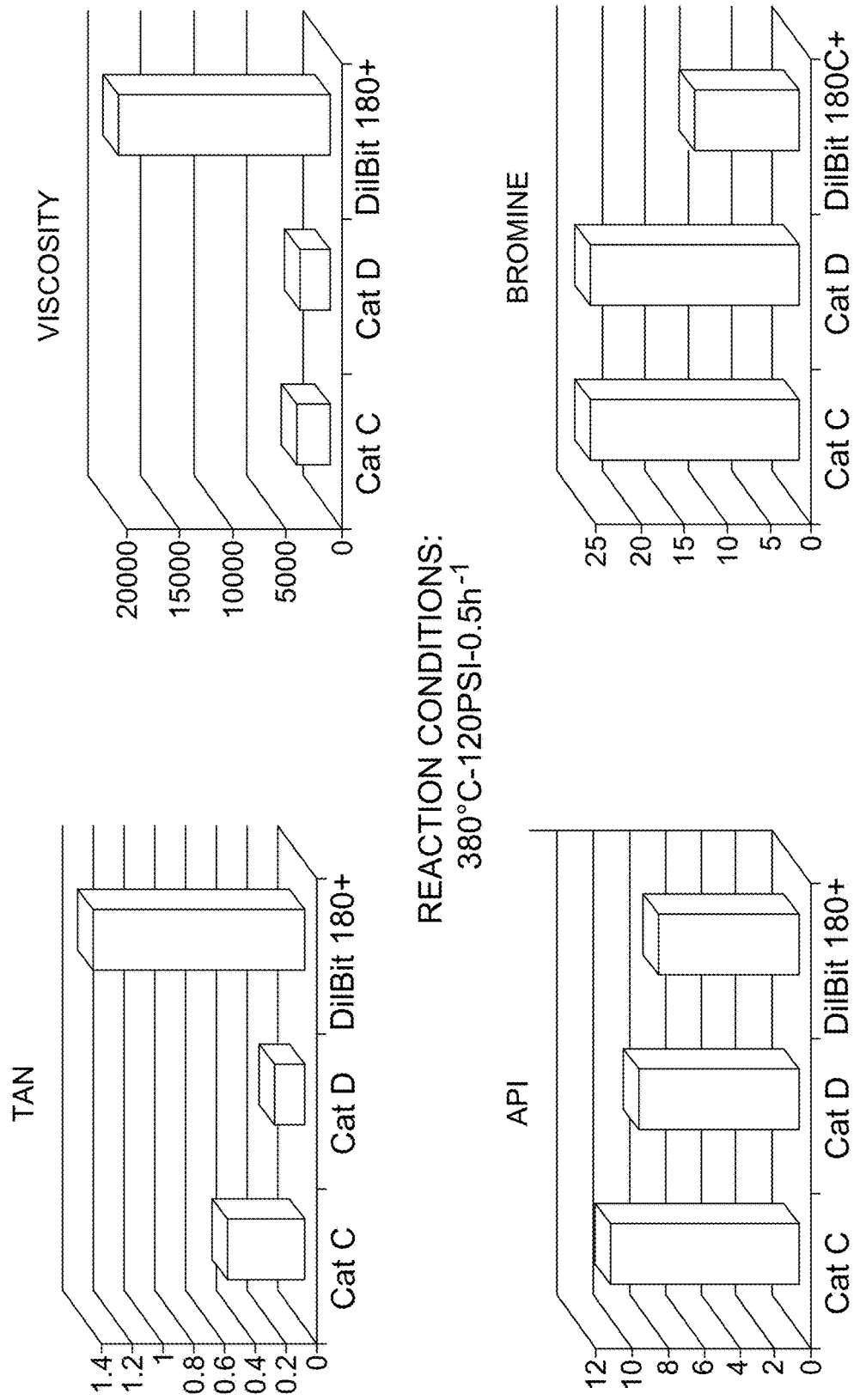
FIG. 13 shows TAN, Viscosity, °API, and Bromine results of dilbit 180° C.+ compared to the feed under catalyst C (Cat C) and catalyst D (Cat D) treatment conditions.

FIG. 13 shows TAN, Viscosity, °API, and Bromine results of dilbit 180° C.+ compared to the feed under catalyst C (Cat C) and catalyst D (Cat D) treatment conditions. The results obtained show that the process produces a low TAN and low olefin formation for bitumen 180° C.+. Not only was TAN improved, but a significant decrease in viscosity was also obtained, which is also desirable, as viscosity improvements may mean, for example, a reduction in the amount of diluting agent needed.

Figure 14:
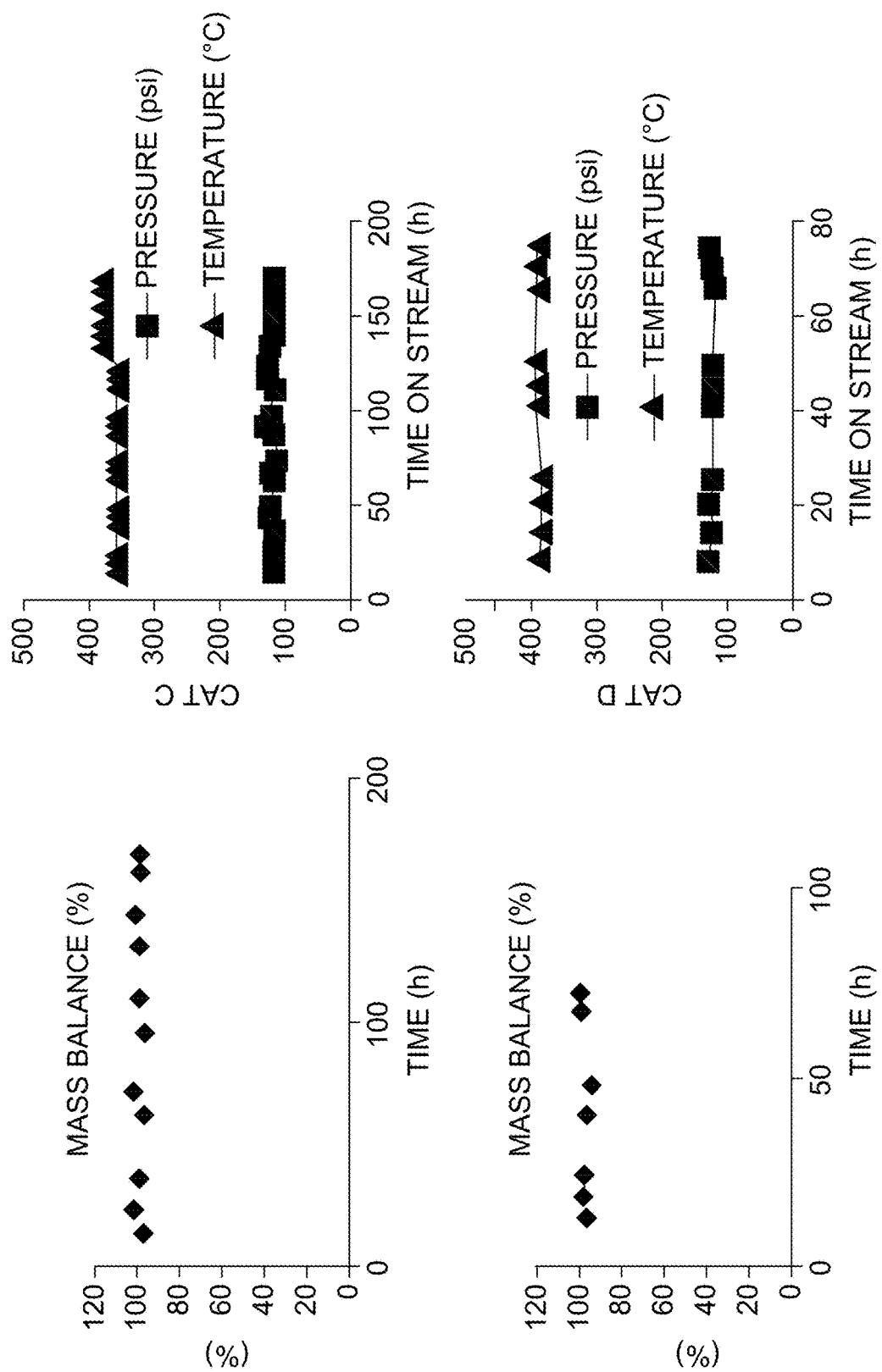
FIG. 14 shows operating conditions with respect to time during testing of catalyst C (Cat C) and catalyst D (Cat D)

FIG. 14 shows operating conditions with respect to time during testing of catalysts C (Cat C) and D (Cat D). The operating conditions were stable during the time on stream for both catalysts. The hydrocarbon mass balances closed at 99%. The 1% difference is within the experimental error.

The effect of space velocity (SV) and temperature on the quality of the liquid products was tested. Table 7 shows the results obtained during the catalyst C test where the effect of temperature and space velocity on conversion, bromine number, °API, TAN and viscosity was studied.

Figure 15A:
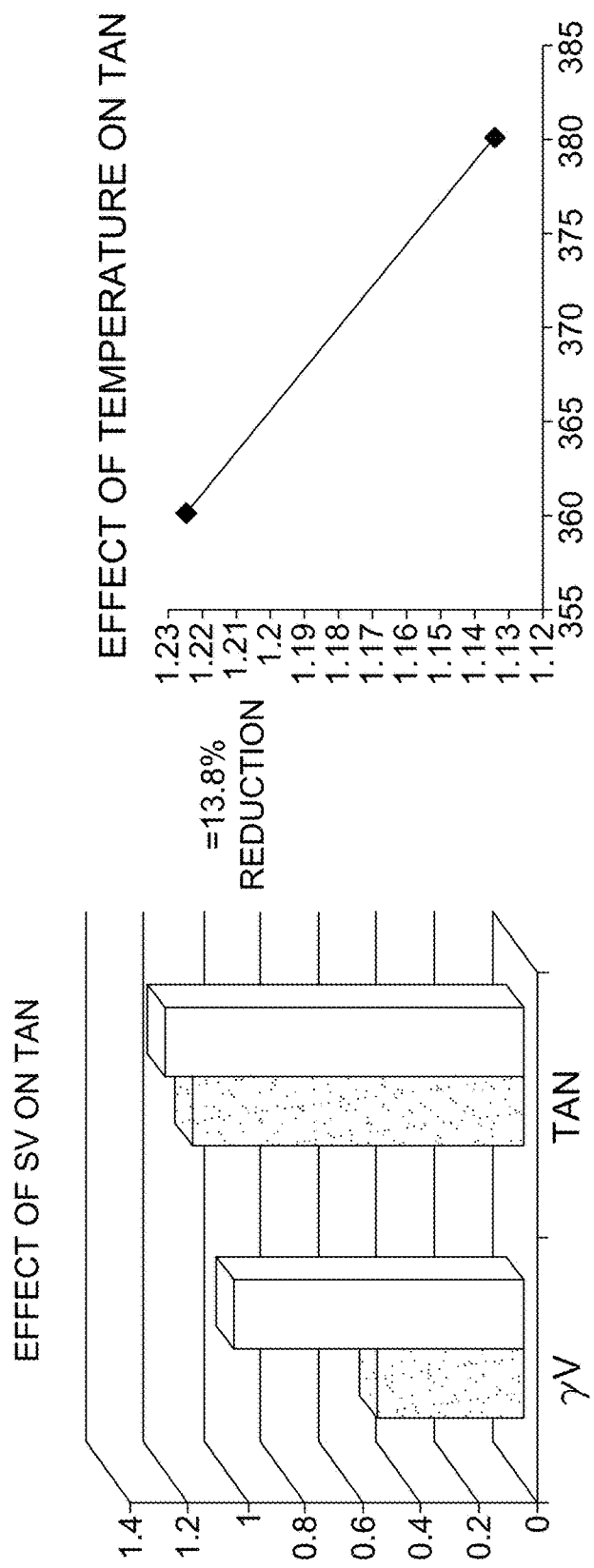
FIG. 15 shows the effect of reaction conditions on TAN and viscosity in the presence of catalyst C: (A) TAN as a function of space velocity (SV) and temperature, (B) viscosity as a function of SV and temperature, and (C) viscosity as a function of both SV and temperature under the following reaction conditions: 380° C., $0.5\ h^{-1}$, and 120 psi.
Figure 15B:
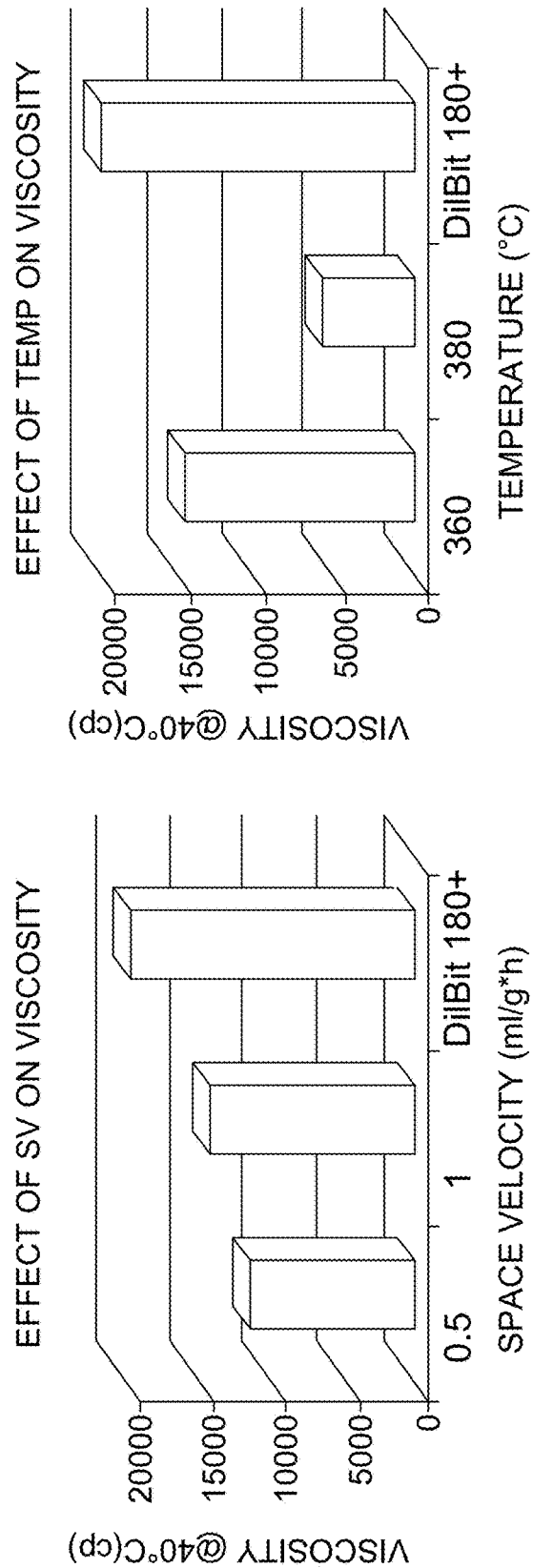
Figure 15C:
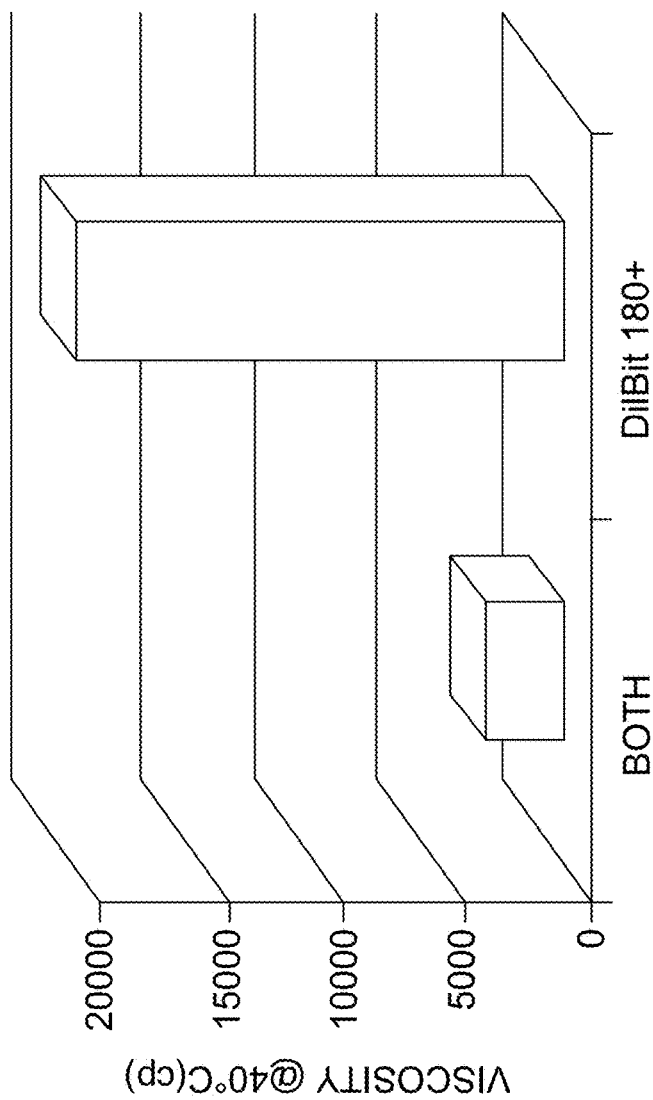

The decrease in SV or the increase in temperature (in the studied range) did not significantly modify the quality of the product, with the exception of the viscosity which decreased dramatically with the increase in the severity of the reaction. FIGS. 15(A) and 15(B) further illustrate this result, and FIG. 15(C) shows the result of catalyst C (Cat C) treatment at both the higher temperature (380° C.) and SV of 0.5 $h^{-1}$ (and 120 psi), which produced significant viscosity reduction of dilbit 180° C.+. Indeed, when the temperature increases and, simultaneously, the space velocity decreases, a change in the quality of the liquid products is observed; the decrease of the viscosity is dramatic, as shown in FIG. 15(C).

Figure 16:
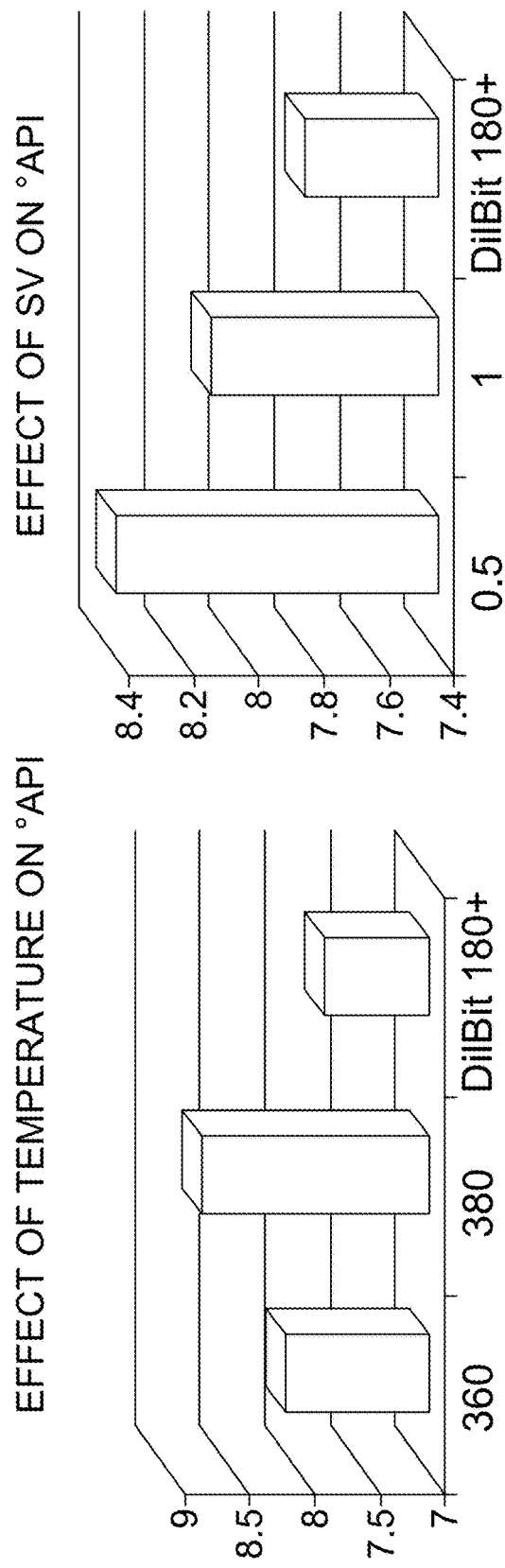
FIG. 16 shows the effects of the SV and reaction temperature on the °API of the liquid products in the presence of catalyst C.

The same trend is observed with °API as shown in FIG. 16 (which used catalyst C), which evidences separated effects of space velocity and temperature on °API.

Figure 17:
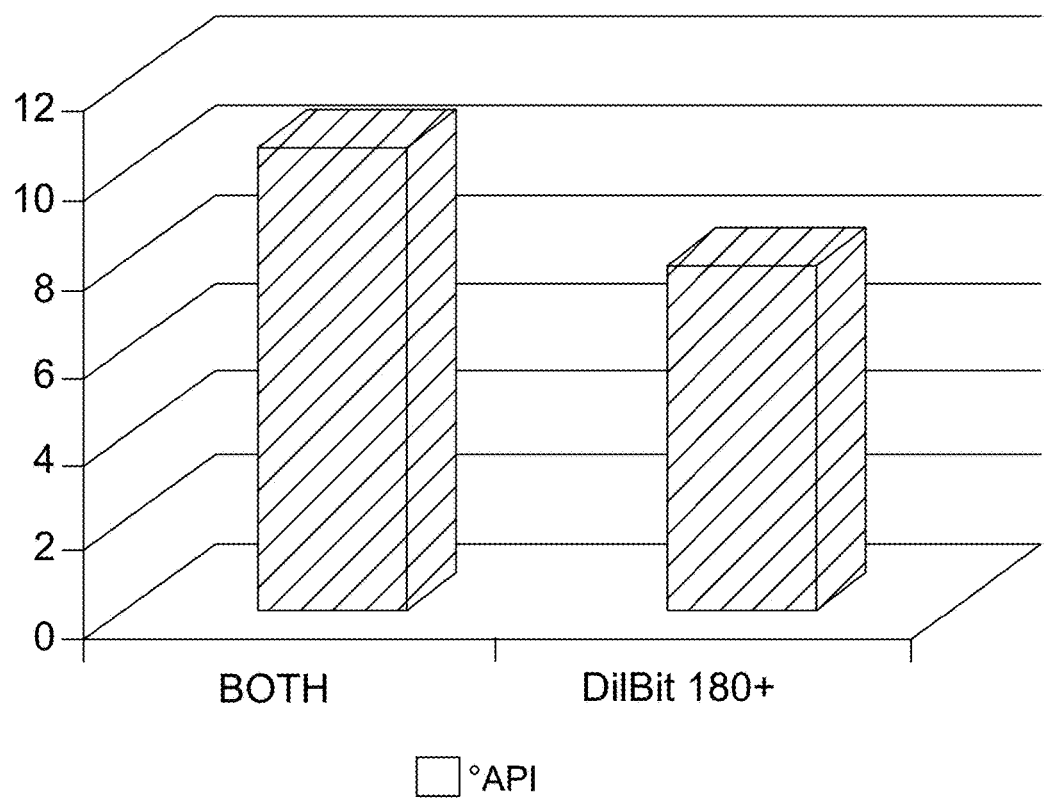
FIG. 17 shows an increase in °API in the presence of catalyst C when the reaction conditions are 380° C., 120 psi, and $0.5\ h^{-1}$.

Again, when both the temperature increases and space velocity decreases, a change in the quality of the liquid products (API Gravity) is observed, as shown in FIG. 17. The gas product distribution for this catalyst (catalyst C) is shown in Table 9.

TABLE 7

Table 7: Effect of reaction conditions on conversion, bromine number, ° API, TAN, and Viscosity

| Time on stream (h) | T ° C. | P (psi) | SV (h$^{-1}$) | % Conv (545+) | Viscosity @40° C. (cp) | Bromine number (gBr2/100 g sample) | TAN (mg KOH/100 g sample) | ° API |
|---|---|---|---|---|---|---|---|---|
| 72 | 360 | 120 | 1 | 5.0 | 16481 | 17.6 | 1.2 | 8.1 |
| 96 | 360 | 120 | 0.5 | 4.8 | 11329 | 20.2 | 1.1 | 8.4 |
| 144 | 380 | 120 | 1 | 7.4 | 5567 | 20.9 | 1.1 | 8.7 |
| 168 | 380 | 120 | 05 | 15 | 2859 | 24.5 | 0.47 | 10.5 |
| Bitumen 180° C. | | | | | 19814 | 12.4 | 1.3 | 7.8 |

The main product of the reaction, for all reaction conditions, was $H_2$. As the reaction advances, and the severity of the reaction increases, a decrease in $H_2$ production was observed, accompanied by a decrease in $CO_2$ production, and an increase in methane production. This result suggests that methanation may be taking place. The formation of $H_2S$ in sufficient quantities suggests that hydrodesulfurization (HDS), or an alternative mechanism of $H_2S$ production, may also be taking place, which may indicate a reduction in sulfur content, for example, a reduction in mercaptans, in the produced hydrocarbons.

Figure 18:
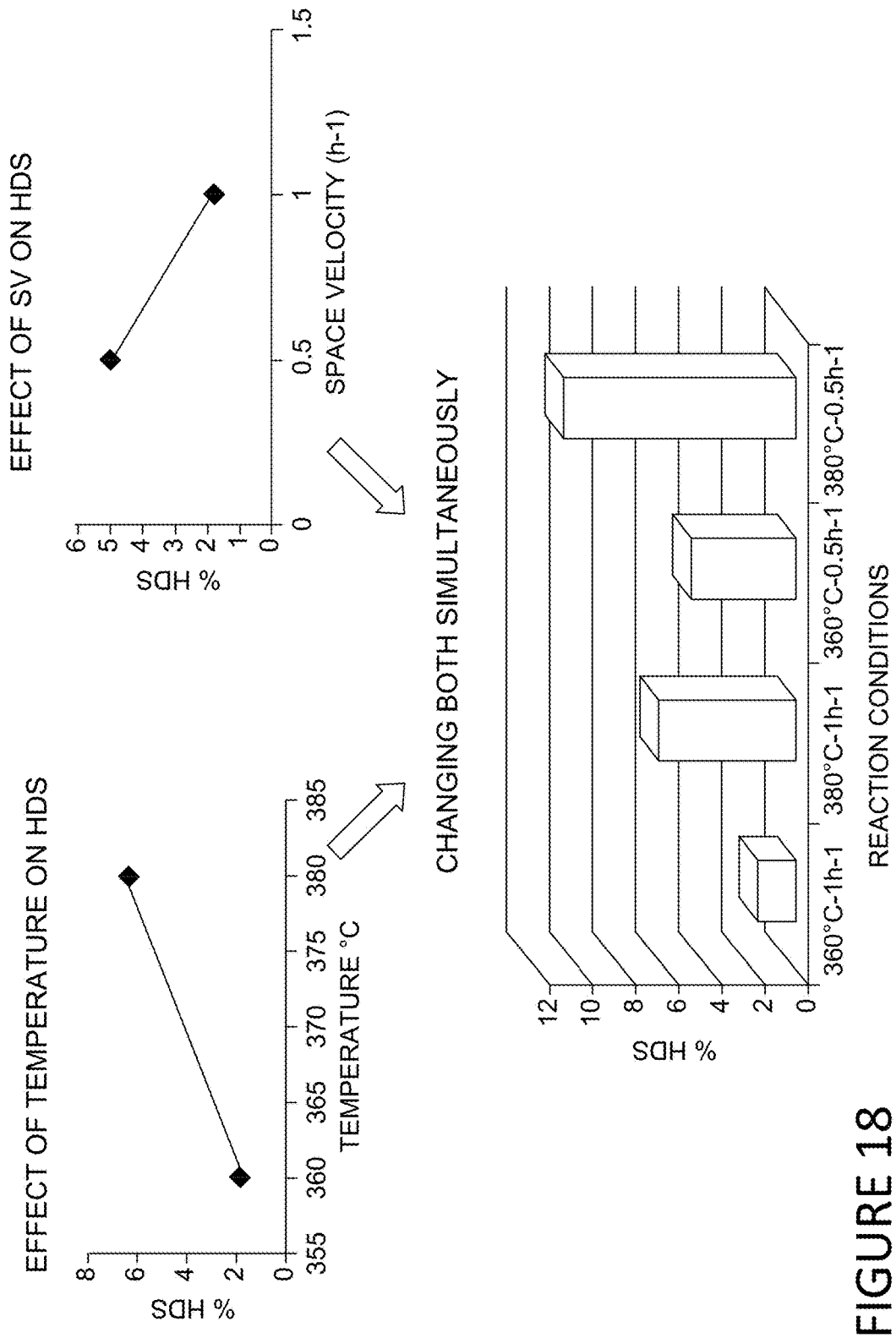
FIG. 18 shows an increase in % hydrodesulfurization (HDS) when the reaction temperature and SV are varied in the presence of catalyst C (120 psi)

FIG. 18 shows the results of HDS obtained for catalyst C. An increase in temperature and decrease in space velocity produced an increase in the HDS of around 5 to 6%; however, the simultaneous change of both parameters produced an increase of around 10%, indicating a synergistic effect of space velocity and temperature on the HDS reaction.

Figure 19:
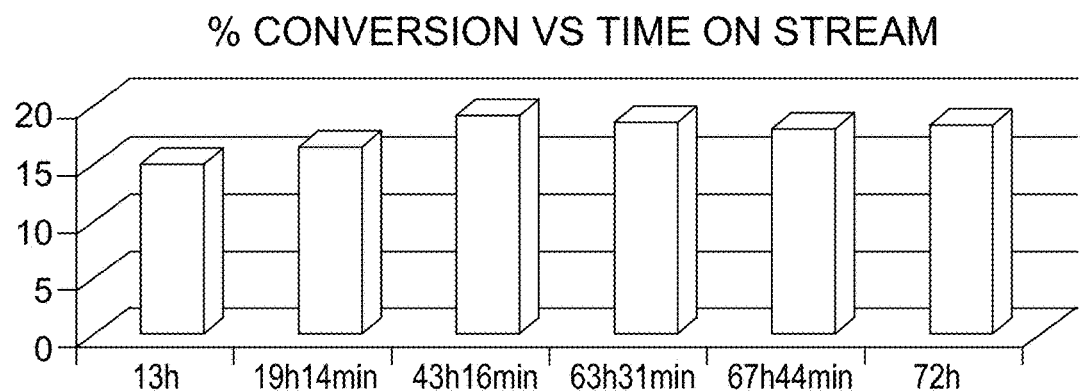
FIG. 19 shows the evolution of conversion with time on stream for catalyst D.

FIG. 19 shows the evolution of conversion with time on stream for Catalyst D. It can be observed that catalyst D was stable during the 72 h of reaction. The reaction was performed at 380° C., 120 psi, and a SV of 0.5 h$^{-1}$. The TAN was reduced to about 0.2, and the viscosity to about 2514 cp. The quality of the product, in terms of TAN, °API, Bromine number and Viscosity was very good. Table 8 shows the results obtained. A considerable reduction in TAN was observed, accompanied by a dramatic decrease in viscosity, and an increase in °API (also indicating a decrease in density).

TABLE 8

Results of TAN, ° API, Bromine Number, and Viscosity of the liquid products for catalyst D

| Sample | % Conv (545+) | Viscosity @40° C. (cp) | Bromine number (gBr2/100 g sample) | TAN (mg KOH/100 g sample) | ° API |
|---|---|---|---|---|---|
| Cat D 72 h | 18 | 2514 | | 0.2 | 8.9 |
| DilBit 180° C.+ | — | 19814 | 12.4 | 1.3 | 7.8 |

The gas product distribution obtained for catalyst D is shown in Table 10.

Figure 20:
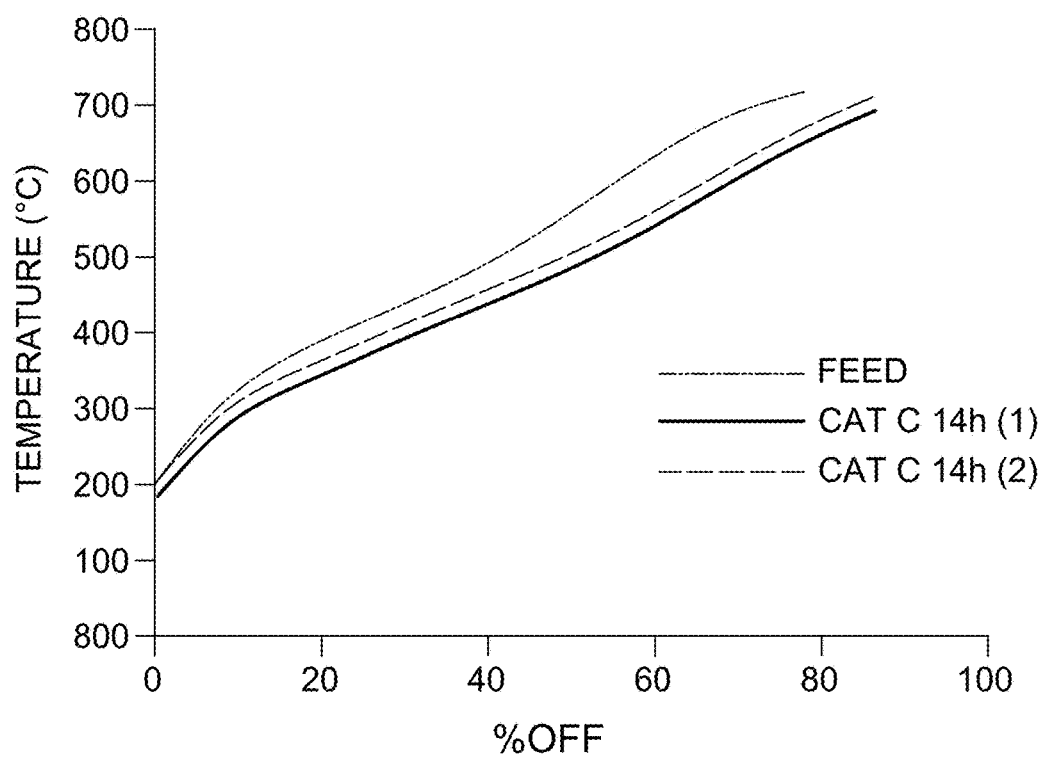
FIG. 20 shows that, compared to the bitumen feedstock itself, catalyst C (under the conditions described) can produce a resulting hydrocarbon fluid for which distillation occurs reproducibly at lower temperatures, further evidencing that the bitumen is partially upgraded.

Gas product distribution of catalyst D was similar to that of catalyst C: the most abundant product was $H_2$, followed by methane, with a low formation of $CO_2$, and moderate amounts of $H_2S$. Reproducibility is shown in FIG. 20, which shows that, compared to the bitumen feedstock itself, catalyst C (under the conditions described) can produce a resulting hydrocarbon fluid for which distillation occurs reproducibly at lower temperatures, further evidencing that the bitumen is partially upgraded.

TABLE 9

Gas product distribution with time on stream for catalyst C

| Time | T (° C.) | P (psi) | SV (h-1) | Conv (%) | $H_2$ | $CH_4$ | $CO_2$ | $C_2$- | $C_2$ | $C_3$- | $C_3$ | $iC_4 + C_4$- | $C_4$ | $IC_3$ | $C_3$ | $H_2S$ |
|---|---|---|---|---|---|---|---|---|---|---|---|---|---|---|---|---|
| 42 h 55 min | 360 | 120 | 1 | 5 | 65.96 | 10.24 | 3.32 | 0.52 | 3.32 | 1.49 | 3.06 | 1.49 | 1.84 | 0.61 | 0.79 | 7.36 |
| 48 h 34 min | 360 | 120 | 1 | 5 | 66.67 | 9.95 | 3.46 | 0.59 | 3.37 | 1.52 | 2.95 | 1.43 | 1.69 | 0.76 | 0.84 | 6.77 |
| 72 h | 360 | 120 | 1 | 5 | 70.13 | 9.67 | 3.14 | 0.31 | 2.75 | 1.42 | 2.75 | 1.42 | 1.73 | 0.55 | 0.71 | 5.42 |
| 85 h 54 min | 360 | 120 | 0.5 | 4 | 69.07 | 8.92 | 2.8 | 0.53 | 3.02 | 1.36 | 2.72 | 1.36 | 1.59 | 0.53 | 0.68 | 7.43 |
| 96 h 12 min | 360 | 120 | 0.5 | 4 | 59.25 | 9.77 | 0.51 | 3.91 | 9.26 | 1.37 | 2.75 | 1.30 | 1.59 | 0.51 | 0.65 | 9.13 |
| 115 h | 360 | 120 | 1 | 4 | 61.72 | 8.46 | 0.77 | 3.85 | 8.60 | 1.33 | 2.59 | 1.26 | 1.54 | 0.56 | 0.63 | 9.14 |
| 131 h 30 min | 380 | 120 | 1 | 7 | 47.21 | 14.21 | 0.75 | 6.76 | 13.94 | 2.08 | 4.27 | 1.67 | 1.88 | 0.55 | 0.92 | 5.75 |
| 162 h | 380 | 120 | 0.5 | 15 | 40.17 | 15.37 | 0.66 | 7.98 | 14.67 | 2.29 | 5.55 | 2.19 | 2.74 | 0.83 | 1.53 | 6.03 |
| 168 h | 380 | 120 | 0.5 | 15 | 45.46 | 14.19 | 0.58 | 7.26 | 13.07 | 2.02 | 4.94 | 2.09 | 2.60 | 0.77 | 1.41 | 5.62 |

Figure 21:
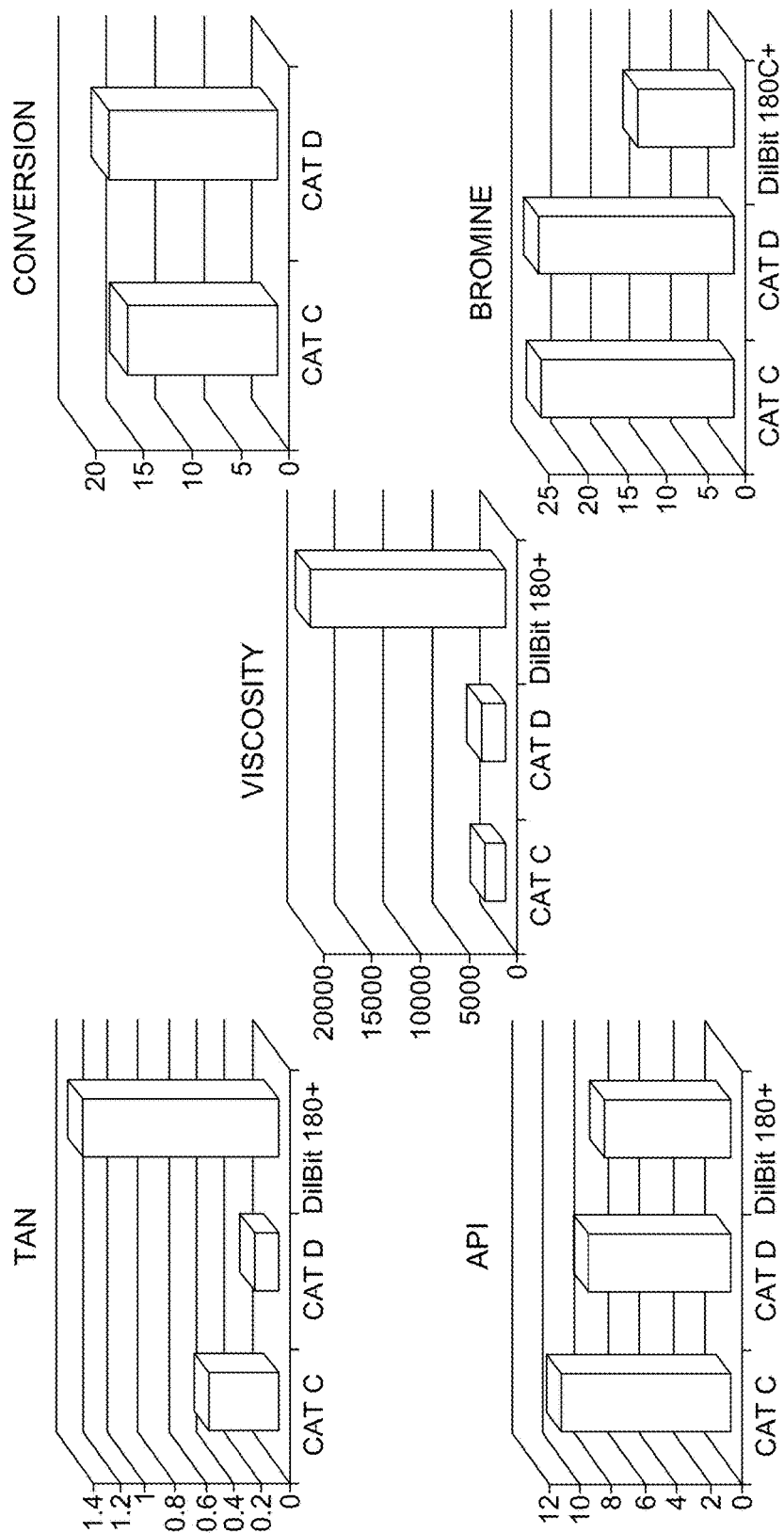
FIG. 21 shows a comparison between the results obtained with catalysts C and D (reaction conditions: 380° C., 120 psi, $0.5\ h^{-1}$)

FIG. 21 provides a comparison between the results obtained with catalysts C and D. Reaction conditions were 380° C., 120 psi, and 0.5 h$^{-1}$. Viscosity value is determined at 40° C. The catalysts behave similarly. Longer reaction times with these catalysts may be performed in order to further evaluate stability. The results obtained during this testing showed that the processes were successful for treating bitumen 180° C.+: low TAN along with low olefin formation. Additionally, an improvement in °API and a reduction in viscosity were achieved. The dramatic decrease in viscosity would likely positively impact the amount of diluting agent needed.

The results obtained so far are successful and promising. The person of skill in the art will recognize that it may be possible that the conditions studied may be varied and/or further improved without departing from the scope of this application.

Example 5

Extended Tests with Catalyst D

Catalytic long test experiments were performed using catalyst D (Cat D). Operational conditions such as space velocity, water content, and reaction pressure were evaluated, and characterization of the feed and products was performed.

Figure 22:
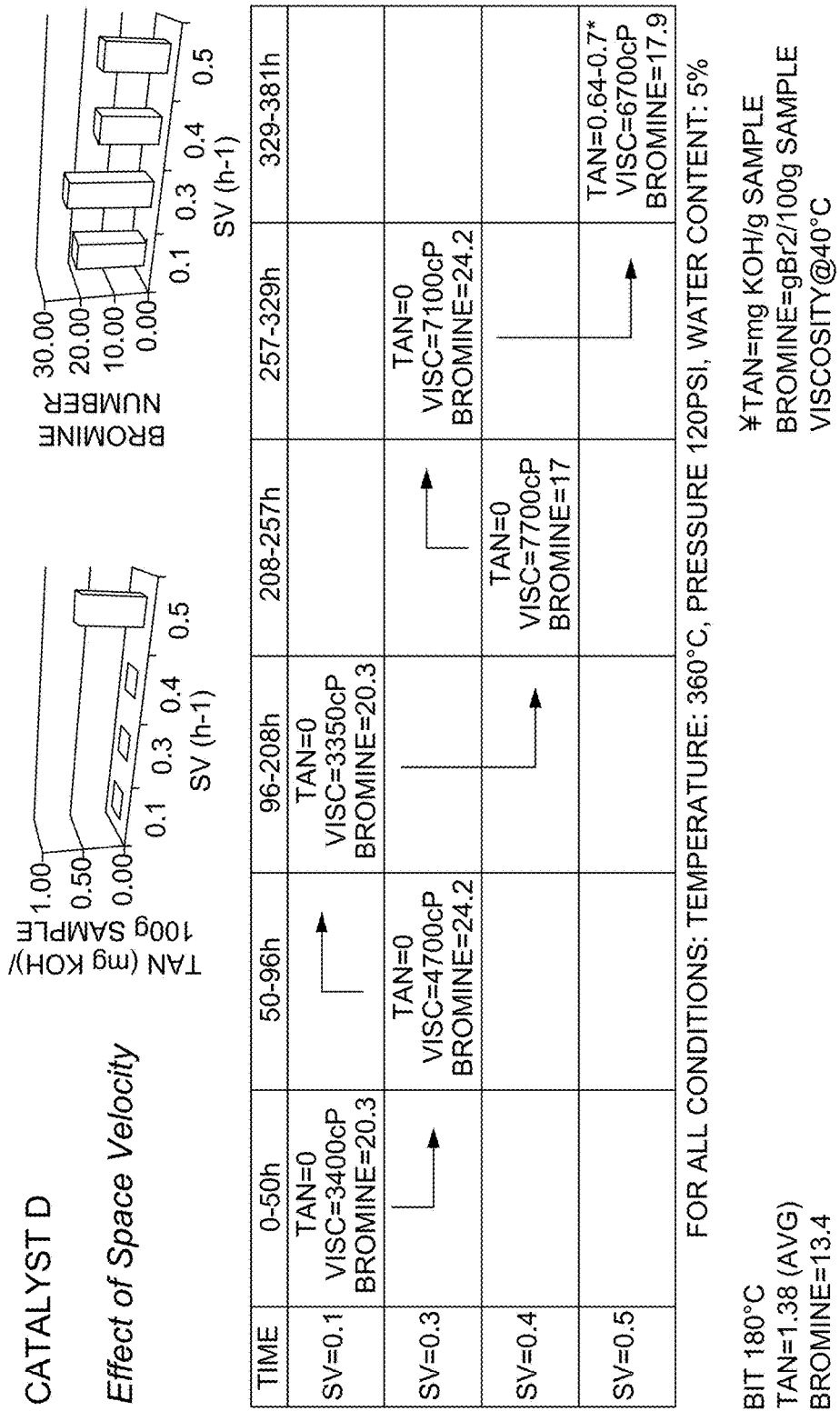
FIG. 22 shows the effects of space velocity in a catalyst D process.

FIG. 22 shows the effect of space velocity in a catalyst D process. Conditions were as follows: temperature of 360° C., pressure of 120 psi, and water content of 5%. This extended test with catalyst D implies reproducibility of the process for the first 208 h. The results suggest that at higher space velocity the magnitude of the viscosity reduction is reduced, whereas TAN and viscosity reduction were improved at the lowest space velocity tested.

FIG. 23 shows the effects of water content and pressure on the performance of catalyst D within the process. This data suggests that water content between the tested boundaries does not significantly affect TAN reduction, in contrast to viscosity reduction which is slightly improved at lower water content and density reduction which is slightly improved at higher water content. TAN reduction is enhanced at lower operating pressure. Pressures between tested boundaries do not significantly impact density or viscosity reduction.

once the 350-370° C. temperature breakthrough is passed. Alkenes are reactive compounds that can generate gums and polymers that hamper transportation, storage and refining operations due to solid deposition. Because of this, these compounds are typically unwanted in any petroleum fraction and their presence is routinely used as a guideline for potential problems derived from processing. Unsaturation in petroleum and petroleum products is routinely determined via Bromine number titration [14], which roughly provides the % wt olefins by dividing Br# by 2. In Canada, a method based on $^1$H-NMR (proton nuclear magnetic resonance) has been standardized by CAPP (Canadian Association of Petroleum Producers) for determination of mono-olefin content in bitumen/upgraded bitumen [15]. This $^1$H-NMR method uses a known spike of 1-decene (about 1% wt, known with accuracy to the nearest 0.1 mg) to provide an estimate of mono-olefins by comparing the neat vs. spiked sample [15]. The CAPP methodology was applied to selected samples from this work; results are presented in Table 11.

TABLE 11

Unsaturation determination for select samples using $^1$H-NMR CAPP method [15] and Bromine Number method

| Sample | Mass % Olefin as 1-decene | Bromine Number |
|---|---|---|
| Bitumen 180 C.+ | 0.078 | 12.4 |
| CAT C(2) 72 h 360° C.-110 psi-1 h$^{-1}$ | 0.481 | 17.6 |
| CAT C(2) 96 h 360° C.-120 psi-0.5 h$^{-1}$ | 0.154 | 20.2 |
| CAT C(2) 168 h 380° C.-120 psi-0.5 h$^{-1}$ | 0.491 | 24.5 |
| CAT C(2) 120 h 360° C.-120 psi-1 h$^{-1}$ | 0.396 | 16.1 |
| CAT C(2) 144 h 380° C.-120 psi-1 h$^{-1}$ | 0.407 | 20.9 |
| CAT D(2) 48 h 380° C.-120 psi-0.5 h$^{-1}$ | 0.412 | 24.3 |
| CAT D(2) 72 h 380° C.-120 psi-0.5 h$^{-1}$ | 0.667 | 24.5 |

As shown, the olefin content is below the 1 wt % level for all the tested samples, indicating that the catalytic processes described herein are not expected to induce olefin formation beyond the 1 wt % limit, as shown in this example.

TABLE 10

Gas product distribution with time on stream for catalyst D

| Time | T (° C.) | P (psi) | SV (h-1) | $H_2$ | $CH_4$ | $CO_2$ | $C_2$- | $C_2$ | $C_3$- | $C_3$ | $iC_4 + C_4$- | $C_4$ | $IC_3$ | $C_3$ | $H_2S$ |
|---|---|---|---|---|---|---|---|---|---|---|---|---|---|---|---|
| 39 h 18 min | | | | 44.32 | 13.77 | 0.61 | 7.04 | 12.99 | 1.87 | 4.63 | 1.97 | 2.41 | 0.85 | 1.29 | 8.24 |
| 43 h 16 min | | | | 44.34 | 14.12 | 0.56 | 7.09 | 12.61 | 1.83 | 4.64 | 1.96 | 2.39 | 0.78 | 1.34 | 8.35 |
| 63 h 31 min | | | | 44.03 | 14.63 | 0.61 | 7.50 | 12.99 | 1.98 | 4.91 | 2.08 | 2.52 | 0.92 | 1.47 | 6.34 |
| 67 hr 44 min | 380 | 120 | 0.5 | 43.21 | 13.29 | 0.56 | 6.84 | 12.70 | 1.82 | 4.52 | 1.94 | 2.41 | 0.85 | 1.41 | 10.45 |
| 72 h | | | | 44.23 | 14.03 | 0.59 | 7.15 | 12.90 | 1.88 | 4.70 | 2.00 | 2.45 | 0.85 | 1.39 | 7.83 |

Once again $H_2$ is the predominantly produced gas followed by methane, presumably resulting from a carbon dioxide methanation reaction.

Example 6

Determining Olefin Production

Unsaturated hydrocarbons (i.e. alkenes or olefins) are produced in any refining process where high temperatures are involved, due to thermal cracking reactions that occur Example 7

Fourier Transform Infrared (FTIR) Data

Figure 24:
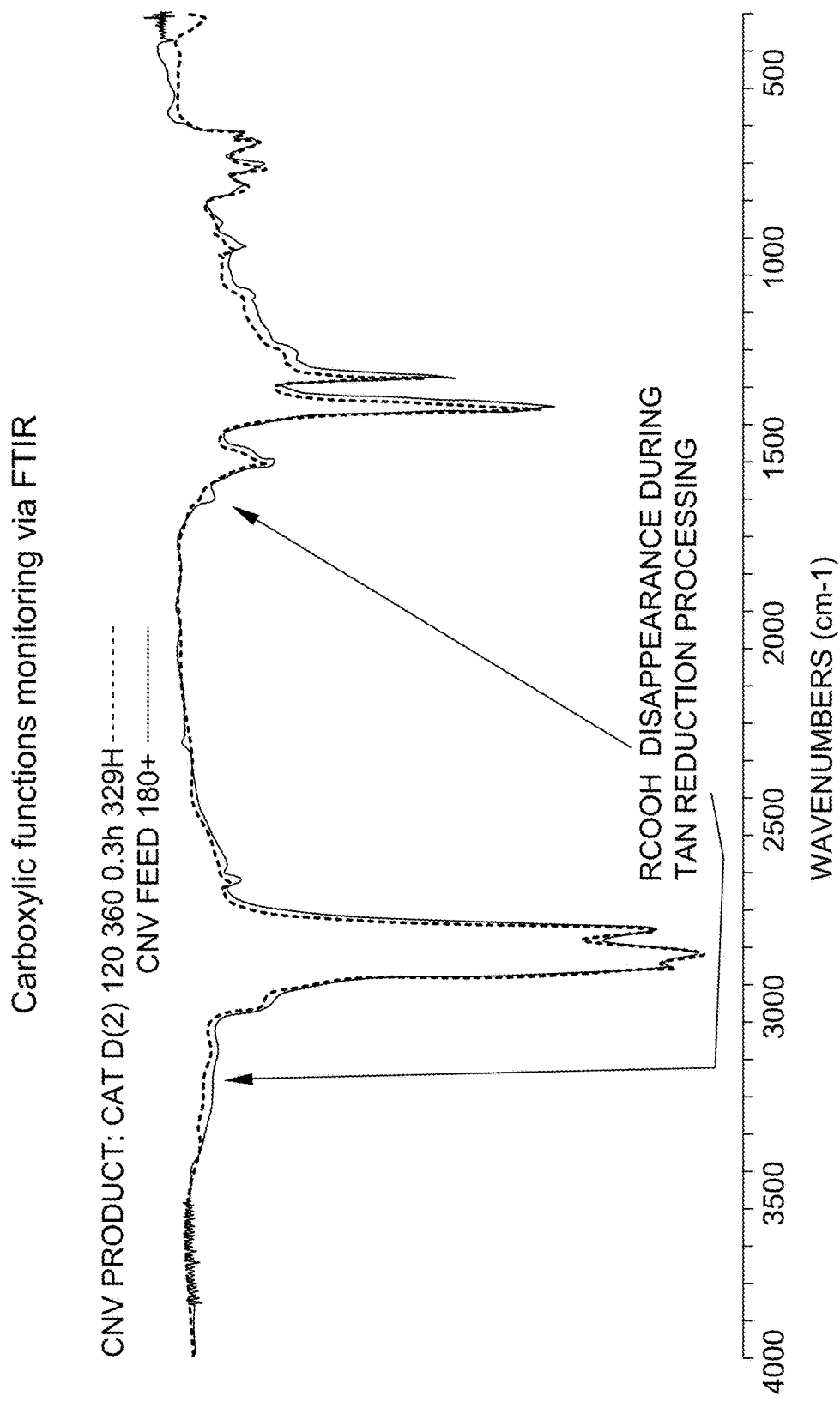
FIG. 24 shows monitoring of carboxylic acid functionality via FTIR of produced hydrocarbon feed and the product of a reaction of the feed in the presence of catalyst D (120 psi, 360° C., $0.3\ h^{-1}$, 392 h)
Figure 25:
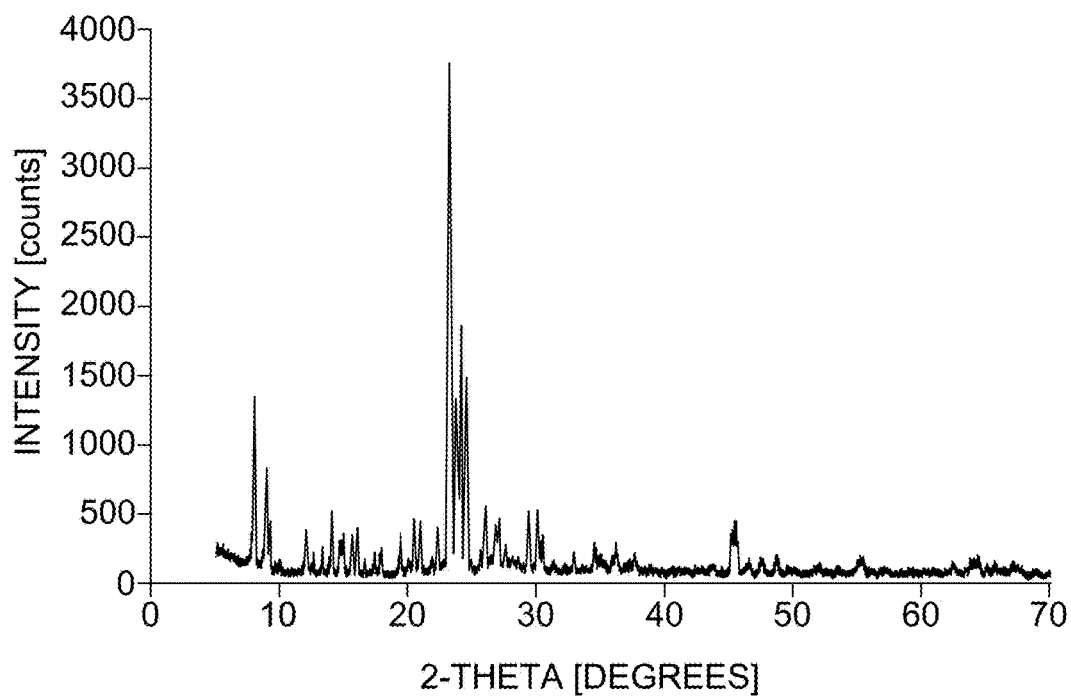
FIG. 25 is an X-ray diffraction pattern of the as-synthesized porous metal-silicate product of EXAMPLE 10 (Sample 3)
Figure 26:
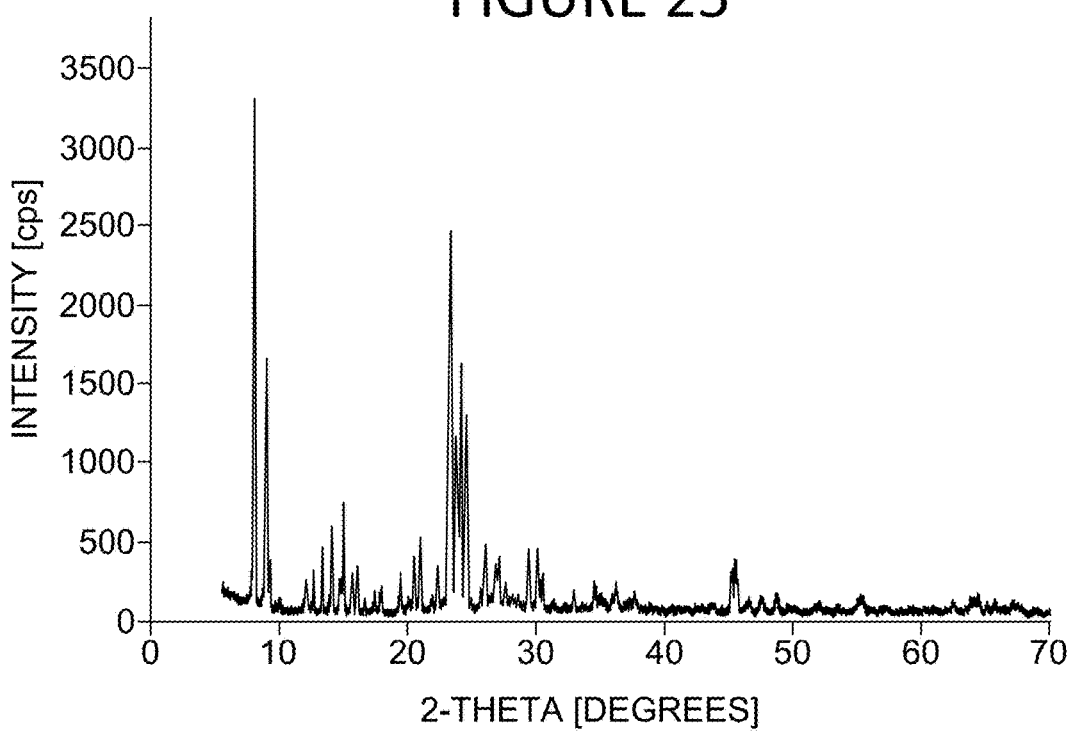
FIG. 26 is an X-ray diffraction pattern of the calcined porous metal-silicate product of EXAMPLE 10 (Sample 3)
Figure 27:
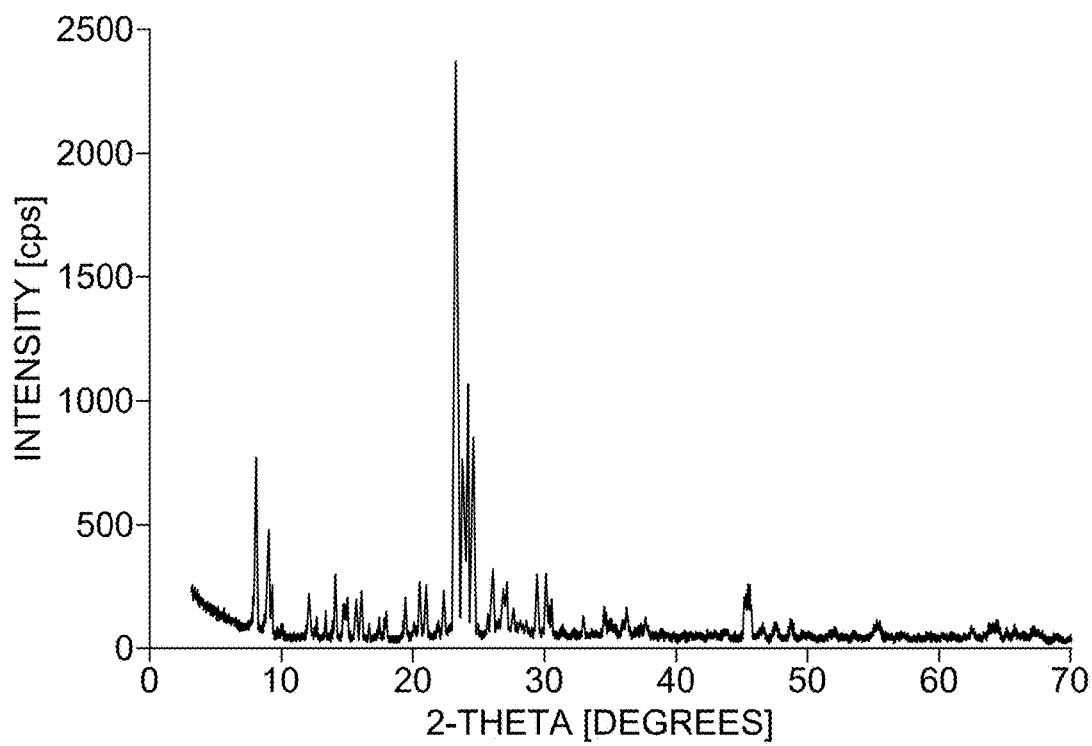
FIG. 27 is an X-ray diffraction pattern of the as-synthesized porous metal-silicate product of EXAMPLE 10 (Sample 4)
Figure 28:
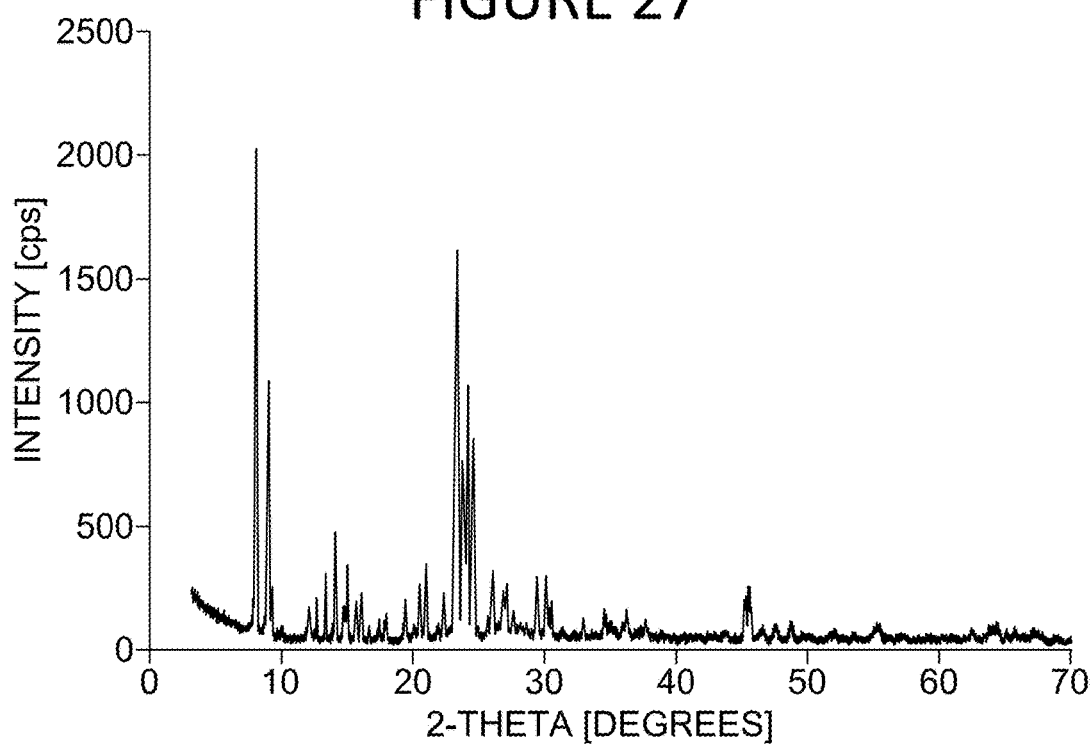
FIG. 28 is an X-ray diffraction pattern of the calcined porous metal-silicate product of EXAMPLE 10 (Sample 4)
Figure 29:
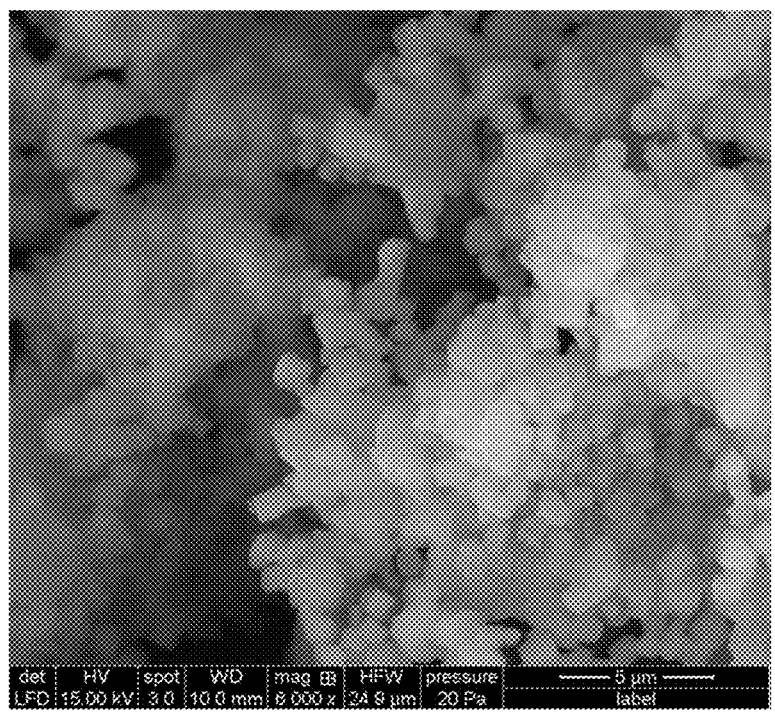
FIG. 29 is a scanning electron image of the calcined porous metal-silicate product of EXAMPLE 10 (Sample 1)
Figure 30:
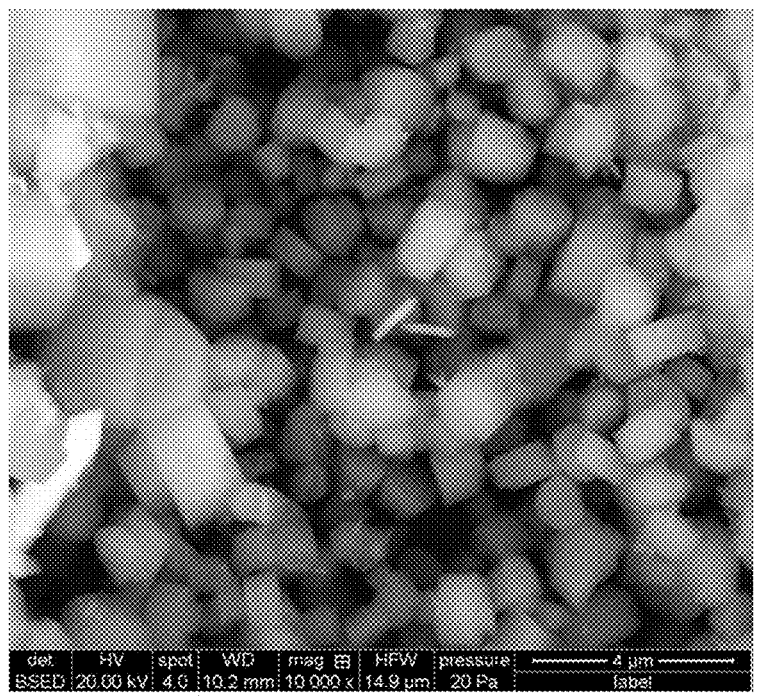
FIG. 30 is a scanning electron image of the calcined porous metal-silicate product of EXAMPLE 10 (Sample 2)
Figure 31:
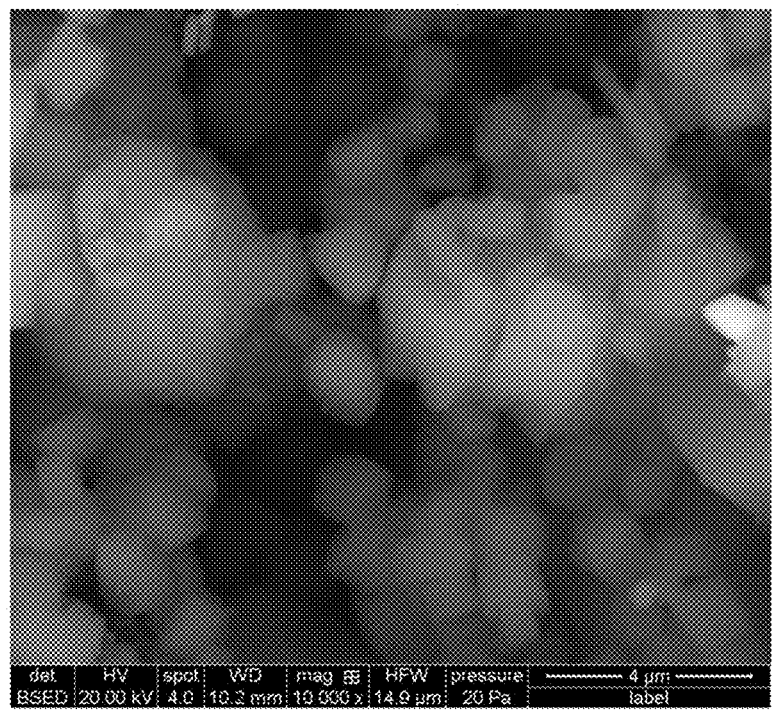
FIG. 31 is a scanning electron image of the calcined porous metal-silicate product of EXAMPLE 10 (Sample 3)
Figure 32:
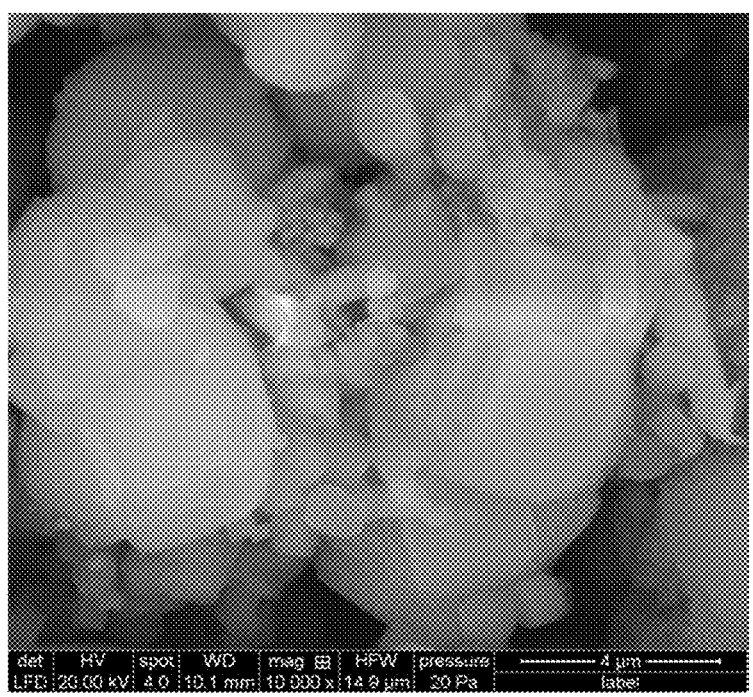
FIG. 32 is a scanning electron image of the calcined porous metal-silicate product of EXAMPLE 1 (Sample 4)

FIG. 24 shows monitoring of carboxylic acid functionality via FTIR of produced hydrocarbon feed and the product of a reaction of the feed in the presence of catalyst D at 120 psi, 360° C., 0.3 h$^{-1}$, and over 392 h. As shown, carboxylic acid disappearance results from catalyst D processing. Results demonstrate that carboxylic acid disappearance results from catalyst D processing, thereby supporting the observation of TAN reduction.

Example 8

Process Considerations

The partial upgrading process as described herein may, in an embodiment, be implemented between, for example, two oil-water separators (see FIG. 4), in order to reduce both the proportion of water present in the system, and the amount of diluent present. Water and diluent(s) unnecessarily increase the volume of the reactor and may in some embodiments negatively impact the performance of the catalytic system. An alternative to this scheme could be the placement of the process downstream of oil-water separation.

The process may, in an embodiment, comprise a heater such as a furnace for bringing the temperature and pressure of the partially diluted bitumen to, e.g., 350-380° C. and 150-350 psi, respectively. The feed may be passed through a catalytic fixed bed having a catalyst formulation. Assuming the water content of the fluid is sufficient and not excessive to provide the range of steam suitable for the process, there may not be need for a flash separator before the furnace. A heat exchanger for pre-heating before the furnace may be incorporated to separate a portion of the water and solvent, bringing these components to acceptable values for the process. The solvent recovered may be reincorporated downstream of the process while the water recovered may be sent to treatment along with the water from, e.g., the free-water knockout (FWKO) vessel. Effluents from the fixed bed reactor may be directed to a flash separator to liberate gases resulting from the reaction (gases may include, for example, $CO_2$, $H_2$, $H_2S$, and/or C1-C4 hydrocarbon gases) in very low proportions, water, and the TAN reduced liquid hydrocarbon product.

Example 9

Contemplated Studies to Identify Suitable Catalysts and Investigate Catalytic Upgrading Processes Such as TAN, Viscosity, Density and/or Sulfur Content Reduction A catalyst suitable for partial upgrading processes as described herein may be any suitable catalyst which produces a TAN, viscosity, density and/or sulfur content reduction in produced hydrocarbons. Example experiments for determining if a catalyst is able to reduce TAN, viscosity, density and/or sulfur content may include any of those described herein, and may include those described below.

A micro-pilot plant unit, such as outlined above, may be used to carry out catalytic experiments in the presence of steam and a fixed bed catalytic reactor. A process for catalytic partial upgrading, including TAN, viscosity, density and/or sulfur content reduction, may be extensively experimentally simulated in the micro-pilot plant using a heating zone to bring the temperature of bitumen and/or dilbit to a range of between about 280° C. and 420° C., at a pressure no higher than about 500 psi, and with a space velocity between about 0.1 $h^{-1}$ and 3 $h^{-1}$. Catalyst may be placed in a conventional fixed bed reactor, followed by a hot separator from which a gas stream rich in steam, $CO_2$ and $H_2S$ (gas products from crude oil de-acidification) may be separated from produced hydrocarbons such as bitumen and analyzed. Mass balance data from the process may be closed within the range of about 96-104% weight. The target may, in certain embodiments, be producing bitumen with a TAN lower than about 1 mg KOH/g bitumen, and in a preferred embodiment lower than about 0.7 mg KOH/g bitumen.

A catalyst, such as those outlined herein, may be synthesized or otherwise obtained, and may be evaluated in a test process over a period of about three weeks in a first step within the set of conditions indicated here, until reaching a TAN of about 0.7 mg KOH/g bitumen or until reaching a TAN of about 1 mg KOH/g bitumen upon deactivation. Catalysts that pass this preliminary long test may, in some embodiments, be suitable catalysts. Catalysts may be further studied by accelerated aging (i.e., high space velocities at temperature, and target TAN lower than about 1 mg KOH/g bitumen).

It will be understood that catalysts suitable for use in catalytic TAN reduction methods and processes as outlined herein may include any catalyst which reduces TAN, optionally through acid decarboxylation, as provided herein, or as may be known to the person of skill in the art having regard to the disclosure provided in this application. Suitable catalysts may include, but are not limited to, Ni-, Cu- or Ce-based catalysts, or catalysts comprising combinations of metals thereof. The catalyst may, in some embodiments, comprise a porous support network allowing contact with acid, but preventing contact with at least some other components of produced hydrocarbons. In an embodiment, a suitable catalyst may catalyze decarboxylation of a carboxylic acid present in produced hydrocarbons. In a further embodiment, the catalyst may catalyze decarboxylation of a carboxylic acid, thereby generating oxygen deficiencies or oxygen vacancies in the catalyst. In yet a further embodiment, the catalyst may be a catalyst in which oxygen deficiencies or oxygen vacancies may be filled through exposure to an oxygen source, thus regenerating the catalyst, which may extend the lifetime of the catalyst.

The oxygen source may be any suitable oxygen source such as water, which may be in the form of steam water vapour. In an embodiment, the oxygen source may be produced water or water contained in produced hydrocarbons, water added to the catalyst in steam, liquid, or water vapour form, or any combination thereof. Other oxygen sources may include, but are not limited to, air, $O_2$, $CO_2$, a peroxide, or another suitable oxygen source as will be known to the person of skill in the art.

A suitable catalyst may be any catalyst which is selected using one, some or all of the methods described in this example, or as previously described herein.

Process variables may, in some embodiments, be evaluated as follows:

Variables evaluation: During an initial variables study (i.e., about 1.5 months), each catalyst (temperature and weight hourly space velocity) may be assessed regarding starting operating conditions for a first long test comparison of about three weeks per catalyst. During this period, at least eight mass balances may be produced by duplicate, with final verification of stability by performing two more mass balances at the first condition tested during the period, for a total of ten mass balances per catalyst. Each mass balance may be submitted to at least some of the following characterization analyses: TAN, Bromine Number, Sim Dist, micro-C, viscosity at 60° C., API gravity at 15.6° C. and/or any other suitable analysis, such as any suitable analysis described herein. Long steady operation: these studies may consist of operating at standard conditions chosen for each catalyst which ensure a starting TAN of 0.7 mg KOH/g bitumen in the processed bitumen. This means each standard condition may be specific to the catalyst, and may be the same or different for each of them. During this period, continuous 24/7 monitoring of a plant may be performed and each test may last a maximum of three weeks if the catalyst keeps producing a bitumen with a TAN of about 1 mg KOH/g bitumen or less. If that value is exceeded, the test may be ended. Daily verification of TAN, Bromine Number and Sim Dist may be performed, by completing one daily mass balance.

Catalyst Aging Operation: catalysts reaching three weeks of long steady operation with a TAN lower than 1 mg KOH/g bitumen may be submitted to this fast aging test. The aging test may comprise increasing the space velocity to between 3-5 times the space velocity tested in the long steady operation, while increasing the operating temperature to a level such that a minimum TAN of 0.7 mg KOH/g bitumen is stably obtained in the processed bitumen. This condition may be performed during several weeks until it deactivates to levels of TAN higher than about 1 mg KOH/g bitumen, or for at least two months of continuous 24/7 operation with TAN lower than about 1 mg KOH/g bitumen, whichever happens first.

One or more illustrative embodiments have been described by way of example. It will be apparent to persons skilled in the art that a number of variations and modifications can be made without departing from the scope of the invention as defined in the claims.

Detailed Description of Catalyst Formulations and Synthesis

In furtherance of the description of the catalyst formulations provided above, the present invention is directed to novel metallo-silicate catalytic porous materials (MSCs) which in their calcined form have a composition of the molar relationship:

$$SiO_2:mCeO_2:nXO \qquad (1)$$

where X is a divalent element selected from the group consisting of nickel, copper, zinc and mixtures thereof and where m is from 0.001 to about 0.5 and n is from 0.001 to about 0.5.

The invention further describes a method for preparation of the MSC materials. The method generally includes the steps of:
a) preparing a gel within an acidic media (preferably having a pH less than 2) containing the cerium, divalent elements and silicon and an organic moiety (R);
b) increasing the pH of the acidic media to the desired value (usually greater than 6 and in most cases in the range of 12-14).
c) forming an MSC composition by hydrothermal treatment.

In an as-synthesized form (i.e after hydrothermal treatment), the MSC materials contain the organic moiety (R), usually of the tetraalkylammonium family, which is used to guide the production of the desired porous system in the silicate framework. R can be removed by calcination.

Also, in a further embodiment, the compositions may include an additional inorganic cation (M) such as sodium, potassium, lithium, or mixtures thereof. On an anhydrous basis and in terms of mole ratio of oxides, the as-synthesized materials have the following compositions:

$$aM_2O:bR:SiO_2:mCeO_2:nXO:yH_2O:zAC \qquad (2)$$

where M is an inorganic cation selected from sodium, potassium, lithium, cesium, rubidium or a mixture thereof, R is an organic moiety having structure directing properties for porosity, a is from 0 to 10 and b is from 0.01 to 0.2, m is between 0.001 and about 0.5; n is between 0.001 and about 0.5; y is from 1 to 300; z is from 0.1 to 3; X is nickel, copper or zinc or a combination thereof; AC is an acid source; and wherein after a hydrothermal treatment the composition has a silicate framework having a micro and/or meso porous structure The porous metallo-silicate materials of the present invention can be synthesized with silicon, cerium and divalent chemical elements like nickel, copper, zinc or mixtures thereof having the chemical composition $SiO_2:mCeO_2:nXO$ as described above; suitable silicate frameworks are for instance: any siliceous micro-porous structures, for instance, the siliceous MFI, MEL, MTW, FER, MEI, MTT, MWW, STT, SGT or RTE structures (using the three letter code rules set up by the International Union for Pure and Applied Chemistry—IUPAC—[1] and adopted for each framework type by the International Zeolite Association (IZA)), any ordered siliceous meso-porous structures (OMS) with pore sizes between 2 and 50 nm as defined by IUPAC and which are usually referred in the literature by letter codes that may be followed by a number [2] like SBA-15, SBA-1, SBA-2, SBA-3, HMS, MCM-41, MCM-48, MCM-50, MSU, TLCT, or CMK structures, any disordered siliceous meso-porous structures (DMS) and combination of them.

The MSC materials of the present invention are thermally stable and in the calcined form exhibits textural properties which makes them particularly useful in processes of steam catalytic TAN reduction of hydrocarbon feedstocks. If present, the original alkaline cation of the as-synthesized material can be left in the calcined solid or can be replaced in accordance with techniques well known in the art, by ion exchange with other types of cations. Aluminum and iron are not required in the prepared materials; however, traces of these elements may end up in the produced porous metallo-silicate by being present as trace contaminants in the employed sources of raw materials.

Preferentially, the as-synthesized materials are calcined to remove all or a great part of the used organic template. This thermal treatment is generally performed by heating at a temperature of at least 450° C. for at least 1 minute and generally no longer than 24 hours. For convenience, air at atmospheric pressure is desired for the thermal treatment.

The MSC materials of the present invention have useful properties in the steam catalytic TAN reduction of hydrocarbon feedstocks. The MSC materials of the present invention may be incorporated with binders, clays, silica, alumina, combinations or other materials, which are known in the art to produce desired shapes and sizes suitable for their use in the steam catalytic TAN reduction of hydrocarbon feedstocks. The MSC materials can be modified with one or more elements or compounds by deposition, occlusion, ion-exchange or other techniques known to those skilled in the art to enhance, supplement or alter the properties or usefulness of the novel porous metallo-silicate of the present invention.

The MSC materials of the present invention can be prepared from a reaction mixture containing a source of silicon, a source of alkali ions (M), such as sodium, potassium, lithium, cesium, rubidium, mixtures thereof, a source of cerium, a source of divalent elements (X) such as nickel, copper, zinc or mixture thereof, a source of organic template (R) such as tetraalkylammonium ions, a source of acid (AC) such as sulfuric acid, nitric acid, hydrochloric acid and water, with a reaction mixture preferably having a composition, in terms of mole ratios of oxides, within the ranges shown in Table 12.

TABLE 12

Gel Preparation

| Mole Ratio of Reactants | Useful range | Preferred range |
|---|---|---|
| $XO/SiO_2$ | 0.001 to 0.5 | 0.01 to 0.5 |
| $CeO_2/SiO_2$ | 0.001 to 0.5 | 0.01 to 0.5 |
| $M_2O/SiO_2$ | 0.01 to 10 | 0.1 to 5 |
| $R/SiO_2$ | 0.01 to 2 | 0.05 to 1 |
| $AC/SiO_2$ | 0.1 to 3 | 0.3 to 2 |
| $H_2O/SiO_2$ | 1 to 300 | to 200 |

The preferred sources of $SiO_2$ include but are not limited to sodium silicate (water glass), colloidal silica, sodium metasilicate, fume silica, silicon oxide and/or clays. The preferred sources of $CeO_2$ include but are not limited to soluble salts, hydroxides and/or oxides of cerium. The preferred sources of XO include but are not limited to soluble salts, hydroxides and/or oxides of nickel, copper and/or zinc. The preferred sources of R are tetraalkylammonium salts and/or hydroxides. The preferred sources of M are salts, oxides and/or hydroxides of sodium, potassium, lithium, cesium and/or rubidium, the preferred sources of AC are sulfuric acid, nitric acid, and hydrochloric acid.

Preparation of the gel mixture requires initially that cerium and the other metals to be in an acidic solution together with the silicon source, and then, the pH is raised up to the desired value for subsequent hydrothermal treatment. Thus, a preferred addition of reactants is suggested. The hydrothermal treatment can be carried out at either static or stirred conditions in a suitable reactor vessel, such as for instance, stainless steel autoclaves. The useful range of temperatures required for hydrothermal treatment is from about 25° C. to about 250° C. for a period of time sufficient to complete the production of the MSC at the given temperature, for instance, from about 1 hour to about 30 days. The hydrothermal treatment is carried out preferably at autogenous pressure. After the hydrothermal process is carried out, the produced solids are separated from the mother liquor, washed with water and dried. Drying can be accomplished from room temperature up to about 150° C. for a period of time of 6 hours up to 48 hours.

The MSC materials of the present invention, their preparation method and their use as catalysts for the steam catalytic reduction of total acid number in hydrocarbon feedstocks is further described with reference to the following examples.

Example 10

The following procedures were conducted to obtain six different compositions of porous cerium-nickel-silicate MSC materials having an MFI crystalline structure (termed Ce—Ni-MSC-MFI) of the present invention. In these preparations, the following reactants were employed; sodium silicate (26.5 wt. % $SiO_2$, 10.6 wt. % $Na_2O$), cerium (III) nitrate, nickel (II) nitrate, sodium hydroxide, tetrapropilammonium (TPA) bromide, sulfuric acid and deionized water. The salts were dissolved in a diluted sulfuric acid solution, and then, the sodium silicate was added to the acidic solution to produce an acidic gel mixture. Then, the sodium hydroxide was added slowly until the pH was raised to approximately 11-12. The mixtures were stirred for 30 minutes to produce six samples having a uniform fluid gel with the molar compositions shown in Table 13.

TABLE 13

Sample Compositions
MIXTURE COMPOSITIONS (MOLE RATIOS)

| Sample | $CeO_2/SiO_2$ | $NiO/SiO_2$ | $Na_2O/SiO_2$ | $TPA/SiO_2$ | $H_2SO_4/SiO_2$ | $H_2O/SiO_2$ |
|---|---|---|---|---|---|---|
| 1 | 0.0150 | 0.0054 | 0.8722 | 0.1079 | 0.7504 | 18.23 |
| 2 | 0.0151 | 0.0118 | 0.8810 | 0.1086 | 0.7439 | 18.41 |
| 3 | 0.0152 | 0.0226 | 0.8914 | 0.1078 | 0.7407 | 18.51 |
| 4 | 0.0151 | 0.0354 | 0.8711 | 0.1082 | 0.7528 | 18.46 |
| 5 | 0.0151 | 0.0709 | 1.0127 | 0.1112 | 0.7495 | 18.71 |
| 6 | 0.0308 | 0.0353 | 0.8995 | 0.1078 | 0.7603 | 18.52 |

The gel mixture of each sample was transferred into a 300-ml stainless steel autoclave equipped with a stirrer. The autoclave was capped and sealed, and stirring and heating were started. Crystallization of the Ce—Ni-MSC-MFI solids was carried out at 190° C. for 40 hours at 300 rpm at autogenous pressure.

Figure 33:
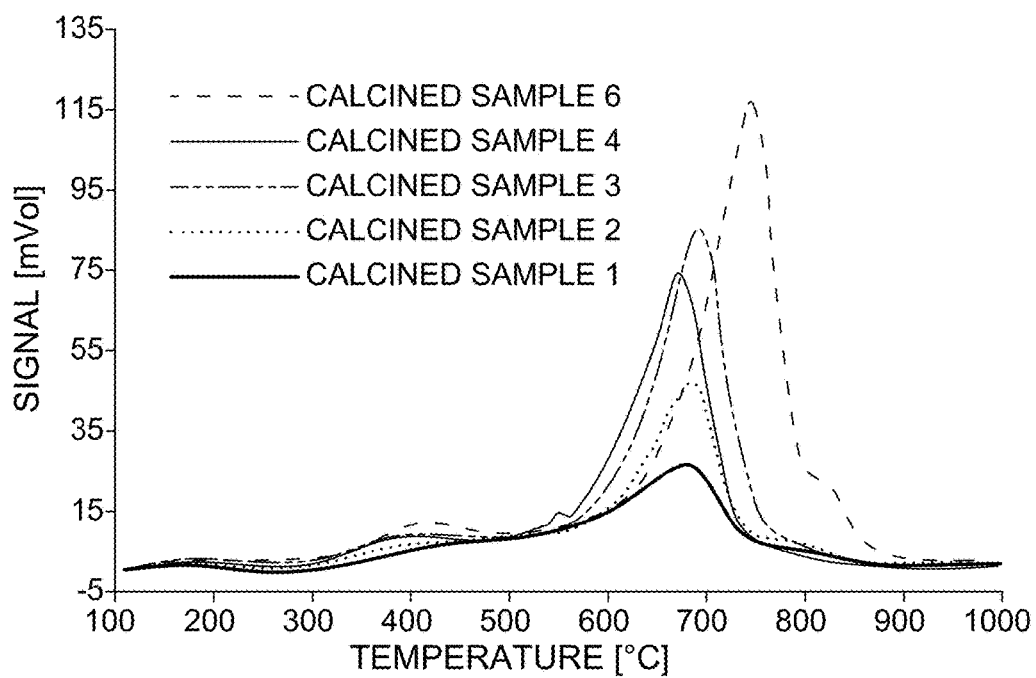
FIG. 33 is the comparison of the hydrogen temperature-programmed reduction profiles ($H_2$-TPR) of the products of EXAMPLE 10 (Samples 1, 2, 3, 4, 6).

After crystallization occurred, each of the Ce—Ni-MSC-MFI products were filtered, washed with distilled water, and dried in an oven at 100° C. for at least 12 hours. The dried crystalline materials of each sample were subsequently calcined in a furnace with air flow and at a temperature of 550 C for 6 hours. The X-ray diffraction patterns of samples 3 and 4 (from Table 13) before and after calcination are shown in FIGS. 25 to 28 showing the MFI structure for the prepared materials. Scanning electron microscopy of Samples 1 to 4 are shown in FIGS. 29 to 32 indicating an increase in particle sizes as more nickel is incorporated in the synthesis gel. Comparison of Temperature Programmed Reduction with $H_2$ ($H_2$-TPR) profiles is shown in FIG. 33 where two main reduction signals are observed at around 400° C. and 700° C. and that the more nickel added, the more hydrogen consumption observed.

Figure 34:
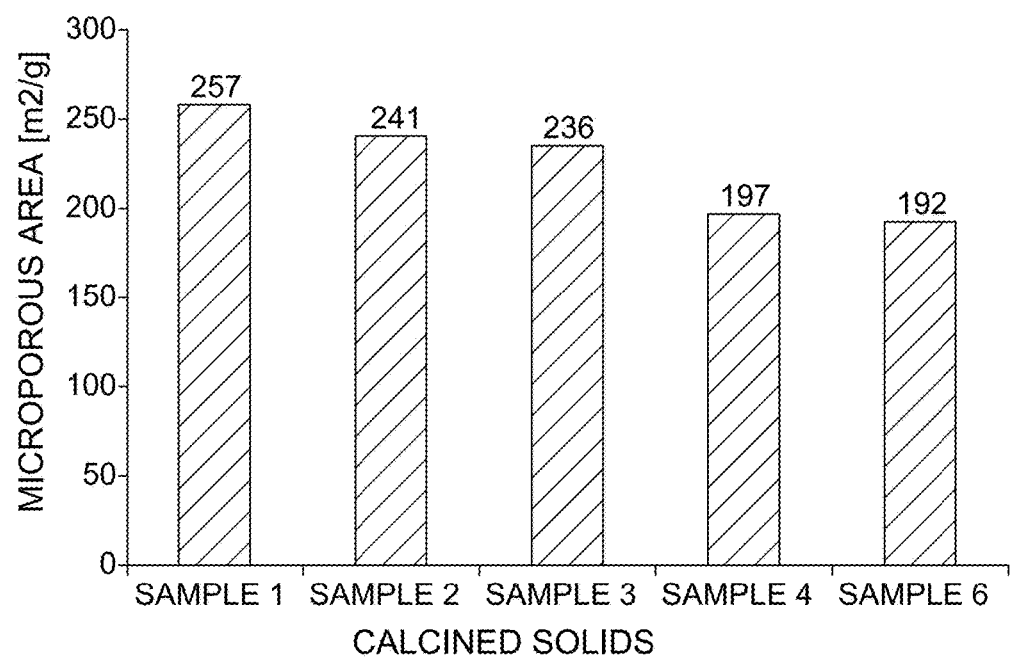
FIG. 34 is the comparison of microporous areas of the products of EXAMPLE 10 (Samples 1, 2, 3, 4, 6).

Table 14 shows the chemical formula expressed as mole ratio of oxides on an anhydrous basis for the calcined materials of Samples 1 to 6 (Table 13) and FIG. 34 shows the microporous area for some selected samples. Increasing the amount of Ni and/or Ce decreases the microporous area of the materials.

TABLE 14

Chemical Molar Ratio of Calcined Sample Materials

| Sample | Chemical molar ratio composition of calcined Ce—Ni-MSC-MFI materials |
|---|---|
| 1 | $SiO_2$:0.0158 $CeO_2$:0.006 NiO |
| 2 | $SiO_2$:0.0160 $CeO_2$:0.012 NiO |
| 3 | $SiO_2$:0.0164 $CeO_2$:0.024 NiO |
| 4 | $SiO_2$:0.0166 $CeO_2$:0.037 NiO |
| 5 | $SiO_2$:0.0174 $CeO_2$:0.075 NiO |
| 6 | $SiO_2$:0.0355 $CeO_2$:0.037 NiO |

Example 11

The following procedure was conducted to obtain a composition of a porous cerium-zinc-silicate having a MTW crystalline structure (Ce—Zn-MSC-MTW) according to the present invention. In this procedure, the following reactants were employed; sodium silicate (26.5 wt. % $SiO_2$, 10.6 wt. % $Na_2O$), cerium (III) nitrate, zinc (II) nitrate, sodium hydroxide, tetraethylammonium (TEA) hydroxide (~35 wt. % solution), sulfuric acid and deionized water. The salts were dissolved in a diluted sulfuric acid solution, and then, the sodium silicate was added to the acidic solution. The TEAOH solution was added slowly until the pH was close to 12. The mixture was stirred to produce a sample with a uniform fluid gel having the molar composition shown in Table 15.

TABLE 15

MTW Composition
MIXTURE COMPOSITION (MOLE RATIOS)

| Sample | $CeO_2/SiO_2$ | $ZnO/SiO_2$ | $Na_2O/SiO_2$ | $TEA/SiO_2$ | $H_2SO_4/SiO_2$ | $H_2O/SiO_2$ |
|---|---|---|---|---|---|---|
| 7 | 0.0046 | 0.0101 | 0.3878 | 0.6231 | 0.2457 | 21.27 |

The mixture was transferred into a 40-ml stainless steel autoclave. The autoclave was capped and sealed, and placed in an oven; crystallization of the Ce—Zn-MSC-MTW solid was carried out at 160° C. for 48 hours at autogenous pressure.

Figure 35:
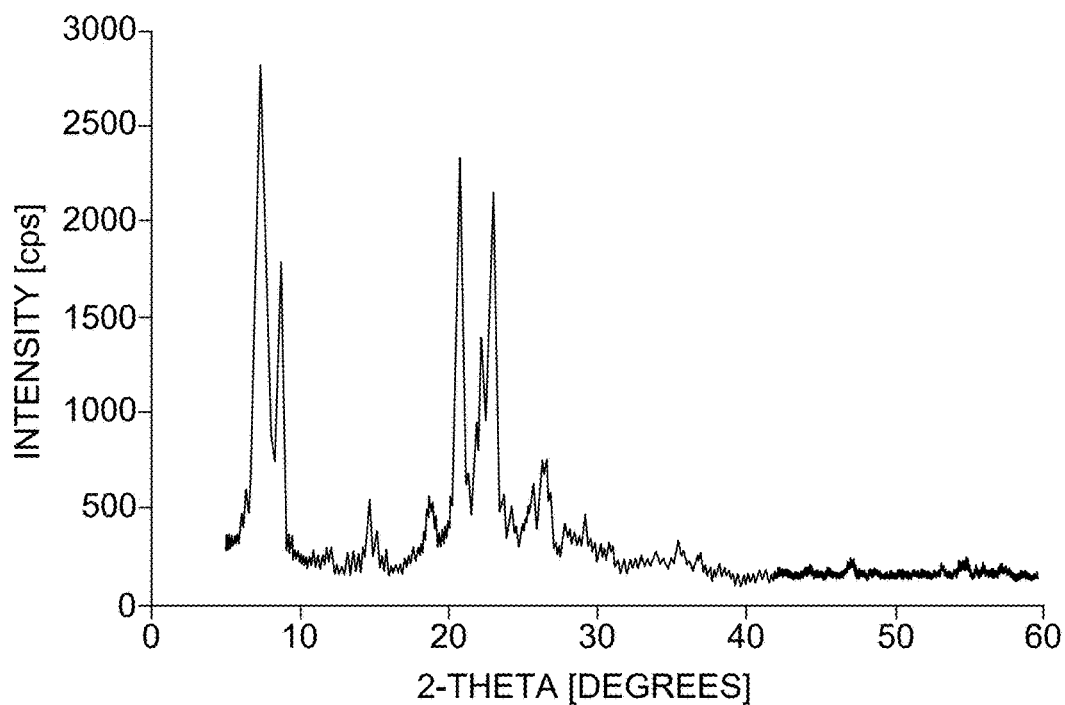
FIG. 35 is an X-ray diffraction pattern of the calcined porous metal-silicate product of EXAMPLE 11 (Sample 7)

After crystallization occurred, the Ce—Zn-MSC-MTW product was filtered, washed with distilled water, and dried in an oven at 100° C. for 12 hours. The dried crystalline material was calcined in a furnace with air flow at a temperature of 550 C for 6 hours. The X-ray diffraction pattern of the calcined sample is shown in FIG. 35. The chemical formula expressed as a mole ratio of oxides on an anhydrous basis for the calcined Ce—Zn-MSC-MTW material is: $SiO_2$: 0.0044 $CeO_2$: 0.009 ZnO.

Example 12

The following procedure was conducted to obtain a composition of porous cerium-copper-silicate having an ordered mesoporous structure (OMS) (termed Ce—Cu-MSC-OMS) of the present invention. In this procedure, the following reactants were employed; sodium silicate (26.5 wt. % $SiO_2$, 10.6 wt. % $Na_2O$), cerium (III) nitrate, copper (II) nitrate, sodium hydroxide, cetyltrimethylammonium bromide (CTAB) as organic template, sulfuric acid and deionized water. The salts were dissolved in a diluted sulfuric acid solution, and sodium silicate was added to the acidic solution. Sodium hydroxide was added slowly until the pH was close to 7-8. The mixture was stirred to produce a sample with a uniform fluid gel having the molar composition shown in Table 16.

TABLE 16

OMS Composition
MIXTURE COMPOSITION (MOLE RATIOS)

| Sample | $CeO_2/SiO_2$ | $CuO/SiO_2$ | $Na_2O/SiO_2$ | $CTAB/SiO_2$ | $H_2SO_4/SiO_2$ | $H_2O/SiO_2$ |
|---|---|---|---|---|---|---|
| 8 | 0.0637 | 0.1276 | 1.1217 | 0.2107 | 0.9413 | 189.4 |

The mixture was homogenized for 1 hour at room temperature under 300 rpm of agitation, producing the cerium-copper-silicate ordered meso-porous structure (Ce—Cu-MSC-OMS). No further hydrothermal treatment was required for this type of solid.

Figure 36:
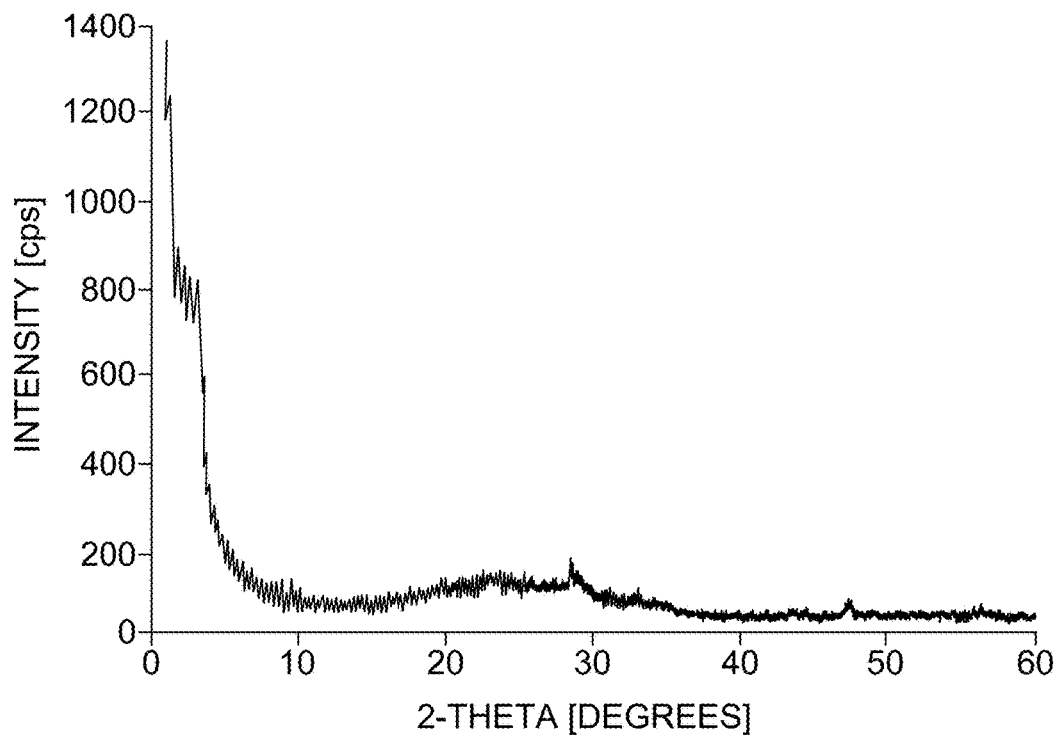
FIG. 36 is an X-ray diffraction pattern of the calcined porous metal-silicate product of EXAMPLE 12 (Sample 8)
Figure 37:
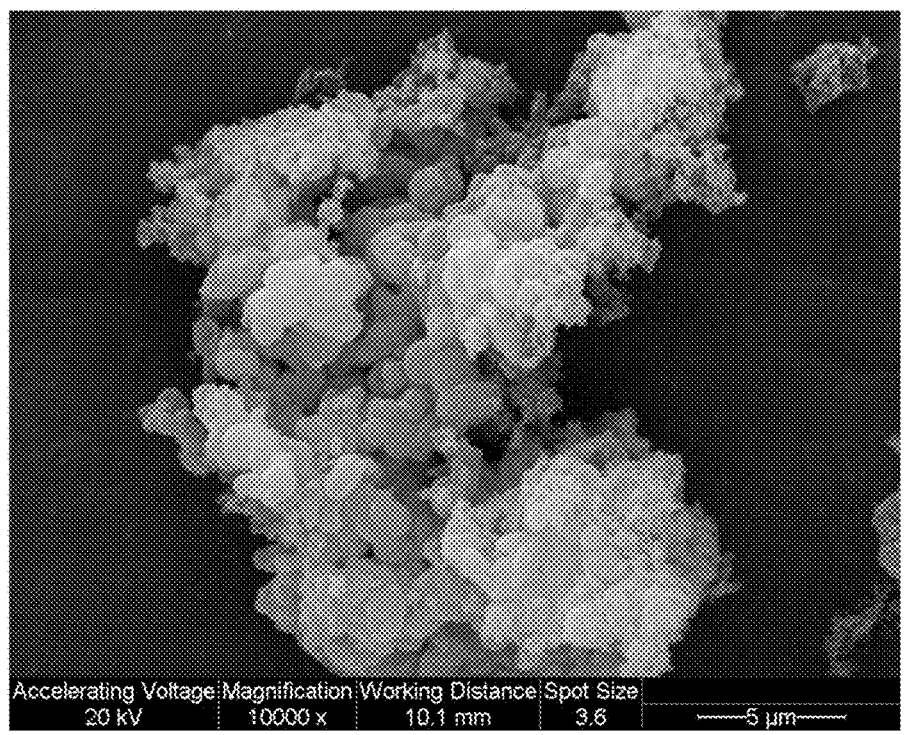
FIG. 37 is a scanning electron image of the calcined porous metal-silicate product of EXAMPLE 12 (Sample 8)

After precipitation occurred, the Ce—Cu-MSC-OMS product was filtered, washed with a mixture of ethanol and distilled water, and dried in an oven at 100° C. for 12 hours. The dried material was calcined in a furnace with air flow and at temperature of 550 C for 6 hours. The X-ray diffraction pattern of the calcined sample is shown in FIG. 36 and a scanning electron micrograph is presented in FIG. 37. The chemical formula expressed as a mole ratio of oxides on an anhydrous basis for the calcined Ce—Cu-MSC-OMS material is: $SiO_2$: 0.0978 $CeO_2$: 0.197 CuO.

Example 13

The following procedures were conducted to obtain large aggregates of the produced Ce—Ni-MSC-MFI materials in order to use them as catalysts for steam catalytic TAN reduction of hydrocarbon feedstocks. 15 grams of each as-synthesized material were mixed with 10 to 14 grams of colloidal silica (40 wt % $SiO_2$, LUDOX AS-40) until a flexible dough was obtained for each material. Thereafter, the dough was allowed to dry at room temperature overnight (about 16 to 18 hours) and finally the following protocol was applied to each dough: heating under air flow at 5° C./min up to 100° C. and stay there for 6 hours, then, heating up to 550° C. at 5° C./min and keeping the temperature for 6 hours, finally allowing to cool down up to room temperature under air flow.

The obtained materials were crushed and sieved to obtain particles of around 1 millimeter. Table 17 shows the samples used and the final catalyst obtained.

TABLE 17

Ludox As-40 as Binder

| Used Sample | Obtained Catalysts by binding each Ce—Ni-MSC-MFI materials with LUDOX AS-40 (as per Table 14) |
|---|---|
| 1 | CATALYST A (CAT A) |
| 2 | CATALYST B (CAT B) |
| 3 | CATALYST C (CAT C) |
| 4 | CATALYST D (CAT D) |
| 6 | CATALYST F (CAT F) |

Figure 38:
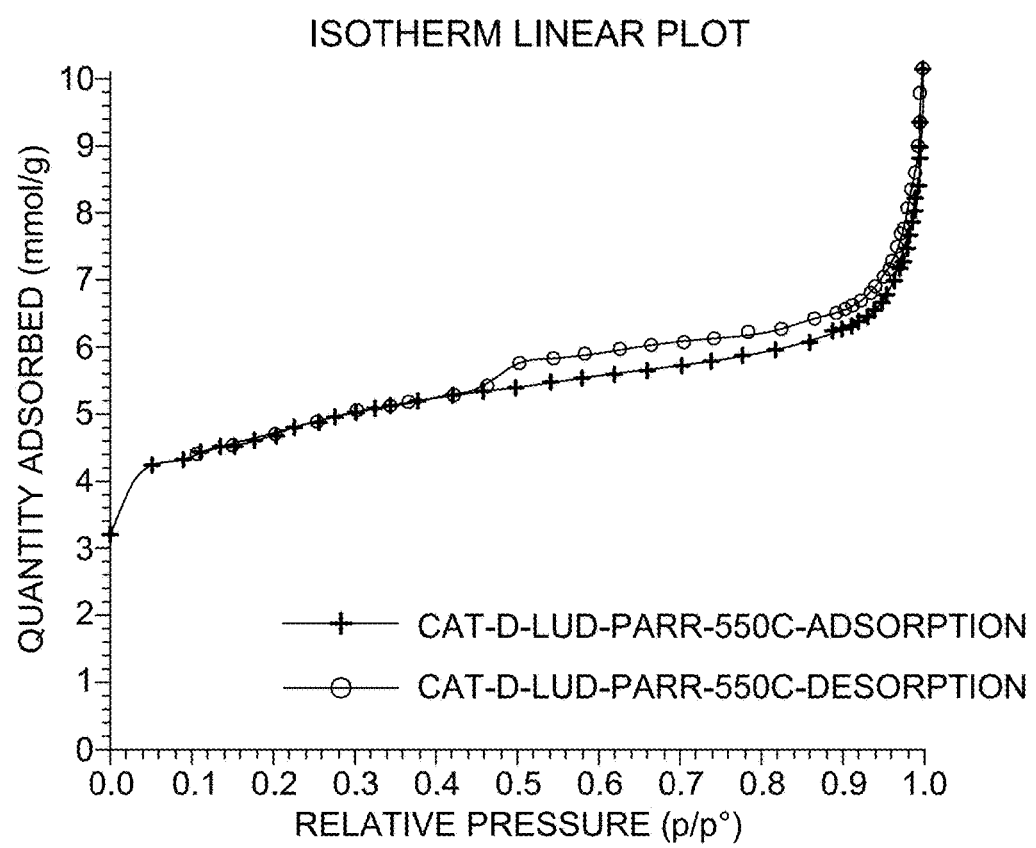
FIG. 38 is a $N_2$-adsorption-desorption isotherm of the calcined porous metal-silicate product of EXAMPLE 10 (Sample 4).
Figure 39:
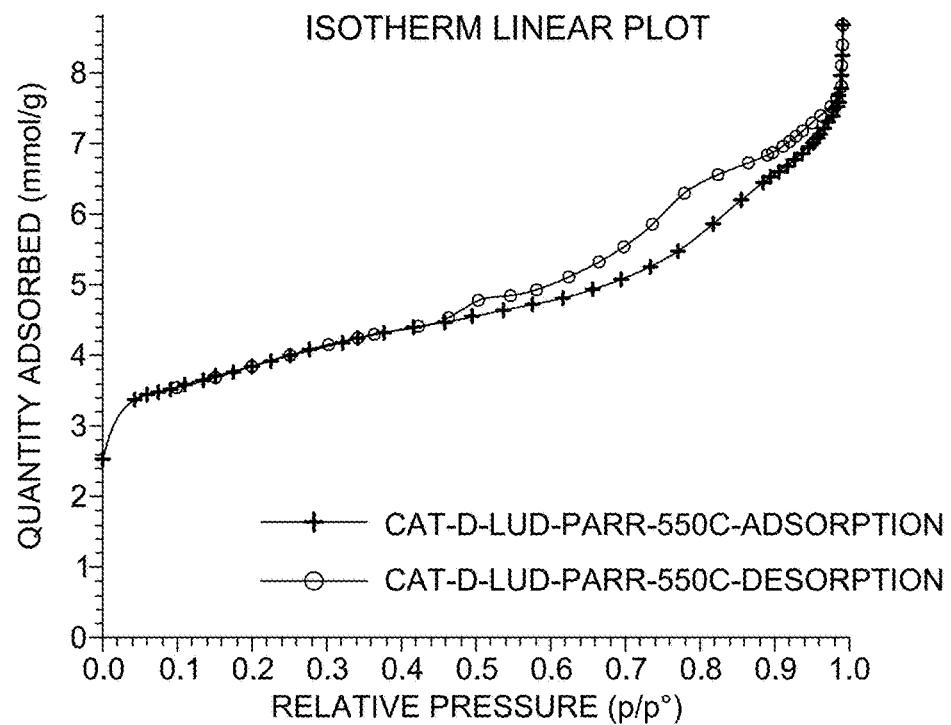
FIG. 39 is a $N_2$-adsorption-desorption isotherm of the calcined porous metal-silicate product of EXAMPLE 13 (CAT-D) using the colloidal silica binder.
Figure 40:
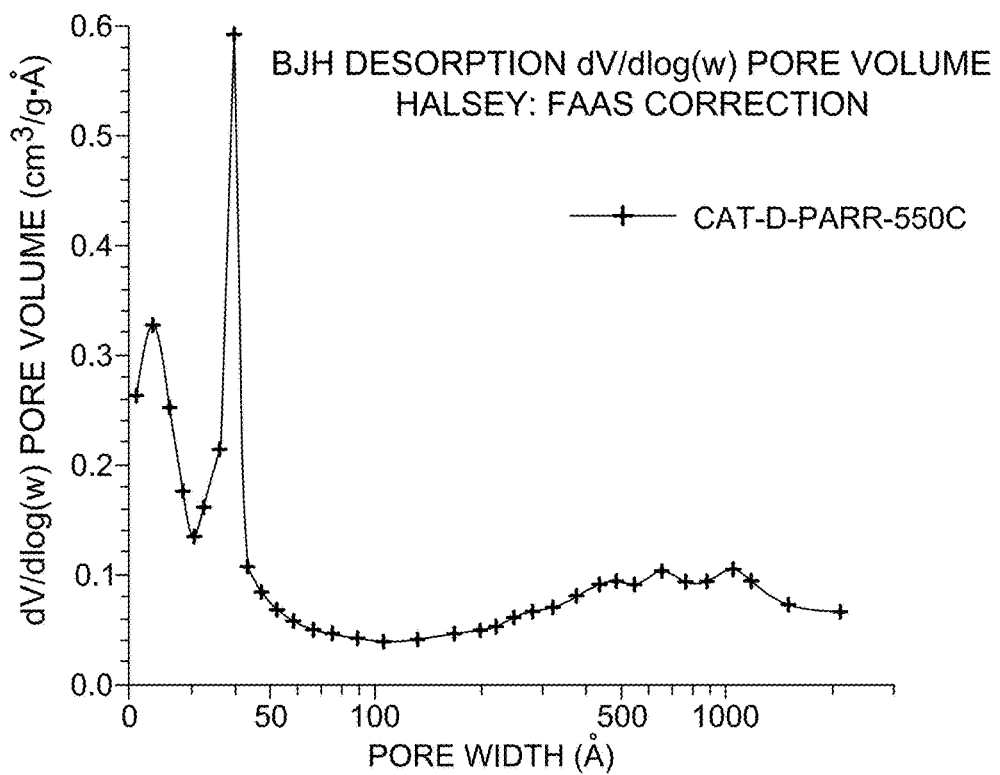
FIG. 40 is a pore width distribution of the calcined porous metal-silicate product of EXAMPLE 10 (Sample 4).
Figure 41:
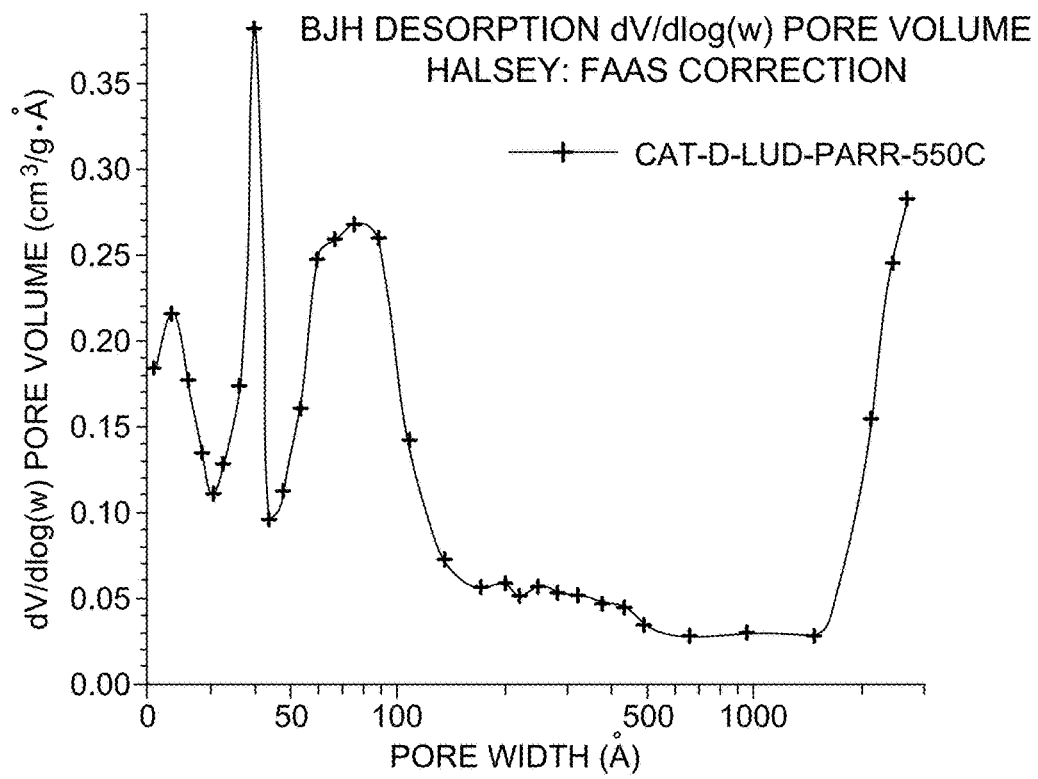
FIG. 41 is a pore width distribution of the calcined porous metal-silicate product of EXAMPLE 13 (CAT-D) using the colloidal silica binder.

FIGS. 38 and 39 show the $N_2$-adsorption-desorption isotherms of calcined sample 4 and CAT-D prepared by binding sample 4 with colloidal silica LUDOX AS-40. As can be seen, binding with LUDOX AS-40 produces an increase of the hysteresis loop indicating the presence of mesoporous. FIGS. 40 and 41 show the pore width distribution of calcined sample 4 and CAT-D prepared by binding sample 4 with colloidal silica LUDOX AS-40. Binding sample 4 with colloidal silica induces the formation of mesoporous structures with average pore widths of 75 A (FIG. 41) not present in the original material (FIG. 40).

Example 14

The following procedures were conducted to obtain large aggregates of the produced Ce—Ni-MSC-MFI material in order to use them as catalyst for the steam catalytic TAN reduction of hydrocarbon feedstocks. 10 grams of the as-synthesized Sample 4 material was mixed with 10 grams of kaolin and 10.5 grams of deionized water until a flexible dough was obtained. Then, the dough was allowed to dry at room temperature overnight (about 18 hours) and finally the following protocol was applied to the dough: heating under air flow at 5° C./min up to 100° C. and stay there for 6 hours, then, heating up to 550° C. at 5° C./min and keeping the temperature for 6 hours, finally allowing to cool down up to room temperature under air flow.

The obtained material was crushed and sieved to obtain particles of about 1 millimeter. Table 18 show the sample used and the final catalyst obtained.

TABLE 18

Kaolin Binder

| Used Sample | Obtained Catalyst by binding the Ce—Ni-MSC-MFI material with Kaolin |
|---|---|
| 4 | KAO-CATALYST D (KAO-CAT D) |

Figure 42:
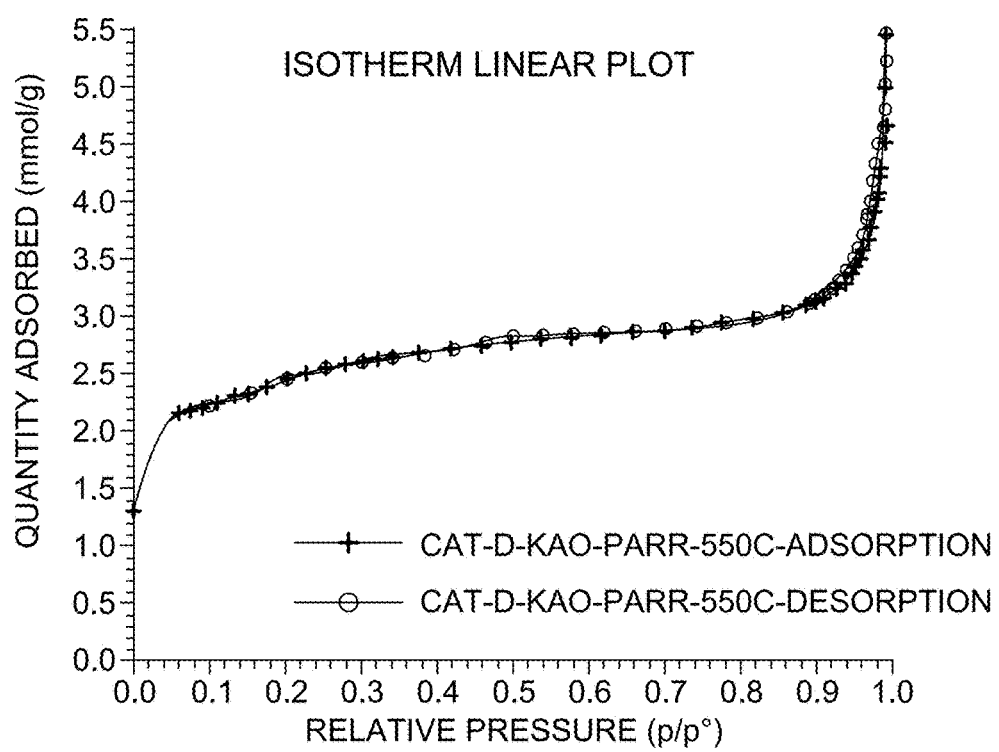
FIG. 42 is a $N_2$-adsorption-desorption isotherm of the calcined porous metal-silicate product of EXAMPLE 14 (KAO-CAT-D) using the kaolin binder.
Figure 43:
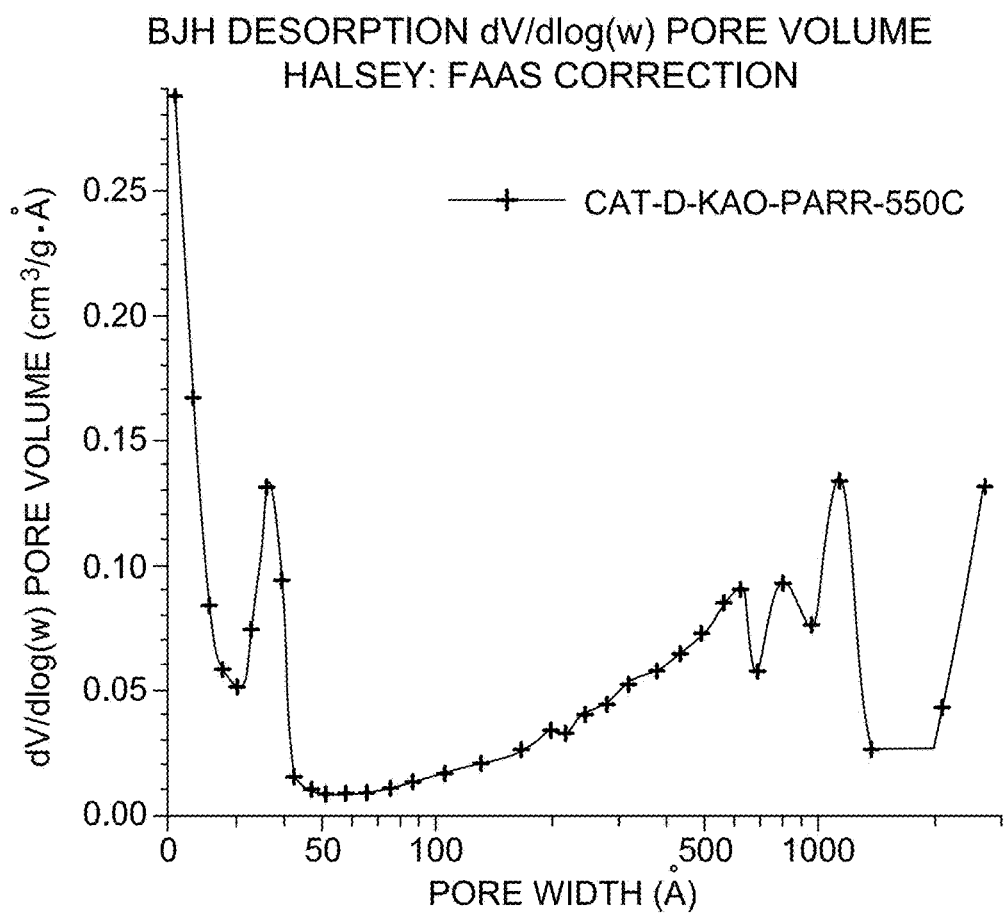
FIG. 43 is a pore width distribution of the calcined porous metal-silicate product of EXAMPLE 14 (KAO-CAT-D) using the kaolin binder.
Figure 44:
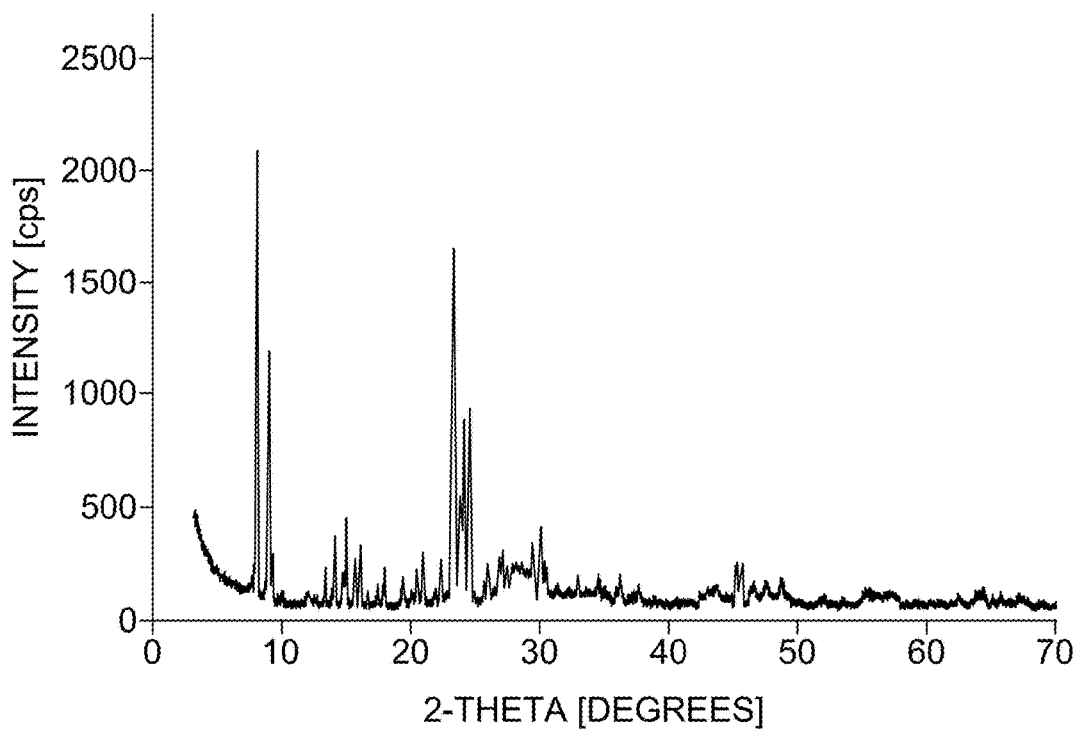
FIG. 44 is an X-ray diffraction pattern of the calcined extrudated product of EXAMPLE 18 (HDT-CAT-G) using the Ce—Ni-doped hydrotalcite binder.
Figure 45:
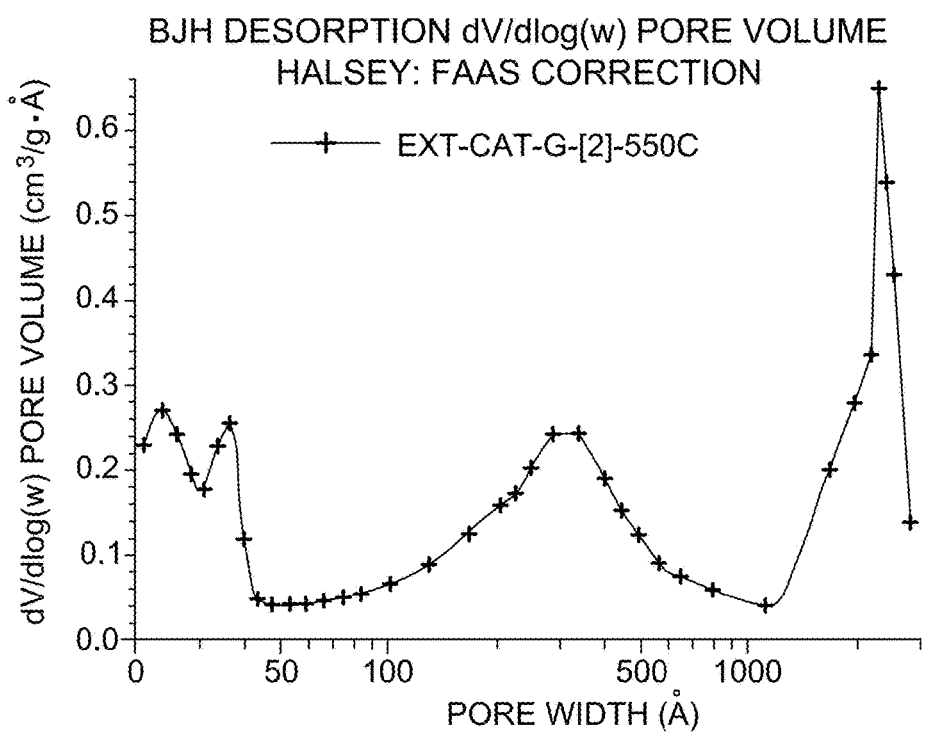
FIG. 45 is a pore width distribution of the calcined extrudate product of EXAMPLE 18 (HDT-CAT-G) using the Ce—Ni-doped hydrotalcite binder.

FIG. 42 shows the $N_2$-adsorption-desorption isotherms of calcined KAO-CAT-D prepared by binding sample 4 with kaolin. FIG. 43 shows the pore width distribution of calcined KAO-CAT-D prepared by binding sample 4 with kaolin. Binding sample 4 with kaolin induces the formation of a broader range of mesoporous not present in the original material (FIG. 40).

Example 15

The following procedures were conducted to exemplify the catalytic activity on the steam catalytic TAN reduction of the porous metal-silicate of the present invention. FIG. 7 shows a simplified schematic of the testing unit employed. 1.6 grams of each catalyst prepared with the series of Ce—Ni-MSC-MFI (CAT A, B, C, D and F) materials were tested in the unit with the following conditions: Temperature of reaction: 400° C., pressure: 40 psig, space velocity: 1 $h^{-1}$, hydrocarbon feedstock: Vacuum Gas Oil (VGO) with a measured initial TAN number of 4.19 mg KOH/g VGO, 5% steam, 5% $N_2$ and a total reaction on stream of 5.5 hours. A test without any catalyst was carried out and named "Thermic 400° C." in order to differentiate the catalytic effect from the thermal effect. The results are shown in Table 19.

TABLE 19

Catalytic Effect of MSC Samples on TAN Reduction

| | Feed-stock | Thermic 400° C. | CAT A | CAT B | CAT C | CAT D | CAT F |
|---|---|---|---|---|---|---|---|
| TAN (mg KOH/g sample) | 4.19 | 28.6 2.73 | 28.5 1.43 | 28.6 1.32 | 29.5 0.94 | 17.5 1.16 | 6.1 2.15 |
| % TAN Reduction | — | 34.8 | 65.9 | 68.5 | 77.6 | 72.3 | 48.7 |

As can be observed in Table 19, there is a decrease of TAN number of 34.8% due to the thermal treatment at 400° C., however, the presence of the catalysts of the present invention increased the reduction of TAN number beyond that of the thermal treatment alone, being catalyst CAT C the best, followed by CAT D and CAT B.

Example 16

The following procedures were conducted to show the catalytic activity on the steam catalytic TAN reduction of the different Ce—Ni-MSC-MFI material. FIG. 7 shows the simplified schematic of the testing unit employed. 1.6 grams of the catalyst CAT C prepared with Sample 3 was tested in the unit with the following conditions: Temperature of reaction: 360° C., pressure: 40 psig, space velocity: 1 $h^{-1}$, hydrocarbon feedstock: Vacuum Gas Oil (VGO) with a measured initial TAN number of 4.19 mg KOH/g VGO, 5% steam and 5% $N_2$. A test without any catalyst was carried out and named "Thermic 360 C" in order to differentiate the catalytic effect from the thermal effect. The results are shown in Table 20.

TABLE 20

Catalytic Effect of CAT-C Sample on TAN Reduction at Lower Reaction Temperature

| | Feedstock | Thermic 360° C. | CAT-C |
|---|---|---|---|
| % Conv (343° C.) | — | 5.8 | 5.6 |
| TAN (mg KOH/g sample) | 4.19 | 3.57 | 2.44 |
| % TAN Reduction | — | 14.8 | 41.8 |

As can be observed in Table 20, there is a decrease of TAN number of only 14.8% due to the thermal treatment at 360° C., however, the presence of catalyst CAT C of the present invention increased the reduction of TAN number beyond that of the thermal treatment alone (almost 3-fold).

Example 17

The following procedures were conducted to show the catalytic activity on the steam catalytic TAN reduction of sample 4 when the binder is colloidal silica or kaolin. FIG. 7 shows the simplified schematic of the testing unit employed. 1.6 grams of the catalyst CAT D prepared with Sample 4 and the binder LUDOX AS-40 or kaolin were tested in the unit with the following conditions: Temperature of reaction: 400° C., pressure: 40 psig, space velocity: 0.5 $h^{-1}$, hydrocarbon feedstock: Vacuum Gas Oil (VGO) with a measured initial TAN number of 4.19 mg KOH/g VGO, 5% steam and 5% $N_2$. The results are shown in Table 21.

As can be observed in Table 21, there is a complete removal of TAN number independent of the used binder.

TABLE 21

Catalytic Effect of CAT-D Samples with Different Binders on TAN Reduction

|  | Feedstock | CAT-D Ludox | CAT-D Kaolin |
| --- | --- | --- | --- |
| % Conv (343° C.) | — | 3.43 | 3.94 |
| TAN (mg KOH/g sample) | 4.19 | 0.0 | 0.0 |
| % TAN Reduction | — | 100 | 100 |

Example 18

The following procedures were conducted to obtain extrudates of the produced Ce—Ni-MSC-MFI material with a synthetic binder base on a Ce—Ni-doped hydrotalcite precursor to enhance its properties in order to use it as catalyst for the steam catalytic TAN reduction of hydrocarbon feedstocks.

The first step was to produce a synthetic binder base on a Ce—Ni doped hydrotalcite precursor as follows: an acid solution was prepared by dissolving 0.842 moles of $Mg(NO_3)_2 \cdot 6H_2O$, 0.197 moles of $Al(NO_3)_3 \cdot 9H_2O$, 0.331 moles of $Ni(NO_3)_2 \cdot 6H_2O$ and 0.196 moles of $Ce(NO_3)_3 \cdot 6H_2O$ in 1 liter of deionized water. The acid solution was added to a basic solution prepared by dissolving 1.047 moles of $Na_2CO_3$ and 3.465 moles of NaOH dissolved in 1 liter of deionized water and the homogeneous gel was placed in one gallon Parr reactor to crystallize at 80° C. for 24 hours with an agitation of 300 rpm. After crystallization, the produced solid is filtered, washed with deionized water, dried at 80° C. overnight and calcined at 450° C. for 18 hours under air flow with a 5° C./min rate. The solid is crushed to produce a fine powder to be used as the binder.

75 grams of the as-synthesized Sample 4 material was mixed with 25 grams of the calcined Ce—Ni-doped hydrotalcite and 50 grams of deionized water until a flexible dough was obtained. Then, the dough was extrudated with a pressure stainless steel syringe to produce spaghetti-like materials of 1.2 mm in diameter. The extrudates were allowed to dry at room temperature overnight (about 18 hours) and placed in an furnace for calcination under air flow at 5° C./min up to 100° C. and stay there for 6 hours, then, heating up to 550° C. at 5° C./min and keeping the temperature for 18 hours, finally allowing to cool down up to room temperature under air flow.

The obtained extrudates were cut into small cylinders of 5-7 mm. Table 22 shows the sample used and the final catalyst obtained.

TABLE 22

Ce—Ni-doped hydrotalcite Binder

| Used Sample | Obtained Catalyst by binding the Ce—Ni-MSC-MFI material with a Ce—Ni-doped hydrotalcite precursor |
| --- | --- |
| 4 | HDT-CATALYST G (HDT-CAT-G) |

Example 19

Figure 46:
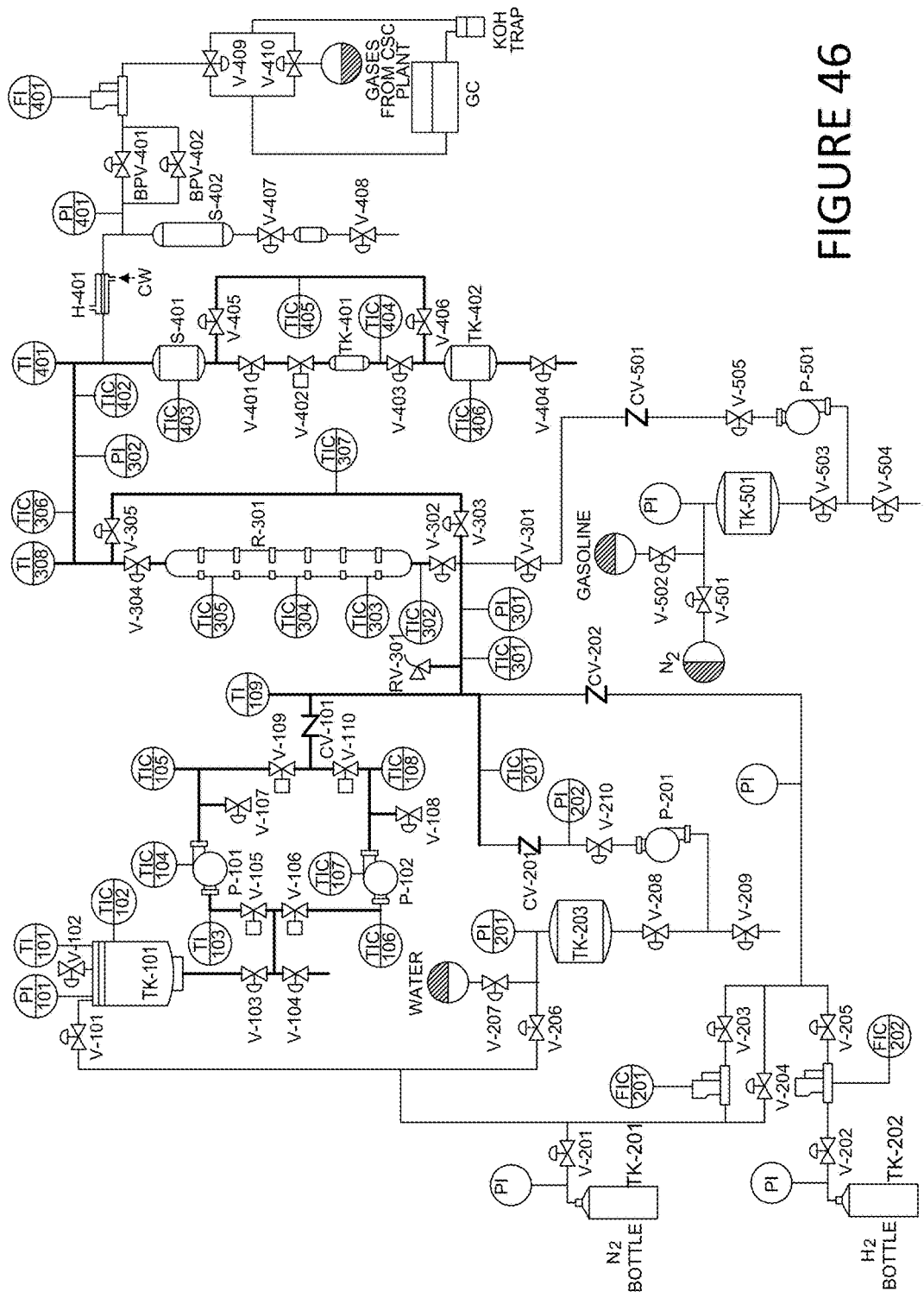
FIG. 46 is a schematic of the pilot plan unit used to test the product of EXAMPLE 18 (HDT-CAT-G) as a catalyst for the steam catalytic total acid number reduction in hydrocarbon feedstocks.
Figure 47:
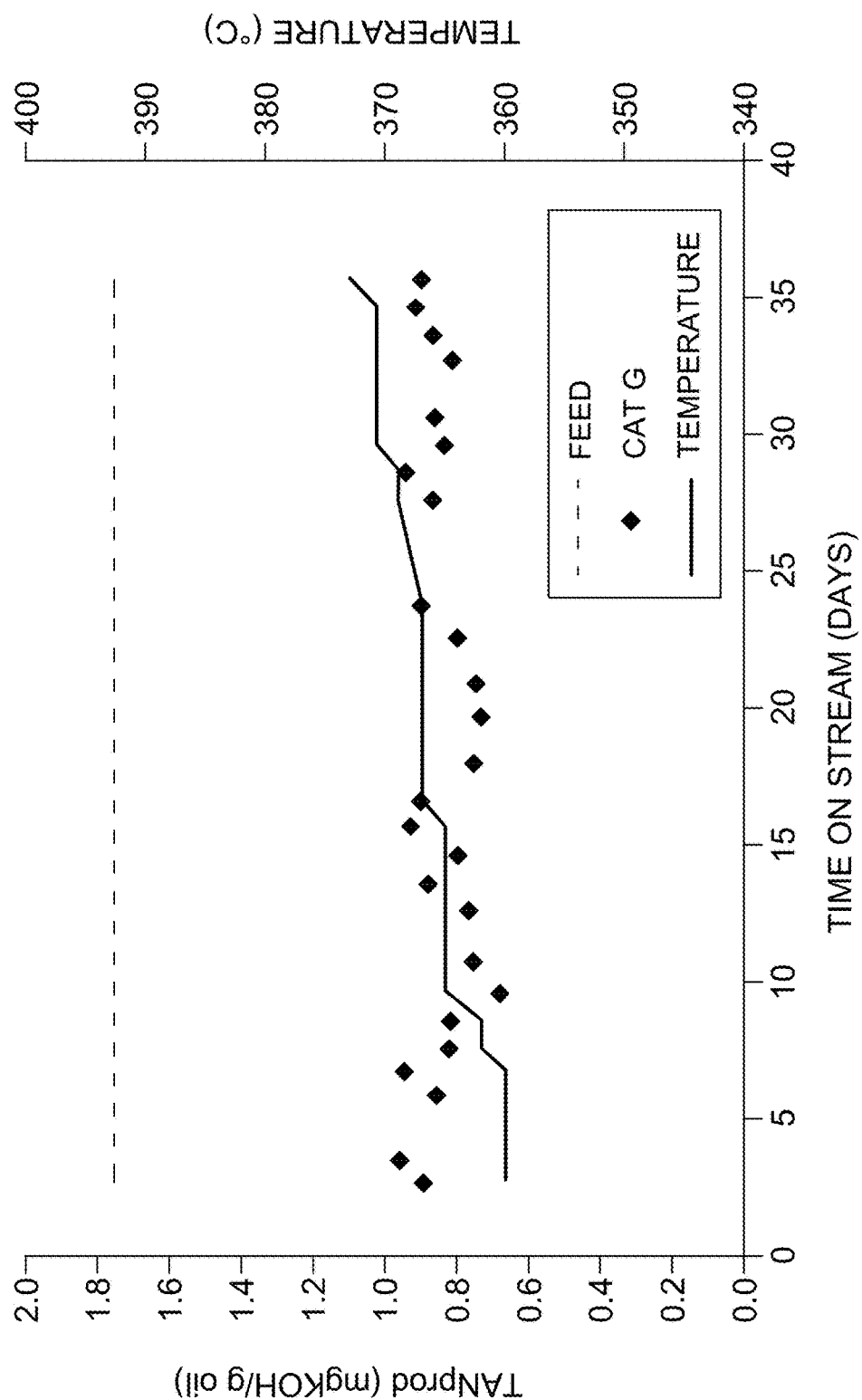
FIG. 47 shows results of testing the catalyst HDT-CAT-G (EXAMPLE 18) in the steam catalytic total acid number reduction in hydrocarbon feedstocks.

The following procedures were conducted to show the catalytic activity on the steam catalytic TAN reduction of the catalyst prepared in EXAMPLE 18 (HDT-CAT-G). FIG. 46 shows the schematic of the pilot plan unit employed. 50 grams of the catalyst HDT-CAT-G prepared in EXAMPLE 18 was tested in the unit with the following conditions: Temperature of reaction: 360 to 373° C., pressure: 120 psig, space velocity: 0.3 $h^{-1}$, hydrocarbon feedstock: Bitumen 220° C.+ cut with a measured initial TAN number of 1.80 mg KOH/g bitumen, 5% steam and 5% $N_2$. The results are shown in FIG. 47.

Other synthetic catalytic compositions of materials of the present invention, their preparation method and their use for upgrading of hydrocarbon feedstocks are described with reference to the following examples.

Example 20

The following procedures were conducted to obtain the precursor of the active nano-crystalline molybdenum carbide of the present invention. In these preparations, the following reactants were employed; ammonium heptamolybdate, $(NH_4)_6Mo_7O_{24} \cdot H_2O$ (AHM), household sucrose, $C_{12}H_{22}O_{11}$, and deionized water. The AHM was dissolved in water, and then, sucrose was added to the AHM solution. The mixture was stirred for 30 minutes to produce a uniform clear solution with the molar compositions shown in Table 23.

TABLE 23

Sample Compositions
MIXTURE COMPOSITIONS (MOLE RATIOS)

| Sample | C/Mo | $H_2O$/Mo | Mo/C | Mo/$H_2O$ |
| --- | --- | --- | --- | --- |
| 1 | 3.514 | 63.258 | 0.285 | 0.016 |

The solution was transferred to an oven and allowed it to dry at 100° C. for 48 hours and at 200° C. for 24 hours. The black-brownish sponge-like product is grinded to obtain suitable particle sizes.

Example 21

80 grams of the product of EXAMPLE 20 were placed in a stainless steel tubular reactor forming a bed and a flow of 120 $scm^3$/min $N_2$ was introduce at atmospheric pressure for 1 hour. Then, the $N_2$ was switched to $H_2$, and a $H_2$ flow of 120 $scm^3$/min was introduced into the reactor at atmospheric pressure and a heating ramp of 10° C./min was applied to reach 500° C. After reaching the desired temperature (500° C.), the Mo$_2$C precursor was treated under H$_2$ flow at 500° C. for 24 hours. After the H$_2$ treatment was carried out, the H$_2$ was switched back to N$_2$ and the sample was then allowed to cool down until room temperature. The produced nano-crystalline Mo$_2$C was then placed in a container and sealed for further use.

Example 22

The following example illustrates one way of incorporate the nano-crystalline Mo$_2$C material into a matrix to enhance the catalytic properties of the materials composition of the present invention. The following procedures were conducted to obtain extrudates of the produced nano-crystalline Mo$_2$C material with a synthetic material based on a Ce—Ni-doped hydrotalcite precursor and amorphous silica mixed with a naturally occurring clay (in this case kaolin) to enhance its properties in order to use it as a catalyst composition material for the steam catalytic upgrading of hydrocarbon feedstocks.

The first step was to produce the synthetic material based on a Ce—Ni doped hydrotalcite precursor as follows: an acid solution was prepared by dissolving 0.842 moles of Mg(NO$_3$)$_2$.6H$_2$O, 0.197 moles of Al(NO$_3$)$_3$.9H$_2$O, 0.331 moles of Ni(NO$_3$)$_2$.6H$_2$O and 0.196 moles of Ce(NO$_3$)$_3$.6H$_2$O in 1 liter of deionized water. The acid solution was added to a basic solution prepared by dissolving 1.047 moles of Na$_2$CO$_3$ and 3.465 moles of NaOH dissolved in 1 liter of deionized water and the homogeneous gel was placed in one gallon Parr reactor to crystallize at 80° C. for 24 hours with an agitation of 300 rpm. After crystallization, the produced solid is filtered, washed with deionized water, dried at 80° C. overnight and calcined at 450° C. for 18 hours under air flow with a 5° C./min rate. The solid was crushed to produce a fine powder to be used in the preparation of the catalytic composition of the present invention.

Figure 48:
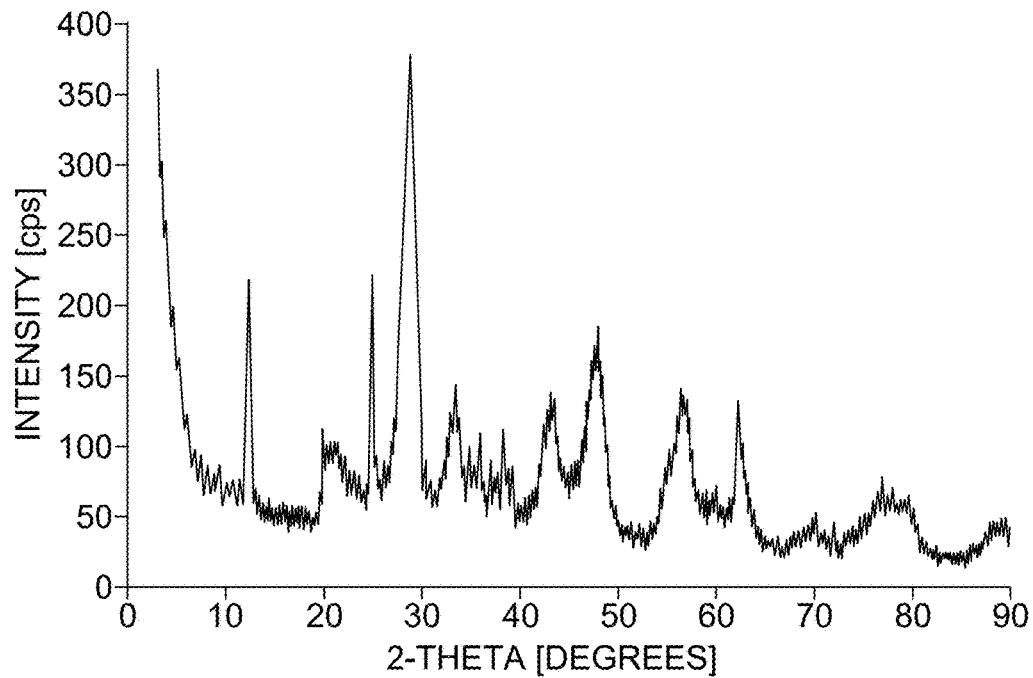
FIG. 48 is an X-ray diffraction pattern of the calcined extrudated product of EXAMPLE 22 (HDT-$Mo_2$-CAT-G).
Figure 49:
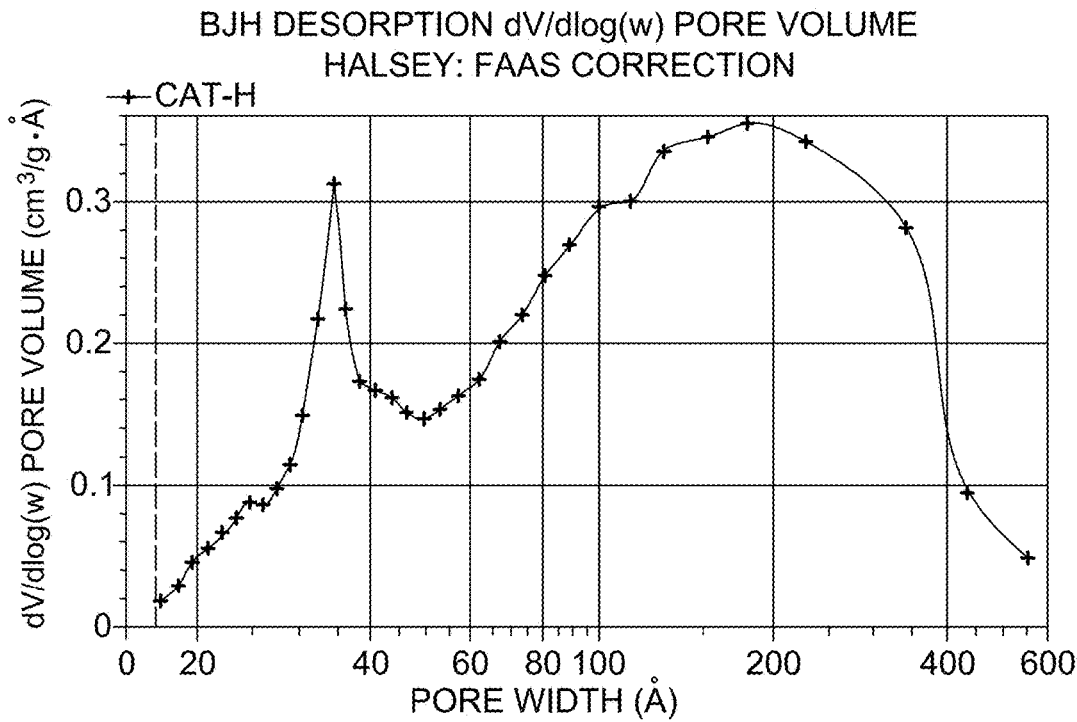
FIG. 49 is a pore width distribution of the calcined extrudate product of EXAMPLE 22 (HDT-$Mo_2$-CAT-G).

15 grams of the as-synthesized nano-crystalline Mo$_2$C material of EXAMPLE 21 was mixed with 90 grams of the calcined Ce—Ni-doped hydrotalcite (prepared as above) and with 34 grams of kaolin. An amorphous silica suspension was prepared with 15 grams of colloidal silica LUDOX AS-40 and 90 grams of water and it was added to the powdered homogenized mixture of Mo$_2$C, Ce—Ni-hydrotalcite and kaolin to produce a flexible dough. Then, the dough was extrudated with a pressure stainless steel syringe to produce spaghetti-like materials of 1.2 mm in diameter. The extrudates were allowed to dry at room temperature overnight (about 18 hours). The obtained extrudates were cut into small cylinders of 5-7 mm. The obtained catalytic composition was named HDT-Mo$_2$C-CAT-H. FIG. 48 shows the XRD pattern of the prepared catalytic composition and FIG. 49 shows the pore distribution of the prepared catalytic composition.

Example 23

Figure 50:
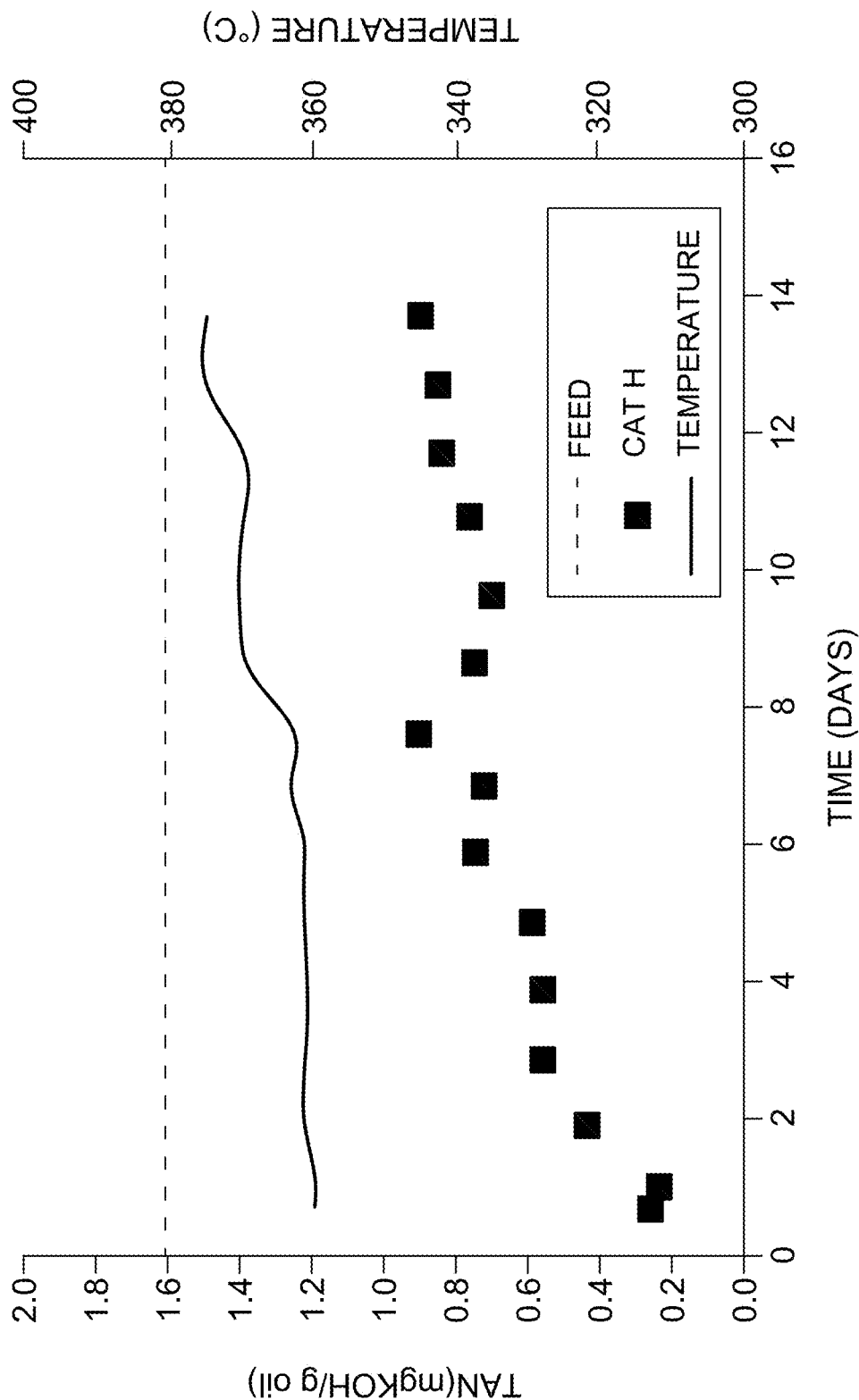
FIG. 50 shows results of testing the catalyst 22 (HDT-$Mo_2$-CAT-G) in the steam catalytic total acid number reduction in hydrocarbon feedstocks.

The following procedures were conducted to show the catalytic activity on the steam catalytic TAN reduction of the catalyst prepared in EXAMPLE 22 (HDT-Mo$_2$C-CAT-H). FIG. 46 shows the schematic of the pilot plan unit employed. 50 grams of the extrudated catalyst HDT-Mo$_2$C-CAT-H prepared in EXAMPLE 22 were tested in the unit with the following conditions: Temperature of reaction: 360 to 375° C., pressure: 400 psig, space velocity: 1.0 h$^{-1}$, hydrocarbon feedstock: Diluted bitumen (Dilbit) with a measured initial TAN number of 1.60 mg KOH/g Dilbit, 5% steam and 5% N$_2$. The results are shown in FIG. 50.

While the present invention has been described in the context of specific embodiments thereof, other alternatives, modifications, and variations will become apparent to those skilled in the art having read the foregoing description. Accordingly, it is intended to embrace alternatives, modifications, and variations as fall within the broad scope of the appended claims.

REFERENCES

All Incorporated Herein by Reference

1./3A. Wang, C., Wang, Y., Chen, J., Sun, X., Liu, Z., Wan, Q., Dai, Y., Zheng, W. High Temperature Naphthenic Acid Corrosion of Typical Steels. Can. J. Mechan. Sci. And Engineer., 2 (20, 23-30. 2011).

2./4A. A Comprehensive Look at the Acid Number Test. (Noria Corporation). http://www.machinerylubrication.com/Articles/Print/1052 (downloaded on May 2012).

3. 5A. Naphthenic Acid Corrosion Review. http://www.set-laboratones.com/nac/tabid/79/Default.aspx (downloaded on May, 2012).

4./6A. Martel, C. R., Bradley, R. P., McCoy, J. R., Petrarca J. Fuel Corrosion Inhibitors and Their Effects on Fuel Properties. Report AFAPL-TR-74-20 (Air Force Aero Propulsion Laboratory, Wright-Patterson AFB. OH, 1974, 34 pp). Available form NTIS (AD-787 191).

5./7A./16 ATSM D664. Standard Test Method for Acid Number of Petroleum Products by Potentiometric Titration.

6./8A. Strausz, O. P., Lown. E. M. The Chemistry of Alberta Oil Sands, Bitumens and Heavy Oils. AERI editions, Calgary, AB. Canada (2003).

7./9A. Laredo, G. C., Lopez, C. R., Alvarez, R. E., Cano, J. L. Naphthenic acids, total acid number and sulfur content profile characterization in Isthmus and Maya crude oils. Fuel, 83, 1689-1695. 2004.

8./10A. Turnbull, A., Slavcheva, E., Shone, B. Factors controlling naphthenic acid corrosion. Corrosion, 54(11), 922-930. 1998.

9./11A. Nascimento, L. R., Reboucas, L. M. C., Koike, L., Reis, F de A. M., Soldan, A. L., Cerqueira, J. R., Marsaioli, A. J. Acidic biomarkers from Albacora oils, Campos basin, Brazil. Org. Geochem., 30, 1175-1191. 1999.

10. Grande et al. U.S. Pat. No. 6,063,266 (2000)

11./12A. Zhang, A., Ma, Q., Goddard, W. A., Tang, Y. Improved Processes to Remove Naphthenic Acids. Annual Progress Technical Report Oct. 1, 2002-Sep. 30, 2003 CalTech, CA-USA. Submitted to DOE under contract DE-FC26-02NT15383 (11 pp). Apr. 28, 2004.

12./13A. Chamberlain Pravia, O. R., Soares Cerqueira, H., Moreira, E. M., de L. Alvarenga Batista, C. M., Gomez, J. R., Peixoto Bugueta, P. C. Process for Reducing the Naphthenic Acidity of Petroleum Oils. U.S. Pat. No. 7,504,023 B2 (Mar. 17, 2009).

13./14A. Babic Samardzija et al. US Patent Application 2009, 0236263 A1, Assignee Baker-Hughes.

14. American Society for Testing and Materials (ASTM). ASTM D1159. Standard Test Method for Determination of Bromine Numbers of Petroleum Distillates and Commercial Olefins by Electrometric Titration. ASTM: West Conshohocken, Pa., 2011.

15. CCQTA-Olefins in Crude Oil by Proton NMR Method (Canadian Crude Quality Technical Association, Nov. 1, 2005), also identified as MAXXAM: CAPP Olefin by NMR version 1.04, November 2005 (Canadian Association of Petroleum Producers).

1A. Barrer, R. M. Chemical Nomenclature and Formulation of Compositions of Synthetic and Natural Zeolites. Pure & Appl. Chem., 51, 1091-1100. 1979.

2A. Meynen, V., Cool, P., Vansant, E. F. Verified Syntheses of Mesoporous Materials. Micropor. Mesopor. Mater., 125, 170-223, 2009.

15A. Albert Franse et al. U.S. Pat. No. 3,806,437 Assignee: Petrolite (1974)

1B. Pitchford, A. C. U.S. Pat. No. 3,676,331; "Upgrading of Crude Oils"; Jul. 11, 1972.

The invention claimed is:

1. A porous metallo-silicate composition (MSC) having a molar composition:

$$SiO_2 : mCeO_2 : nXO$$

wherein X is a divalent element selected from the group consisting of nickel, copper, zinc and combinations thereof; m is between about 0.001 and 0.5; n is between about 0.001 and 0.5; and wherein the composition has a siliceous micro and/or meso porous structure.

2. The porous metallo-silicate composition as in claim 1, wherein the porous structure is a MFI, MEL, MTW, FER, MEI, MTT, MWW, STT, SGT or RTE structure as defined by the International Union for Pure and Applied Chemistry (IUPAC) and the International Zeolite Association (IZA).

3. The porous metallo-silicate composition as in claim 1, wherein the porous structure is any one of or a combination of a) any ordered siliceous meso-porous structure (OMS) having pore sizes between about 2 and about 50 nm as defined by the International Union for Pure and Applied Chemistry (IUPAC) b) is a SBA-15, SBA-1, SBA-2, SBA-3, HMS, MCM-41, MCM-48, MCM-50, MSU, TLCT, or CMK structure as defined by the International Union for Pure and Applied Chemistry (IUPAC) and c) is a disordered siliceous meso-porous structure (DMS).

4. The porous metallo-silicate composition of claim 1, wherein any one of or a combination of the cerium and X is incorporated within the framework and/or porous channels of the porous structure.

5. The porous metallo-silicate composition of claim 1, wherein the composition is a powder and further comprises at least one additive admixed with the composition to enhance any one of the catalytic behavior, morphological properties and/or mechanical strength of the composition or combinations thereof.

6. The porous metallo-silicate composition as in claim 5, wherein the additive is a metal carbide in a concentration of greater than about 0.001 wt % and less than about 40 wt % of the composition.

7. The porous metallo-silicate composition as in claim 6, wherein the metal carbide is any one of a molybdenum and/or tungsten carbide or combinations thereof.

8. The porous metallo-silicate composition as in claim 5, wherein the additive is a clay, alumina, silica, hydrotalcite, metal-doped-hydrotalcite, other metal hydroxides, carbon or combinations thereof.

9. The porous metallo-silicate composition as in claim 1, further comprising a carrier selected from any one of a hydrotalcite, metal-doped hydrotalcite, pyroxene, metal-doped pyroxene, clay, metal-doped clay, zeolite, metal-doped zeolite, silica, metal-doped silica, alumina, metal-doped alumina, silica-alumina, metal-doped silica-alumina, metal oxides carbons and combinations thereof.

10. The porous metallo-silicate composition as in claim 9, wherein the carrier is about 5 to about 95 wt % of the composition.

11. The porous metallo-silicate composition of claim 1, wherein the porous structure is effective as a catalyst for steam and/or $CO_2$ catalytic total acid number (TAN) reduction of hydrocarbon feedstock of produced hydrocarbons.

12. The porous metallo-silicate composition of claim 1, further comprising nano-crystalline molybdenum carbide and/or tungsten carbide materials and a carrier and/or binder admixed to the MSC.

13. The porous metallo-silicate composition of claim 12, wherein the carrier is a hydrotalcite, metal-doped hydrotalcite, pyroxene, metal-doped pyroxene, clay, metal-doped clay, zeolite, metal-doped zeolite, silica, metal-doped silica, alumina, metal-doped alumina, silica-alumina, metal-doped silica-alumina, metal oxide and mixtures thereof.

14. The porous metallo-silicate composition of claim 13, wherein the metal-doped elements consist of Ce, V, Ni, Cu, Zn in proportions from about 0 to about 30 wt % by weight of each of them in the carrier.

15. A method of preparing a composition as defined in claim 1, comprising the steps of:
   a. preparing an acidic gel media containing cerium, divalent elements and silicon wherein the cerium, divalent elements and silicon have a molar relationship $SiO_2$: $mCeO_2$: nXO wherein X is a divalent element selected from nickel, copper, zinc and combinations thereof, m is from about 0.001 to about 0.5 and n is from about 0.001 to about 0.5.
   b. increasing the pH of the acidic media to a pH effective to cause anchoring of the metal elements of step a within a silicate framework, and
   c. forming the MSC by hydrothermal treatment.

16. The method of claim 15, wherein a temperature of reaction to produce the MSC is between room temperature and about 250° C.

17. The method of claim 15, wherein a time of reaction of step b. to produce the MSC is between about 1 hour and about 30 days.

18. The method as in claim 15, further comprising the step of after step c. admixing nano-crystalline molybdenum carbide and/or tungsten carbide materials to the MSC together with a carrier and/or binder.

19. The method as in claim 18, wherein the step of admixing includes preparing an amorphous carbide precursor with a metal molybdenum and/or tungsten to carbon ratio (M/C) between about 1 to about 10; allowing the amorphous prepared carbide precursor to undergo a suitable thermal reaction transformation to generate nano-crystalline molybdenum and/or tungsten carbides in the nanometer range (about 1 to 100 nm).

20. The use of the composition of claim 1 for reduction of the total acid number (TAN) of a hydrocarbon feedstock of the produced hydrocarbons by contacting the hydrocarbon feedstock with a porous metallo-silicate composition together with steam and/or $CO_2$ under reaction conditions to reduce the original TAN number of the hydrocarbon feedstock to a desired value.

21. The use as in claim 20, wherein the original viscosity, density, sulfur content, or any combination thereof of the hydrocarbon feedstock is reduced.

22. The use as in claim 20, wherein the siliceous micro and/or meso porous structure has a pore size enabling the catalytic removal of acidic moieties from heavy hydrocarbons under hydroprocessing conditions.

23. A porous metallo-silicate composition (MSC) prepared from a mixture having a molar composition:

$$aM_2O:b\ R:SiO_2:mCeO_2:nXO:yH_2O:zAC$$

wherein M is an inorganic cation selected from sodium, potassium, lithium, cesium, rubidium or a mixture thereof, R is an organic moiety having structure directing properties for porosity, a is from 0 to 10 and b is from 0.01 to 0.2, m is between 0.001 and about 0.5; n is between 0.001 and about 0.5; y is from 1 to 300; z is from 0.1 to 3; X is nickel, copper or zinc or a combination thereof; AC is an acid source; and wherein after a hydrothermal treatment the composition has a silicate framework having a micro and/or meso porous structure.

24. The porous metallo-silicate composition as in claim 23, wherein M is sodium.

25. The porous metallo-silicate composition as in claim 23, wherein R is a tetraalkylammonium salt and/or a hydroxide of the tetraalkylammonium.

26. The porous metallo-silicate composition as in claim 23, wherein the cerium source is selected from a soluble salt, hydroxide and/or oxide of cerium.

27. The porous metallo-silicate composition as in claim 23, wherein X is a soluble salt, hydroxide and/or oxide of nickel, copper and/or zinc.

28. The porous metallo-silicate composition as in claim 23, wherein M is a salt, oxide and/or hydroxide of sodium, potassium, lithium, cesium and/or rubidium.

29. The porous metallo-silicate composition as in claim 23, wherein AC is a sulfuric acid, nitric acid or hydrochloric acid.

30. The porous metallo-silicate composition as in claim 23 is in a calcined form.

31. The porous metallo-silicate composition as in claim 23 is in a calcined form and having a porosity enabling steam and/or $CO_2$ catalytic TAN reduction of a hydrocarbon feedstock of produced hydrocarbons.

32. The porous metallo-silicate composition of claim 23, wherein $XO/SiO_2$ is about 0.001 to 0.5 and preferably about 0.01 to 0.5.

33. The porous metallo-silicate composition of claim 23, wherein $CeO_2/SiO_2$ is about 0.001 to 0.5 and preferably about 0.01 to 0.5.

34. The porous metallo-silicate composition of claim 23, wherein $M_2O/SiO_2$ is about 0.01 to 10 and preferably about 0.1 to 5.

35. The porous metallo-silicate composition of claim 23, wherein $R/SiO_2$ is about 0.01 to 2 and preferably about 0.05 to 1.

36. The porous metallo-silicate composition of claim 23, wherein $AC/SiO_2$ is about 0.1 to 3 and preferably about 0.3 to 2.

37. The porous metallo-silicate composition of claim 23, wherein $H_2O/SiO_2$ is about 1 to 300 and preferably about 10 to 200.

38. The porous metallo-silicate composition of claim 23, wherein R is removed by calcination.

39. The porous metallo-silicate composition of claim 23, wherein M is removed by ion-exchange.

40. The porous metallo-silicate composition of claim 23, further comprising nano-crystalline molybdenum carbide and/or tungsten carbide materials admixed to the MSC together with a carrier and/or binder.

41. A method of preparing a porous metallo-silicate composition (MSC) comprising the steps of:
   d. preparing an amorphous gel having a molar composition:

$$aM_2O:b\ R:\ SiO_2:mCeO_2:nXO:\ yH_2O:zAC$$

wherein M is an inorganic cation selected from sodium, potassium, lithium, cesium, rubidium or a mixture thereof, R is an organic moiety having structure directing properties for porosity, a is from about 0 to about 10 and b is from about 0.01 to about 0.2, m is between about 0.001 and about 0.5; n is between about 0.001 and about 0.5; y is from about 1 to about 300; z is from about 0.1 to about 3; X is nickel, copper or zinc or a combination thereof; AC is an acid source; and
   e. allowing the amorphous gel to undergo a hydrothermal reaction transformation to generate a silicate framework wherein the framework is a crystalline, amorphous micro-porous, an ordered or disordered mesoporous amorphous silicate framework or a combination thereof.

42. The method of claim 41, wherein Ce—Ni, Ce—Cu, Ce—Zn, Ce—Ni—Cu, Ce—Ni—Zn or Ce—Cu—Zn are doped into the amorphous gel of the crystalline or amorphous silicate framework.

* * * * *